United States Patent
McCoy et al.

(10) Patent No.: US 10,472,432 B2
(45) Date of Patent: *Nov. 12, 2019

(54) ARTICLES CONTAINING PTFE HAVING IMPROVED DIMENSIONAL STABILITY PARTICULARLY OVER LONG LENGTHS, METHODS FOR MAKING SUCH ARTICLES, AND CABLE/WIRE ASSEMBLIES CONTAINING SUCH ARTICLES

(71) Applicant: SAINT-GOBAIN PERFORMANCE PLASTICS CORPORATION, Solon, OH (US)

(72) Inventors: Jessica L. McCoy, Waltham, MA (US); Georges Moineau, Battice (BE); Philip C. Guy, Williamstown, MA (US); Mark E. Schiek, Lanesboro, MA (US); Joseph B. MacDonald, Hoosick Falls, NY (US); Frank M. Keese, Cambridge, NY (US); Jennifer Adamchuk, Marlborough, MA (US); Silvia Ruth Gorman, Albany, NY (US); Scott P. Campbell, Averill Park, NY (US); Paul J. Beaumont, Bennington, VT (US); John Marko, Saratoga Springs, NY (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,424

(22) Filed: Nov. 15, 2017

(65) Prior Publication Data

US 2018/0072824 A1 Mar. 15, 2018

Related U.S. Application Data

(63) Continuation of application No. 14/535,946, filed on Nov. 7, 2014, now Pat. No. 10,066,033.

(Continued)

(51) Int. Cl.
*H01B 3/00* (2006.01)
*C08F 14/26* (2006.01)
(Continued)

(52) U.S. Cl.
CPC .......... *C08F 14/26* (2013.01); *B29C 48/0011* (2019.02); *B29C 48/022* (2019.02);
(Continued)

(58) Field of Classification Search
CPC ...................................................... H01B 3/00
(Continued)

(56) References Cited

U.S. PATENT DOCUMENTS 4,626,810 A 12/1986 Nixon
5,544,584 A 8/1996 Thompson et al.
(Continued)

FOREIGN PATENT DOCUMENTS

CA 2416795 A 7/2003
CN 1392180 A 1/2003
(Continued)

OTHER PUBLICATIONS

The International Search Report and the Written Opinion received from the International Searching Authority (EPO) for International Application No. PCT/EP2013/074077, dated Aug. 8, 2014, 20 pages.
(Continued)

*Primary Examiner* — Chau N Nguyen

(74) *Attorney, Agent, or Firm* — Abel Schillinger, LLP; Alexander H. Plache

(57) ABSTRACT

The present disclosure relates to methods of making an article comprising PTFE, methods of making expanded articles comprising PTFE, articles comprising PTFE, and expanded articles comprising PTFE having improved mechanical and electrical performance and particularly reduced variability in mechanical, electrical and dimensional properties, particularly over long lengths.

16 Claims, 17 Drawing Sheets

Related U.S. Application Data

(60) Provisional application No. 61/901,923, filed on Nov. 8, 2013.

(51) Int. Cl.

| | | |
|---|---|---|
| *B29C 48/06* | (2019.01) | |
| *B29C 48/08* | (2019.01) | |
| *B29C 48/00* | (2019.01) | |
| *B29C 48/475* | (2019.01) | |
| *C08J 5/18* | (2006.01) | |
| *H01B 3/44* | (2006.01) | |
| *H01B 3/30* | (2006.01) | |
| *H01B 7/02* | (2006.01) | |
| *H01B 11/18* | (2006.01) | |
| *H01B 13/14* | (2006.01) | |
| *B29K 27/18* | (2006.01) | |

(52) U.S. Cl.
CPC .............. *B29C 48/06* (2019.02); *B29C 48/08* (2019.02); *B29C 48/475* (2019.02); *C08J 5/18* (2013.01); *H01B 3/30* (2013.01); *H01B 3/445* (2013.01); *H01B 7/0241* (2013.01); *H01B 11/18* (2013.01); *H01B 13/148* (2013.01); *B29K 2027/18* (2013.01); *C08J 2327/18* (2013.01); *Y10T 428/24479* (2015.01)

(58) Field of Classification Search
USPC ........................................ 174/110 R, 110 FC
See application file for complete search history.

(56) References Cited

U.S. PATENT DOCUMENTS

| | | | | |
|---|---|---|---|---|
| 5,965,074 | A * | 10/1999 | Aubertin | B29C 47/0004 |
| | | | | 264/109 |
| 6,122,257 | A | 9/2000 | Machida et al. | |
| 6,395,208 | B1 | 5/2002 | Herweck | |
| 6,949,287 | B2 | 9/2005 | Huang et al. | |
| 7,691,299 | B2 | 4/2010 | Hayashi et al. | |
| 7,976,751 | B2 | 7/2011 | Hayashi et al. | |
| 8,226,876 | B1 | 7/2012 | Hughes et al. | |
| 2002/0082320 | A1* | 6/2002 | Sarkis | B29C 71/04 |
| | | | | 523/220 |
| 2003/0082324 | A1 | 5/2003 | Sogard | |
| 2006/0254792 | A1 | 11/2006 | Kimura | |
| 2008/0014423 | A1 | 1/2008 | Garrison et al. | |
| 2008/0083506 | A1* | 4/2008 | Awata | B65H 23/1806 |
| | | | | 156/582 |
| 2012/0164035 | A1 | 6/2012 | Yoshida | |
| 2013/0033825 | A1 | 2/2013 | Brooks et al. | |
| 2014/0231542 | A1 | 8/2014 | Sato et al. | |
| 2014/0295170 | A1 | 10/2014 | Kim et al. | |

FOREIGN PATENT DOCUMENTS

| | | |
|---|---|---|
| CN | 1202160 C | 5/2005 |
| CN | 101597379 A | 12/2009 |
| CN | 101767457 A | 7/2010 |
| CN | 101920559 A | 12/2010 |
| CN | 201669866 U | 12/2010 |
| CN | 102555220 A | 7/2012 |
| CN | 202711884 U | 1/2013 |
| CN | 103219086 A | 7/2013 |
| CN | 103219107 A | 7/2013 |
| CN | 203103030 U | 7/2013 |
| EP | 1077230 B2 | 2/2001 |
| JP | 2002370279 A | 12/2002 |
| JP | 2012219190 A | 11/2012 |
| WO | 9117551 A1 | 11/1991 |
| WO | 9732714 | 9/1997 |
| WO | 9835812 | 8/1998 |
| WO | 9960191 | 11/1999 |
| WO | 0241325 A1 | 5/2002 |
| WO | 2005097877 A1 | 10/2005 |
| WO | 200611679 A2 | 11/2006 |
| WO | 2010149994 A1 | 12/2010 |

OTHER PUBLICATIONS

Norton R167 Expanded PTFE Films, Saint-Gobain Performance Plastics, XP-002726868, <<http://www.norton-films.com/r167extruded-ptfe-films-aspx>>, printed Jul. 7, 2014, 1 page.

Norton 124 Sintered Extruded PTFE Films, Saint-Gobain Performance Plastics, XP-002726865, <<http://www.norton-films.com/124extruded-ptfe-films.aspx>>, printed Jul. 7, 2014, 1 page.

Norton 125 Unsintered Extruded PTFE Films, Saint-Gobain Performance Plastics Corporation, XP-002726866, <<http://www.norton-films.com/125extruded-ptfe-films.aspx>>, printed Jul. 7, 2014, 1 page.

Norton R128 and R129 Premium Extruded PTFE Films, Saint-Gobain Performance Plastics Corporation, XP-002726867, <<http://www.norton-films.com/r128extruded-ptfe-films.aspx>>, printed Jul. 7, 2014, 1 page.

International Search Report and Written Opinion for PCT Application No. PCT/US2013/070161, dated Aug. 26, 2014, 12 pages.

\* cited by examiner

ARTICLES CONTAINING PTFE HAVING IMPROVED DIMENSIONAL STABILITY PARTICULARLY OVER LONG LENGTHS, METHODS FOR MAKING SUCH ARTICLES, AND CABLE/WIRE ASSEMBLIES CONTAINING SUCH ARTICLES

CROSS-REFERENCE TO RELATED APPLICATION

This application is a continuation of and claims priority to U.S. patent application Ser. No. 14/535,946, entitled "ARTICLES CONTAINING PTFE HAVING IMPROVED DIMENSIONAL STABILITY PARTICULARLY OVER LONG LENGTHS, METHODS FOR MAKING SUCH ARTICLES, AND CABLE/WIRE ASSEMBLIES CONTAINING SUCH ARTICLES," by Jessica L. MCCOY et al., filed Nov. 7, 2014, which claims priority under 35 U.S.C. § 119(e) to U.S. Patent Application No. 61/901,923, entitled "ARTICLES CONTAINING PTFE HAVING IMPROVED DIMENSIONAL STABILITY PARTICULARLY OVER LONG LENGTHS, METHODS FOR MAKING SUCH ARTICLES, AND CABLE/WIRE ASSEMBLIES CONTAINING SUCH ARTICLES," by Jessica L. MCCOY et al., filed Nov. 8, 2013, which applications are assigned to the current assignee hereof and incorporated herein by reference in their entireties.

FIELD OF THE DISCLOSURE

The present disclosure relates to paste extruded articles comprising PTFE, such as a PTFE film or tape, methods for making such articles, and products such as wire or cable assemblies having such articles.

RELATED ART

Unsintered paste extruded polytetrafluoroethylene (PTFE) articles, such as films and tapes, are used in many applications including sealing joints, insulating conductive wires, and protecting materials from corrosive elements. PTFE demonstrates good chemical and heat resistance, and electrical insulation characteristics, as well as a low coefficient of friction. However, in general, paste extruded PTFE articles can have less than desirable mechanical properties. In particular, current processes for manufacturing paste extruded PTFE articles are unable to maintain dimensional parameters, mechanical properties, porosity, and other characteristics within necessary tolerances, and especially over long lengths.

In general, paste extruded PTFE articles are produced in a paste extrusion process where to generate long lengths of monolithic PTFE articles, successive preforms (compacted PTFE mixtures) having a mass of about 3 lbs of PTFE are paste extruded. The use of successive preforms results in a joint or seam where the successive preforms meet. This joint or seam can be distinctly identified in the final monolithic PTFE article. When long lengths of monolithic PTFE articles are needed, such as in the order of 300 meters or greater, traditional processes can generate 4 or 5 seams over such lengths, depending on the thickness and width of the PTFE article. The joints or seams have undesirable properties of the PTFE article such as undesirable dimensional parameters, mechanical properties, electrical properties, porosity, and other characteristics. In particular, the variation of these properties across the entire length of the monolithic PTFE article can be high, particularly due to the presences of these joints.

The variation in these properties is undesirable for many reasons. For example, during winding of the PTFE article onto a cable or wire, a weak point, particularly at the joint, having a mechanical strength outside of tolerance can cause breakage of the tape. Moreover, in such cable or wire assemblies, insulative properties, such as the dielectric constant, need to be maintained above a target value. The low spots, particularly created at the joint, lead to reduced electrical performance. A large amount of effort has been placed on making the preform joints as seamless as possible, but it has not heretofore been possible to eliminate the large variation in properties and distinct presence of a joint and its associated drawbacks.

CN202711884, a Chinese utility model application, describes a PTFE film for a power cable with extremely broad ranges of lengths and thickness tolerances. However, CN202711884 does not disclose or suggest how to achieve such thickness tolerances, and includes no examples. In fact, the only disclosure within CN202711884 on how to make the PTFE tape described is a simplistic germane overview of all PTFE paste extrusion techniques. Moreover, CN202711884 is completely devoid of any teaching to reduce or eliminate joints or seams over long lengths or in achieving low variation of other properties. At the time of the filing of this application, all known methods of forming long lengths of monolithic articles required successive paste extrusion of small preforms (about 3 lbs of PTFE).

As such, a considerable need exists, particularly in the aerospace industry, for wire and cable insulation in the form of a PTFE article that has a low variation in properties such as dimensional parameters, mechanical properties, electrical properties, porosity, and others over a long length of monolithic article.

BRIEF DESCRIPTION OF THE DRAWINGS

Embodiments are illustrated by way of example and are not limited in the accompanying figures.

Figure 1:
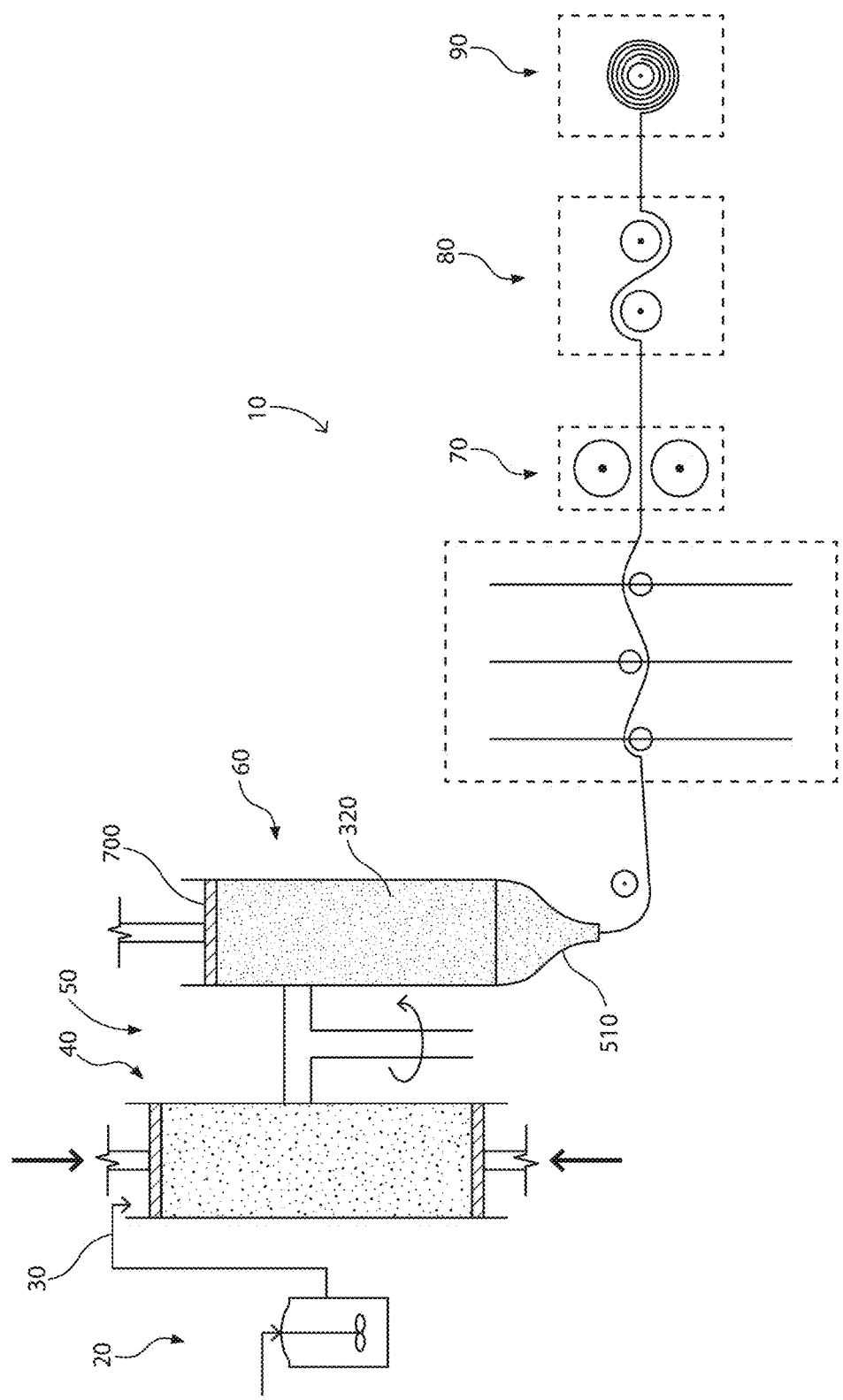
FIG. 1 illustrates a schematic process flow diagram of a method of making a PTFE article according to an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "joint" or "seam" refers to a perceptible region in a paste extruded PTFE article which is an artifact of the paste extrusion of successive preforms.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within polymer, and particularly paste extruded PTFE arts.

In general, the present disclosure describes methods of making PTFE articles, PTFE articles, expanded PTFE articles, and cable assemblies containing such PTFE articles. The PTFE articles have improved dimensional, mechanical, and electrical properties, and in particular, consistency of these properties over long lengths. In certain embodiments, unique methods for making such PTFE articles can include using significantly larger preforms and/or steps to be able to mix, handle, compact, and paste extrude such significantly larger preforms, particularly in a semi-continuous process.

The concepts are better understood in view of the embodiments described below that illustrate and do not limit the scope of the present invention.

Referring initially to FIG. 1, there is illustrated a general schematic diagram for a method and system 10 for forming a paste extruded PTFE article according to one embodiment. In general, one method of forming a PTFE article described herein can include providing raw materials including PTFE and a lubricant; mixing the raw materials to uniformly disperse the components to form a mixture or paste 20; loading the mixture into a preform 30; compacting the mixture 40; translating the preform into communication with a die 50; extruding the mixture to form a tape 60; calendering the article 70; drying the article 80; and winding the article into a roll 90. It is to be understood that specific embodiments described herein can include less than all of the steps described above or can include other additional steps as is customary in the art.

Initially, raw materials can be provided into a mixing apparatus, and the materials can be thoroughly mixed.

The raw materials can include a non-meltprocessable polymer. For example, non-meltprocessable polymers can include liquid crystal polymers (LCP), certain fluoropolymers such as perfluoropolymers, and in particular polytetrafluoroethylene (PTFE), modified polytetrafluoroethylene (m-PTFE), or combinations thereof. In particular embodiments, the raw material includes polytetrafluoroethylene (PTFE), and can even consist essentially of PTFE. As used herein, a raw material mixture which consist essentially of PTFE refers to a raw material mixture that includes PTFE, a lubricant, and any other useful additive. Although the remainder of the disclosure will refer to PTFE, it is to be understood that other non-meltprocessable polymers, such as liquid crystal polymers, may be used in addition to or as an alternative to PTFE. It is further understood that the use of the word "PTFE" herein refers to any type of PTFE material or any mixture containing a PTFE based material.

The PTFE raw material can be in particulate form. In certain embodiments, the PTFE particulate can have an average particle size ($D_{50}$) of no greater than 50 microns, no greater than 20 microns, or even no greater than 1 micron. In further embodiments, the PTFE particulate can have an average particle size of at least 0.01 microns, at least 0.05 microns, or even at least 0.1 microns. In particular embodiments, the PTFE particulate can have an average particle size in a range of any of the minimum and maximum values described above, such as in a range of 0.05 microns to 20 microns, or even 0.1 microns to 1 micron.

The raw materials can further include a lubricant, which after mixing with the PTFE particulate can form a slurry or paste such that the mixture can be paste extruded. The lubricant is driven off during drying, and advantageously, the finished product is essentially free of the lubricant material.

Examples of suitable lubricants can include a hydrocarbon-based liquid, such as the isoparaffinic solvents sold under the Isopar tradename by the ExxonMobil Chemical Co. Particular lubricants can include Isopar H, Isopar K, Isopar M, Isopar G, or combinations thereof.

In certain embodiments, the raw material mixture can include the PTFE particulate in an amount of at least 40 wt. %, at least 60 wt. %, at least 78 wt. %, or even at least 80% based on the total weight of the PTFE and lubricant. Further, the raw material mixture can include the PTFE particulate in an amount of no greater than 95 wt. %, no greater than 90 wt. %, or even no greater than 88 wt. %, based on the total weight of the PTFE and lubricant. In particular embodiments, the raw material mixture can include the PTFE particulate in an amount in a range of any of the minimum and maximum values described above, such as in a range of 60 wt. % to 95 wt. %, 75 wt. % to 90 wt. %, or even 78 wt. % to 88 wt. % by weight, based on the total weight of the PTFE and lubricant.

The raw material mixture can include a ratio of PTFE to lubricant of at least 1, at least 2, at least 3, at least 4, or even at least 5. Further, the raw material mixture can include a ratio of PTFE to lubricant of no greater than 15, no greater than 11, or even no greater than 9. In particular embodiments, the raw material mixture can include a ratio of PTFE to lubricant in a range of any of the minimum and maximum values described above, such as in a range of 2 to 11 or even 5 to 9.

The raw material mixture can further include any useful additives in their useful amounts as understood by those skilled in the art. Examples of additives include, but are not limited to photosensitive materials, fillers, processing aids, pigments, and combinations thereof. Certain additives may remain in the final product, while other additives may be driven off with the lubricant.

Particular additives useful in certain embodiments can include photosensitive materials and additives to enhance the photosensitive material, which can make a PTFE article laser markable. The photosensitive material can be an organic compound. In certain embodiments, the photosensitive material can contain an oxide, such as $SnO_2$, $ZnO$, AZO, $TiO_2$, $CeO_2$, $Nb_2O_5$, $MoO_3$, $WO_3$, $V_2O_5$, $Cr_2O_3$, $Fe_2O_3$, NiO, CuO, CdO and $Tl_2O_3$ or combinations thereof. When present, the photosensitive material can be present in the raw material mixture in an amount of at least about 0.1%, at least about 0.5%, or even at least about 1% by weight, based on the total weight of the PTFE and photosensitive material. Further, the photosensitive material can be present in the raw material mixture in an amount of no greater than 20%, no greater than 10%, or even no greater than about 5% by weight based on the total weight of the PTFE and photosensitive material. In particular embodiments, the photosensitive material can be present in the raw material mixture in a range of any of the minimum and maximum values described above, such as in a range of 0.1% to 20%, 0.5% to 10%, or even 1% to 5% by weight, based on the total weight of the PTFE and photosensitive material. It is further understood that the photosensitive material desirably remains in the final product. Further additives that can enhance the photosensitive material and can even be a photosensitive material themselves can include materials such as zinc sulfide and organic synergists, such as polyimide, that can enhance contrast ratio.

In certain embodiments, the total amount of the raw material mixture to be loaded into a single large preform tube can be mixed in a single batch. A particular advantage of certain embodiments of the present disclosure is the discovery of the improvement in the properties of the final PTFE article by mixing the total amount of the raw material mixture to be loaded into a single large preform tube, particularly when dealing with the large preforms described in more detail below. In typical paste extrusion techniques, small batches of raw material (about 3 lbs. of PTFE) were mixed and loaded into small preform tubes. In the larger preforms of the current disclosure, the inventors discovered that mixing a single large batch for each preform can provide significantly lower concentration variances and inconsistencies throughout the length of the preform than using multiple small batches that were independently mixed and combined in a preform tube. These improvements were realized, in part, as decreased total thickness variation in the final PTFE article and other improvements in the PTFE article's mechanical and electrical properties as described in more detail below.

As used herein, the phrase "preform tube" refers to the vessel from which the compacted raw material mixture is paste extruded. As used herein, the word "preform" refers to actual raw material mixture within the preform tube. As used herein, "preform" is synonymous with the phrases "raw material mixture" or "compressed raw material mixture."

While, the inventors discovered that by mixing a single batch of the entire amount of raw materials that was to be loaded in a single preform tube aided in reducing the total thickness variation of the extruded article, it was also discovered that increasing the amount of the raw material mixture (i.e. increasing the preform and preform tube size) resulted in extreme difficulty in obtaining a homogeneous mixture with low variability in lubricant concentration throughout the large mixture. For example, the inventors discovered that traditionally used mixing methods and equipment were not capable of providing consistent homogeneously mixed batches of the size described below. In other words, significant lubricant load variation within and between these large batches was discovered, and further improvements were needed in mixing in a large single batch.

Accordingly, the current inventors had to significantly modify the methods and apparatuses used to mix the large batches to obtain consistent homogeneous mixtures to form the large preforms discussed herein. For example, particular modifications can include improving the consistency and accuracy of the amount of lubricant to PTFE; improving the spray patterns for lubricant addition; and modifying the preform structure.

Regarding improving the consistency and accuracy of the amount of lubricant to PTFE within the mixture, in certain embodiments, steps can include providing a mixer and loading the mixer with the desired amount of PTFE. Steps can further include weighing a container loaded with lubricant. Steps can further include while the loaded container is being actively and continuously weighed, the lubricant can be added to the mixer with PTFE. A controller can be in communication with the weighing device and the lubricant dispensing apparatus. The controller can be configured to stop dispensing lubricant once a desired amount of lubricant (measured by weight) has been added to the mixture and removed from the container being weighed. As such, a consistent and exact amount of lubricant can be added to a batch of PTFE resin. It is reiterated that in smaller preforms that were traditionally used, the variation in lubricant loading consistency and accuracy was not recognized as a problem that would significantly effect the properties of the formed PTFE article.

Regarding improving the spray patterns for lubricant addition, the inventors discovered that the lubricant spray configuration into the mixing apparatus has a strong relationship to the mix time and mix uniformity. Previously used mixing apparatuses for PTFE article paste extrusion relied on a single spray tip. The inventors discovered that using more than one spray tip, such as 2 spray tips, allowed for finer atomization and faster addition of the lubricant, which was discovered to aid in achieving consistent homogeneous mixtures, in particular for the size of preforms discussed below.

In embodiments described herein, mixing can include mixing all of the raw materials to be loaded in a single preform tube in a single batch. Moreover, the single batch can contain at least 5 lbs, at least 7 lbs, at least 10 lbs, at least 12 lbs, at least 15 lbs, at least 17 lbs, at least 20 lbs, at least 25 lbs, at least 30 lbs, at least 35 lbs, at least 40 lbs, at least 45 lbs, at least 50 lbs, at least 55 lbs, at least 60 lbs, at least 65 lbs, at least 70 lbs, at least 75 lbs, at least 80 lbs, at least 85 lbs, at least 90 lbs, at least 95 lbs, or even at least 100 lbs of the PTFE. Further, the single batch can contain no greater than 500 lbs, no greater than 300 lbs, no greater than 200 lbs, or even no greater than 150 lbs of PTFE. In particular, the single batch can contain a range of 5 lbs to 300 lbs of PTFE, 40 lbs to 200 lbs of PTFE, or even 60 lbs to 150 lbs of PTFE.

Once a homogeneous mixture is obtained, the mixture can be stored and incubated in a container before being loaded into a preform tube. After incubation, the incubated mixture can be remixed prior to loading into a preform tube.

Figure 4A:
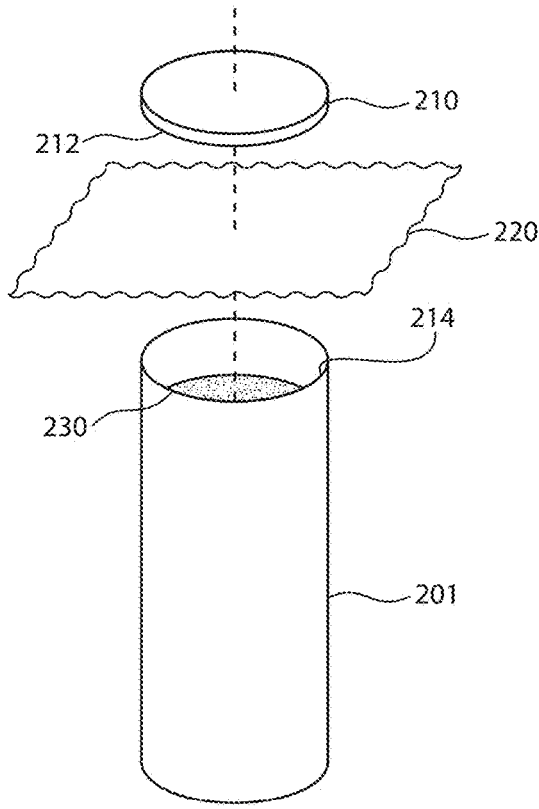
FIG. 4A illustrates an exploded view of a container assembly for incubating a PTFE and lubricant mixture according to an embodiment.
Figure 4B:
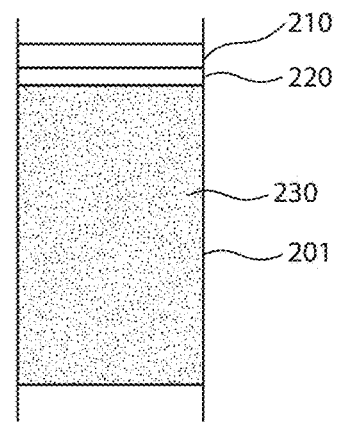
FIG. 4B illustrates a section view of an assembled container assembly for incubating a PTFE and lubricant mixture according to an embodiment.

Referring now to FIGS. 4A-4B, the mixture can be stored and incubated in a container 201. The container assembly can include a container 201 and a support member 210. The support member can have any particular shape. In particular embodiments, and as illustrated in FIGS. 4A-4B, the support member 210 can have an outer profile 212 that generally complements the inner profile 214 of the container 201. Accordingly, in certain embodiments, the support member 210 can have a generally circular shape, such as a disc shape. The support member 210 can be composed of any suitable material(s). In particular embodiments, the support member 210 can include, and can even be substantially composed of, a polymer material. In very particular embodiments, the polymer material can include PVC.

The container assembly can further include a flexible sheet material 220. The flexible sheet material 220 can be disposed below the support member, such as in between the support member 210 and the PTFE mixture 230. The flexible sheet material 220 can include, and can even be substantially composed of, a polymer material.

The raw material mixture can be incubated in the container assembly for a desired period of time to allow the lubricant to distribute throughout the resin, i.e. wick into the secondary particles. In certain embodiments, the raw material mixture can be incubated in the container assembly for at least 12 hours, at least 24 hours, or even at least 36 hours. In other embodiments, the raw material mixture can be incubated in the container assembly for no greater than 84 hours, no greater than 72 hours, or even no greater than 60 hours. In certain further embodiments, the raw material mixture can be incubated in the container assembly in a range of any of the minimum and maximum values described above, such as in a range of 24-72 hours, or even 36-60 hours.

Another particular advantage of certain embodiments of the present disclosure is the ability to achieve a low variation in lubricant distribution throughout the preform, and particularly in the large preforms discussed herein. As discussed above, a consistent homogeneous mix in a large preform was not able to be obtained by traditional methods and equipment. It was surprisingly discovered that the inclusion of a support member and/or a flexible sheet after mixing and during incubation with such large batches of raw material mixture discussed herein aided to reduce the loss of the lubricant to vapor space which resulted in improving the ability to obtain consistent homogeneous mixtures when transferred to the preform tube and thereby improve the variation in lubricant distribution in the preform, and provide improved dimensional, mechanical, and performance properties as discussed herein.

Figure 2:
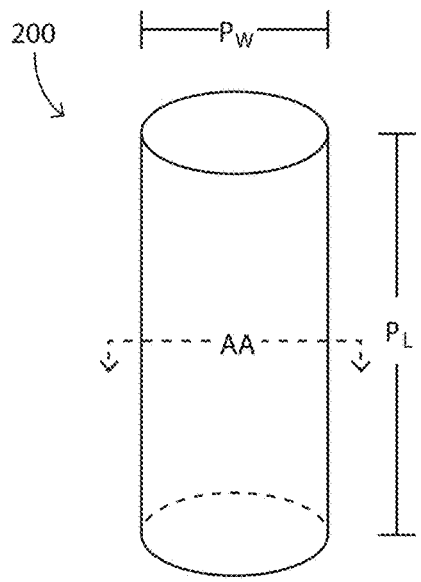
FIG. 2 illustrates a schematic representation of a preform tube according to an embodiment.

Referring now to FIG. 2, there is illustrated an example of a preform tube 200 for use in a PTFE paste extrusion process disclosed herein. The preform tube 200 can have a length $P_L$ and a width $P_W$. In particular embodiments, the length $P_L$ of the preform tube 200 can be greater than the width $P_W$.

In certain embodiments, the preform tube 200 can have a length of at least 0.5 meters, at least 0.8 meters, at least 1 meter, at least 1.2 meters, or even at least 1.3 meters. Further, the preform tube 200 can have a length of no greater than 10 meters, no greater than 5 meters, no greater than 3 meters, or even no greater than 2 meters. In particular, the preform tube 200 can have a length in a range of any of the minimum and maximum values described above, such as in a range of 0.5 meters to 5 meters, 1 meter to 3 meters, or even 1.2 meters to 5 meters.

The preform tube 200 can have a width (also referred to as the diameter in a cylindrical preform) of at least 5 cm, at least 12 cm, or even at least 14 cm. Further, the preform tube 200 can have a width of no greater than 1,000 cm, no greater than 100 cm, no greater than 50 cm, or even no greater than 30 cm. In particular, the preform tube 200 can have a width in a range of any of the minimum and maximum values described above, such as in a range of 5 cm to 100 cm, 12 cm to 50 cm, or even 14 cm to 30 cm.

Figure 3:
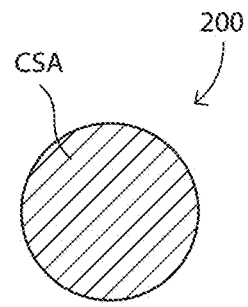
FIG. 3 illustrates a cross-section of a preform tube according to an embodiment.

Referring now to FIG. 3, which illustrates a cross-section of the preform tube of FIG. 2, along line A-A, the preform tube 200 can have a cross-sectional area of at least 100 $cm^2$, at least 140 $cm^2$, or even at least 160 $cm^2$. Further, the preform tube can have a cross-sectional area of no greater than 5000 $cm^2$, no greater than 1,000 $cm^2$, no greater than 500 $cm^2$, no greater than 300 $cm^2$, or even no greater than 250 $cm^2$. In particular, the preform tube can have a cross-sectional area in a range of any of the minimum and maximum values described above, such as in a range of 100 $cm^2$ to 1,000 $cm^2$, 140 $cm^2$ to 300 $cm^2$ or even 160 $cm^2$ to 250 $cm^2$.

The preform tube 200 can have a particular ratio of the length to the width. For example, the preform tube can have a ratio of the length to the width of at least 3, at least 5, at least 7, at least 10, or even at least 15. Further, the preform tube 200 can have a ratio of the length to the width of no greater than 100, no greater than 75, or even no greater than 50. In particular, the preform tube can have a ratio of the length to the width in a range of any of the minimum and maximum values described above, such as in a range of 3 to 100, 5 to 75, or even 7 to 50.

The preform tube 200 can have an interior volume, or capacity for a raw material mixture, of at least 10,000 $cm^3$, at least 15,000 $cm^3$, at least 20,000 $cm^3$, or even at least 23,000 $cm^3$. Further, the preform tube 200 can have an interior volume of no greater than 100,000 $cm^3$, no greater than 50,000 $cm^3$, no greater than 40,000 $cm^3$, or even no greater than 30,000 $cm^3$. In particular, the preform tube can have an interior volume in a range of any of the minimum and maximum values described above, such as in a range of 10,000 $cm^3$ to 50,000 $cm^3$, 15,000 $cm^3$ to 40,000 $cm^3$, or even 20,000 $cm^3$ to 40,000 $cm^3$.

The preform tube 200 can be configured to hold a desired amount of a compressed raw material mixture as described above. For example, the preform tube 200 can be configured to hold a raw material mixture containing at least 5 lbs, at least 7 lbs, at least 10 lbs, at least 12 lbs, at least 15 lbs, at least 17 lbs, at least 20 lbs, at least 25 lbs, at least 30 lbs, at least 35 lbs, at least 40 lbs, at least 45 lbs, at least 50 lbs, at least 55 lbs, at least 60 lbs, at least 65 lbs, at least 70 lbs, at least 75 lbs, at least 80 lbs, at least 85 lbs, at least 90 lbs, at least 95 lbs, or even at least 100 lbs of PTFE. Further, the preform tube can be configured to hold a raw material mixture containing no greater than 500 lbs, no greater than 300 lbs, no greater than 200 lbs, or even no greater than 150 lbs of PTFE. In particular, the preform tube can be configured to hold a raw material mixture containing a range of 5 lbs to 300 lbs of PTFE, 40 lbs to 200 lbs of PTFE, or even 60 lbs to 150 lbs of PTFE.

The preform tube can have any particular shape or profile, and in particular embodiments can have a generally cylindrical shape as illustrated in FIGS. 2-3.

Similarly, the compressed raw material mixture in one batch (i.e. preform) formed in the preform tube can include at least 5 lbs, at least 7 lbs, at least 10 lbs, at least 12 lbs, at least 15 lbs, at least 17 lbs, at least 20 lbs, at least 25 lbs, at least 30 lbs, at least 35 lbs, at least 40 lbs, at least 45 lbs, at least 50 lbs, at least 55 lbs, at least 60 lbs, at least 65 lbs, at least 70 lbs, at least 75 lbs, at least 80 lbs, at least 85 lbs, at least 90 lbs, at least 95 lbs, or even at least 100 lbs of PTFE. Further, the preform can include no greater than 500 lbs, no greater than 300 lbs, no greater than 200 lbs, or even no greater than 150 lbs of PTFE. In particular, the preform can include a range of 5 lbs to 300 lbs of PTFE, 40 lbs to 200 lbs of PTFE, or even 60 lbs to 150 lbs of PTFE.

Referring again to FIG. 1, methods of forming a PTFE article according to certain embodiments described herein can further include compacting the raw material mixture that has been loaded into the preform tube. Compacting involves limiting the amount of volume that the raw material occupies, thereby reducing the void space between particles. Care should be taken during compaction to maintain a substantially uniform dispersion of the PTFE and lubricant, which is difficult to control. If the mixture is compressed too much, a portion of the lubricant can be forced or separated out of the mixture and can cause significant variation in lubricant distribution throughout the preform. If the mixture is compressed too little, the preform will fall out of the preform tube during compaction or translation, and/or the mixture can separate in the preform, causing lack of uniformity and resulting physical and mechanical defects.

The inventors discovered that following traditional compacting procedures associated with small preforms was ineffective when transitioning to the larger preforms discussed herein. The inventors surprisingly discovered a compaction method that allows for the paste extrusion of such large preforms without the preforms falling out of the preform tube. Moreover, the inventors surprisingly discovered that certain features in the compacting process can improve uniformity or homogeneity of the large compacted mixture, which can result in improved properties such as total thickness variation and reduction of the size of the preform joint of the PTFE article.

Figures 5, 6, 7:
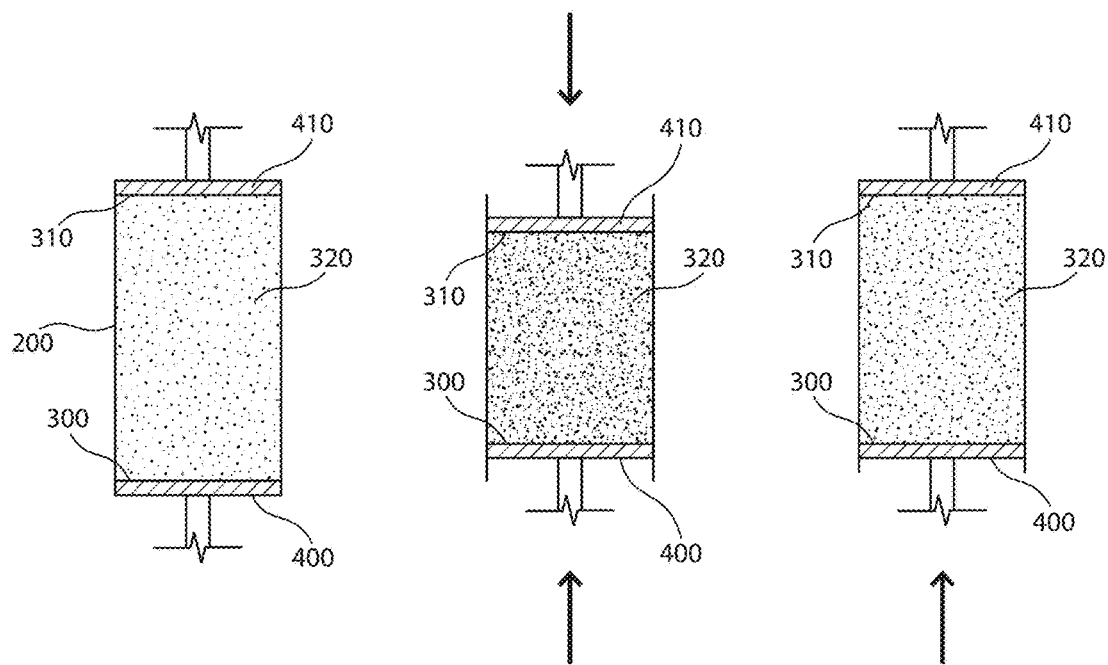
FIG. 5 illustrates a section view of a loaded preform tube prior to compaction according to an embodiment.
FIG. 6 illustrates a section view of a loaded preform tube during compaction according to an embodiment.
FIG. 7 illustrates a section view of a loaded preform tube during compaction according to an embodiment.

Referring initially to FIG. 5, the preform tube 200 has a first end 300 and a second end 310 opposite the first end 300. The first end 300 can be arranged to be at a lower elevation than the second end 310. For example, the preform tube 200 can be in a generally vertical orientation, relative to a level surface. In other words, the preform tube 200 can be at an angle with a level surface such that force of gravity acts on the raw material mixture 320 in the direction of the first end 300.

As illustrated in FIG. 6, in certain embodiments, compacting can include actively compacting the mixture from the first end 300 and actively compacting the mixture from the second end 310. As used herein, the phrase "actively compacting" refers to translational movement of a head, such as a piston head, toward the interior of the preform, thereby decreasing the void space between particles.

In certain embodiments, and as illustrated in FIG. 7, actively compacting the mixture from the first end 300 can begin before actively compacting the mixture 320 from the second end. For example, a first piston head 400 disposed adjacent to the first end 300 can be moved upward while the preform 200 and the second piston head 410 are stationary.

Further, in particular embodiments, actively compacting the mixture 320 from the first end 300 can begin and be completed before actively compacting the mixture 320 from the second end 310. In other embodiment, actively compacting the mixture 320 from the second end 310 can begin before actively compacting the mixture from the first end 300 has been fully completed. Still further, in other embodiments, actively compacting the mixture from the second end 310 can be completed before actively compacting the mixture from the first end 300 has been fully completed.

In yet still further embodiments, actively compacting the mixture from the first end 300 and actively compacting the mixture from the second end 310 can occur, at least in part, concurrently.

It was surprisingly discovered that, for example, actively compacting the mixture from the first end before actively compacting the mixture from the second end can allow for the large preform in the large preform tube to remain in a desired compacted state within the preform and not "fall out" during translation of the preform into communication with the die as will be described in more detail below. As used herein, the phrase "fall out" or "falling out" refers to the preform coming out of the preform tube when not desired. Without wishing to be bound by theory, the inventors discovered that by compacting from the first end before compacting from second end could allow for sufficient force against the surface area of the interior of the vessel to keep the mixture in a compacted state after opening of the first end and aid in preventing fall out.

In certain embodiments, during active compaction, the compaction force at the first and/or second end of the preform can be no greater than 500 psi, no greater than 400 psi, no greater than 350 psi, no greater than 300 psi, no greater than 280 psi, no greater than 270 psi, no greater than 250 psi, no greater than 240 psi, no greater than 230 psi, no greater than 220 psi, no greater than 210 psi, no greater than 200 psi, no greater than 190 psi, or even no greater than 180 psi. Further, during active compaction, the compaction force at the first and/or second end of the preform can be at least 20 psi, at least 40 psi, at least 60 psi, at least 80 psi, at least 100 psi, at least 120 psi, at least 140 psi, or even at least 160 psi. In particular, during active compaction, the compaction force at the first and/or second end of the preform can be in a range of any of the minimum and maximum values described above, such as in a range of 40 psi to 500 psi, 60 psi to 300 psi, or even 80 psi to 250 psi.

In certain embodiments, the compaction force at the first end can be equivalent to or greater than the compaction force at the second end. In other embodiments, the compaction force at the first end can be equivalent to or less than the compaction force at the second end. In particular embodiments, the compaction force at the first and second ends can be substantially the same. For example, the compaction force at the first end can be within 50 psi, within 25 psi, or even within 10 psi of the compaction force at the second end.

Another particular advantage of the present disclosure is the achievement of the low compaction pressures described above and the resulting improvement in the dimensional stability and physical properties of the PTFE article formed using the compaction method described above. The raw material PTFE mixture is virtually incompressible. Thus, as the piston drives inward and compacts the PTFE and lubricant mixture, there is an exponential increase in the compaction force. In traditional compaction of small preforms, the exponential increase during compaction to about 300 psi occurs virtually instantaneously. The inventors surprisingly discovered that by increasing the size of the preform (and the amount of mixture held therein) and using the compaction procedures as described herein, that a slower exponential rise in the applied compaction pressure occurs, and therefore can be controlled, such that the compaction process can be stopped at lower compaction pressures. The inventors further surprisingly discovered that a lower compaction force, particularly lower than 300 psi or even lower than 280 psi, or still further lower than 220 psi resulted in a more uniform dispersion of the lubricant and PTFE, allowing for better control of properties such as total thickness variation. Moreover, the inventors surprisingly discovered that a lower compaction force decreased the size (particularly the length wise direction, and the overall mass) of a joint when extruding successive preforms.

In further embodiments, the compaction speed, i.e., the speed the piston head travels during compaction can be at least 0.5 inches per second, at least 0.75 inches per second, at least 1 inch per second, or even at least 2 inches per second. In still further embodiments, the compaction speed can be no greater than 20 inches per second, no greater than 10 inches per second, no greater than 8 inches per second, or even no greater than 5 inches per second. Moreover, the compaction speed can be in a range of any of the minimum and maximum values described above, such as in a range of 1 inch per second to 10 inches per second. It is further to be understood that the compaction speeds provided above can be used for the first end and/or the second end.

In certain embodiments, the first end can be in a fully extend state while the raw material mixture is being added to the preform tube 200. This way, the distance the resin has to fall during loading can be minimized. Furthermore, during addition of the resin, the piston head at the first end can be retracted to accommodate the raw material mixture that is being added in the preform tube 200.

In further embodiments, after the compaction cycle has completed, and the desired pressure has been reached, no further movement of the first piston head and/or the second piston head toward the compressed mixture can occur. In other words, in certain embodiments, the compressed preform may not be moved within the preform tube after compression and before placing the preform tube in communication with the die. It was surprisingly discovered that any movement toward the compressed mixture after the compression cycle has been completed can result in the entire mixture from falling out of the preform tube during translation. As will be discussed in more detail below, the first end can be open during translation to enable fluid communication of the preform with the die.

Referring again to FIG. 1, the methods of forming a PTFE article described herein can further include translating the preform into communication with the die 40.

Figure 8:
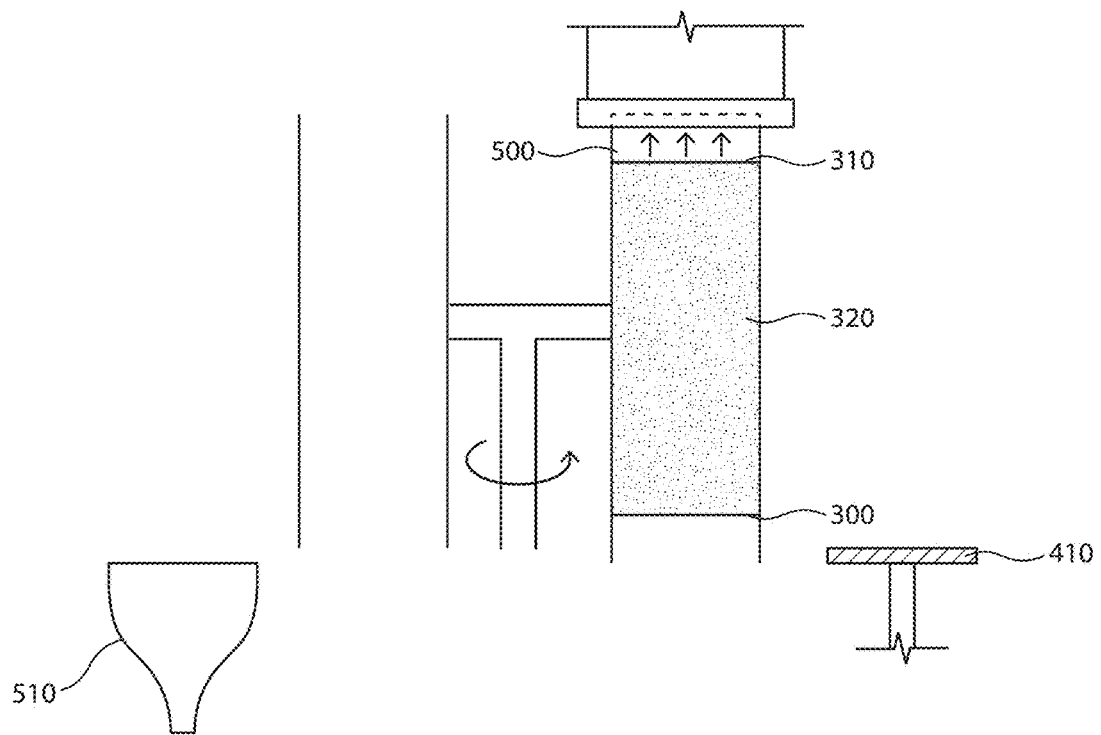
FIG. 8 illustrates a section view of a translation and extrusion apparatus during translation into communication with an extrusion die after compaction according to an embodiment.

Referring now to FIG. 8, which illustrates one embodiment of a set up for translating preforms from a compaction step to a paste extrusion step, during translation, the first end 300 of the preform tube 200 can be open such that there is no physical member keeping the compacted mixture 320 from falling out. In other words, the compacted mixture 320 can remain in a compacted state without being supported from the bottom. The first end 300 can be open during translation so that the preform tube 200 can be connected to the die 510 and in fluid communication with the die 510 and thus push the compressed mixture through the die to be paste extruded.

Figure 9:
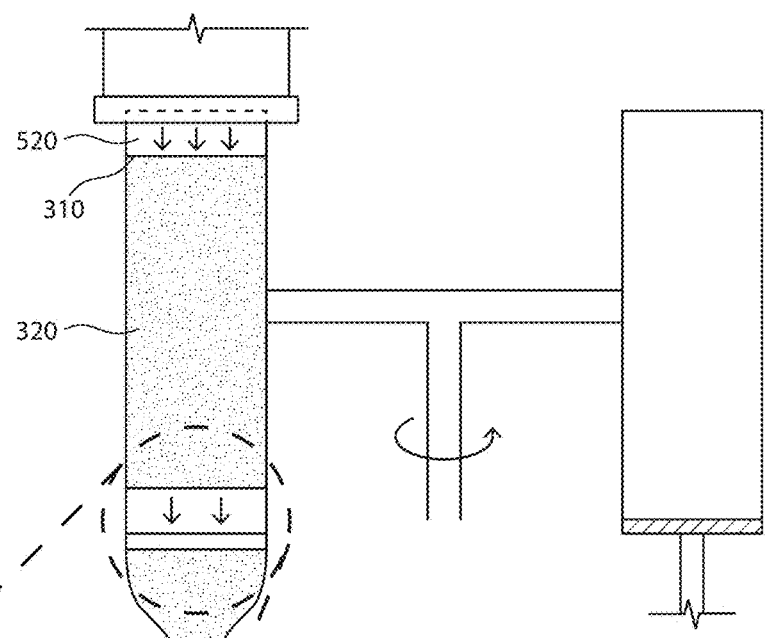
FIG. 9 illustrates a section view of a translation and extrusion apparatus after translation and in communication with an extrusion die according to an embodiment.

Referring again to FIG. 8, in certain embodiments, during translation, a vacuum pressure 500 can be applied to the second end 310 to aid in holding the compacted mixture 320 within the preform tube 200. Referring to FIG. 9, once the first end 300 of the preform tube 200 is aligned with the die 510 and in communication with the die 510, the vacuum pressure can be released. In certain embodiments, a positive pressure 520 can be applied to the second end 320 to push the compressed PTFE mixture in the preform tube to move into the die 510, and optionally contact a compressed PTFE mixture from the previous preform, when present.

Figure 10:
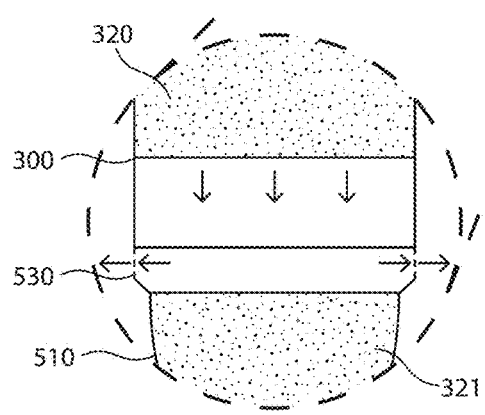
FIG. 10 illustrates a close up view of the interface between a compacted mixture and the extrusion die after translation according to an embodiment.

As further illustrated in FIG. 10, when the preform moves into the die, a pressure release structure 530 can be attached at the interface between the preform tube 200 and the die 510 to allow trapped air or gases to be expelled such that the compressed PTFE mixture 320 can make intimate contact with the remaining compressed PTFE mixture from the previous preform 321, if present. It was surprisingly discovered that the release of the air at the interface during flow of the compacted mixture into the die can improve the dimensional and physical properties, and in particular, the variation of those properties in an extruded PTFE article.

Figure 11A:
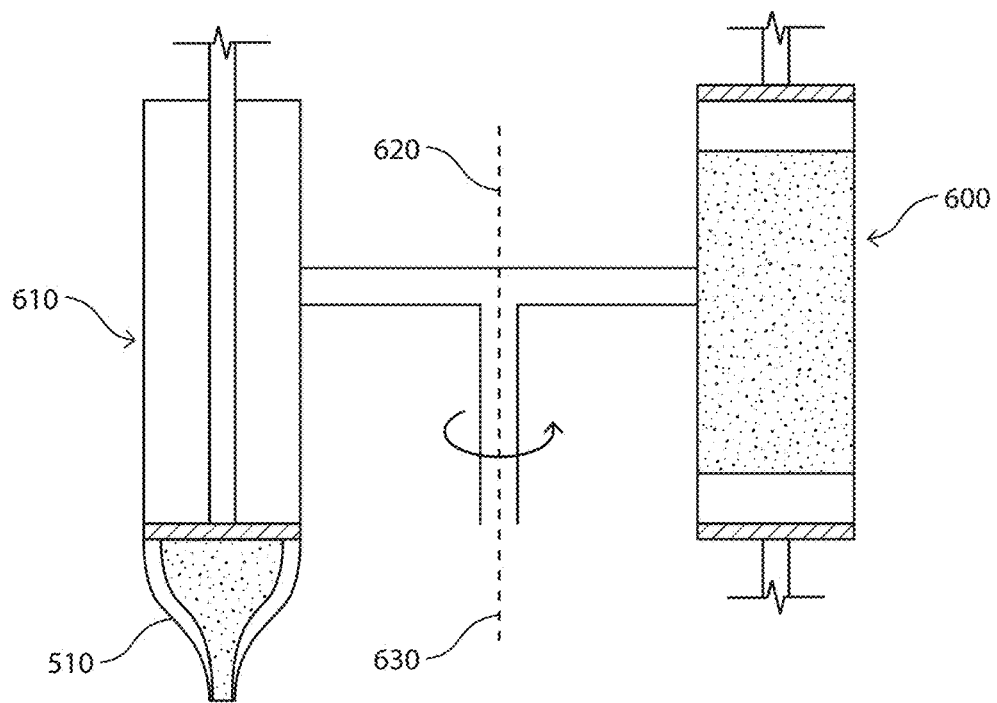
FIG. 11A illustrates a section view of a translation and extrusion apparatus showing simultaneous extrusion and compaction according to an embodiment.

Referring now to FIG. 11A, in certain embodiments, particularly embodiments directed to semi-continuous paste extrusion of a PTFE article, translating can include translating a first preform tube 600 into communication with a die 510 and simultaneously translating a second preform tube 610 out of communication with the die 510. For example, the first preform tube 600 can be spaced apart from a second preform tube 610 and the first and second preform tubes 600, 610 can be physically coupled or connected, such as by a supporting member 620. The first and second preform tubes 600, 610 can simultaneously translate by rotating the connected first and second preform tubes about a central axis 630. During such rotation, the preform tubes can remain in their general orientation, such as in a vertical orientation relative to a level surface. In other words, during such rotation, the first end 300 of the preform tube 200 can remain at a lower elevation than the second end 310 of the preform tube 200.

Referring again to FIG. 1, the method of forming a PTFE article described herein can further include extruding the preform from the preform tube. For example, a piston 700 can be arranged to force the compacted mixture 320 (i.e., preform) through the die and through the die opening. Paste extrusion differs from traditional extrusion in that the material being extruded is not melt-processable and does not flow when heated above its melting point. Instead, the compacted raw material mixture is pushed through a die.

Figure 11B:
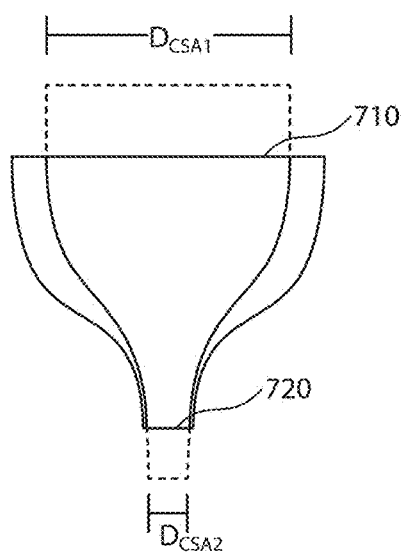
FIG. 11B illustrates a section view of an extrusion die according to an embodiment.

FIG. 11B illustrates one example of a die 510 according to certain embodiments. The die 510 can have a first cross-sectional area $D_{CSA1}$ at a first opening 710, nearest the first end of the preform tube (when connected), and a second cross-sectional area $D_{CSA2}$ at a second opening 720. The second opening 720 being opposite the first opening 710 of the die 510. The first cross-sectional area $D_{CSA1}$ at the first opening 710 can be greater than the cross-sectional area $D_{CSA2}$ at the second opening 720. This metric is often referred to as the "reduction ratio." The reduction ratio is a measure of the amount of compaction of the raw material that occurs during extrusion in the die.

In embodiments described herein, the die can have a ratio of the first cross-sectional area to the second cross-sectional area (reduction ratio) of at least 50, at least 60, at least 70, at least 80, at least 85, or even at least 90. Further, a ratio of the first cross-sectional area to the second cross-sectional area can be no greater than 200, no greater than 160, no greater than 120, or even no greater than 105. In particular, a ratio of the first cross-sectional area to the second cross-sectional area can be in a range of any of the minimum and maximum values described above, such as in a range of 50 to 200, 60 to 160, or even 80 to 120.

Without wishing to be bound by theory, the inventors discovered that using a die having a reduction ratio as detailed below resulted in improvements in the physical properties and dimensional stability of the PTFE article. Traditional paste extrusion involving preforms having a loading of PTFE of about 3 lbs or less incorporate a die having a reduction ratio of below about 50. It was heretofore unknown that increasing the reduction ratio to the values discussed below could or would improve the PTFE article's physical properties and dimensional stability, especially with the large preforms discussed herein.

Referring again to FIG. 1, certain embodiments of methods of forming a PTFE article described herein can further include calendering 70 the PTFE article after extrusion. Calendering reduces the thickness of the PTFE article by feeding the article through a set of rollers having a predetermined gap therebetween which is smaller than the nominal thickness of the PTFE article before calendering, as is well understood in the art.

In certain embodiments, the PTFE article can have a first average thickness, before calendering, and a second average thickness after calendering. The second average thickness is less than the first average thickness. One useful parameter to describe the calendering operation is the ratio of the first thickness to the second thickness. In certain embodiments, a ratio of the first thickness to the second thickness can be at least 1.1, at least 1.5, at least 2, at least 2.5, or even at least 3. Further, a ratio of the first thickness to the second thickness can be no greater than 20, no greater than 15, or even no greater than 10. In particular embodiments, a ratio of the first thickness to the second thickness can be in a range of any of the minimum and maximum values described above, such as in a range of 1.1 to 20, 2 to 15, or even 2.5 to 10.

In further embodiments, more than one calendering operation can be performed. For example, in certain embodiments, a method of forming a PTFE article can include one or more calendering steps, such as, at least 1 or even at least 2 calendering steps. When at least 2 calendering steps are used, in certain embodiments, the at least 2 calendering steps can be sequential, or having intervening steps therebetween.

Referring again to FIG. 1, the methods of forming a PTFE article described herein can further include drying 80 the PTFE article to remove or drive off the lubricant. Drying can be accomplished by any useful method, and in certain embodiments, includes contacting the PTFE article with pressurized, heated drums. In particular embodiments, drying is conducted such that less than 5% by weight, less than 3% by weight, less than 1% by weight, or is even essentially none of the lubricant remains in the PTFE article.

Referring again to FIG. 1, after drying, the article can be wound 90 into a roll as is understood in the art.

Typically, after winding, the roll can be cut lengthwise to substantially reduce the width variation of the PTFE article. In fact, a particular advantage of the present disclosure, as will be described in more detail below, is the achievement of a low width variation in the PTFE article. Having a low width variation is desirable as it can reduce the amount of waste or loss which traditionally occurs in the manufacture of PTFE articles, typically referred to as the yield loss or widthwise yield loss.

In certain embodiments, the methods described herein can further include an expanding operation as is understood in the art. Expanded or low-density PTFE articles can include any PTFE article which has been manipulated to reduce the density of the PTFE article as is commonly understood in the art. For example, a PTFE article can be uniaxially or biaxially expanded. Further, a PTFE article can be expanded in the machine-direction and/or cross machine direction. As a specific example, expansion operations can include stretching a PTFE article on a low density stretcher and expanding at a high temperature in the machine direction to a final desired thickness and specific gravity. Expanded PTFE articles can be used in wire or cable assemblies, and in particular, coaxial cables as described in more detail below. In very particular embodiments, the cable or wire assemblies, and particularly the coaxial cable assemblies can be used in an aircraft.

Another aspect of the present disclosure is directed to a PTFE article, and particularly to a PTFE article constructed according the methods described above. As discussed in detail herein, a particular advantage of the present disclosure is the construction of a PTFE article having superior dimensional stability (i.e. low variation) and performance stability, particularly over long lengths. Traditional paste extruded PTFE article production for long lengths was accomplished by successively paste extruding small preforms. While the successive paste extrusion of small preforms allowed for formation of a continuous article over longer lengths, the area where the two preforms met resulted in a noticeable and measurable joint or seam in the extruded PTFE article. These joints or seams often have weak mechanical and electrical properties and can cause extreme deviations and variation in the PTFE dimensional parameters. In many industries and uses, and particularly in cabling or wire assemblies in the aerospace field, such weak mechanical properties and deviations in dimensional parameters are increasingly undesirable and often wholly unacceptable. Accordingly, the inventors have discovered novel methods, as discussed in detail above, to form a novel PTFE article that has superior mechanical properties and dimensional stability, particularly over long lengths. While the improvements over long lengths are extremely significant, it is further noted that the methods described above have also unexpectedly realized improvement in mechanical properties and dimensional stability regardless of the length.

Figure 12A:
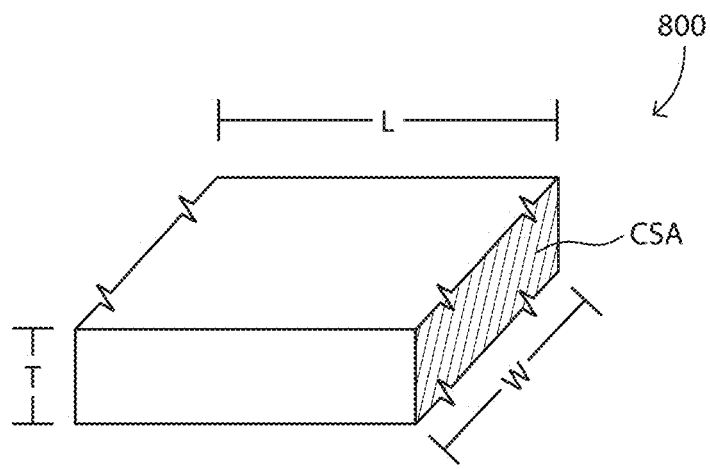
FIG. 12A illustrates a perspective view of a segment of PTFE article according to an embodiment.

The PTFE article described herein can have a number of different desired dimensions depending on the intended use. Referring to FIG. 12A, which illustrates a segment of PTFE article 800, the PTFE article described herein can have a length L, a width W, a thickness T, and a cross-sectional area CSA. The length is also referred to as the machine direction, and the width is also referred to as the cross direction. The cross-sectional area CSA can be determined by multiplying the width and the thickness at a given point along the length.

The length can be greater than the width, and the width can be greater than the thickness. In particular embodiments, a ratio of the length to the width can be at least 100, at least 500, at least 1,000, or even, at least 5,000. Further a ratio of the length to the width can be no greater than 1,000,000, no greater than 100,000, or even no greater than 50,000. Moreover, in particular embodiments, the PTFE article can have a ratio of its length to its width in a range of any of the minimum and maximum values described above, such as in a range of 5,000 to 50,000.

In further particular embodiments, a ratio of the width to the thickness can be at least 50, at least 100, or even at least 1,000. Further, a ratio of the width the thickness can be no greater than 50,000, no greater than 25,000, or even no greater than 10,000. Moreover, in particular embodiments, the PTFE article can have a ratio of its width to its thickness in a range of any of the minimum and maximum values described above, such as in a range of 100 to 10,000.

In certain embodiments, the PTFE article described herein can have a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters. In particular embodiments, the PTFE article described herein can have a continuous length of at least 320 meters. In further embodiments, the PTFE article described herein can have a continuous length of no greater than 10,000 meters, no greater than 6,000 meters, or even no greater than 3,000 meters. In particular embodiments, the PTFE article can have a continuous length in a range of any of the minimum and maximum values described above, such as, 60 meters to 10,000 meters or even 320 meters to 6,000 meters.

In certain embodiments, the PTFE article can have an average, uncut width of at least 0.001 meters, at least 0.01 meters, at least 0.1 meters or even at least 0.2 meters. In further embodiments, the PTFE article can have an average, uncut width of no greater than 2 meters, no greater than 1 meter, or even no greater than 0.5 meters. In particular embodiments, the PTFE article can have an average, uncut width in a range of any of the minimum and maximum values described above, such as, in a range of 0.001 meters to 2 meters, or even 0.2 meters to 0.5 meters.

The nominal width values described above are referred to as an "uncut width." In further embodiments, the width values described herein can be for a finished or cut width. Traditionally, after completion of the finishing operations, i.e., calendering and drying, the article can be cut along its length to reduce the width of the PTFE article as described above. For example, the width of the article can first be trimmed or cut to reduce the amount of width variation along the length of the roll. In this type of operation, care is taken to cut the entire roll to match the smallest width seen along the length to thereby greatly diminish any width variation. In fact, a particular advantage of the present disclosure is the reduction in yield loss resulting from an improved width variation. The yield loss can be calculated as a weight percentage of the usable material from the as extruded material. For example, the yield loss can be calculated according to the following equation:

$$YL=((M_B-M_A)/(M_B))*100\%$$

wherein YL refers to Yield Loss, $M_B$ refers to the mass of the PTFE roll before cutting, and $M_A$ refers to the mass of the PTFE roll after cutting.

In certain embodiments, the PTFE article described herein can have a widthwise yield loss (also known as the cross-direction yield loss) of no greater than 20%, no greater than 18%, no greater than 16%, no greater than 14%, no greater than 12%, no greater than 10%, no greater than 8%, or even no greater than 7%, or still even no greater than 5%. In even further embodiments, the PTFE article described herein can have a widthwise yield loss at least 1% or even at least 3%. In even further embodiments, the PTFE article described herein can have a widthwise yield loss in a range of any of the minimum and maximum values described above, such as in a range of 1% to 20%, or even in a range of 1% to 10%.

In certain embodiments, the PTFE article can have a mean average thickness of no greater than 1,000 microns, no greater than 500 microns, no greater than 250 microns, no greater than 200 microns, no greater than 150 microns, no greater than 125 microns, no greater than 100 microns, no greater than 75 microns, or even no greater than 60 microns across the continuous length. In further embodiments, the PTFE article can have a mean average thickness of at least 0.1 microns, at least 1 micron, at least 5 microns, at least 10 microns, at least 20 microns, at least 30 microns, or even at least 40 microns. In particular embodiments, the PTFE article can have a mean average thickness in a range of any of the minimum and maximum values described above, such as, in a range of 0.1 microns to 1,000 microns, or even 1 micron to 500 microns. It is particularly noted that embodiments described herein can achieve a very low thickness variation as described below at very low thicknesses.

As discussed above, a particular advantage of the present disclosure is the reduction and even elimination of joints or seams along various lengths. In certain embodiments, the PTFE article can have no more than 5 joints, no more than 4 joints, no more than 3 joints, no more than 2 joints, no more than 1 joint, or is even essentially joint free. Further, the PTFE article can have no more than 5 joints, no more than 4 joints, no more than 3 joints, no more than 2 joints, no more than 1 joint, or is even essentially joint free over any of the continuous lengths described above, such as a continuous length of 60 meters, 100 meters, 250 meters, 320 meters, 500 meters, 750 meters, 1,000 meters, 1,250 meters, 1,500 meters, 1,750 meters, or even 2,000 meters. In very particular embodiments, the PTFE can be essentially joint free over a continuous length of at least 100 meters, or even at least 300 meters, or even at least 1,500 meters.

Many different features described above have enabled achievement of a significantly improved total thickness variation described below, particularly along the continuous lengths described above. The total thickness variation is the difference between the maximum thickness and minimum thickness along a given length of the article. To determine the total thickness variation, individual thickness measurements can be taken at various points along the length and width. For example, in the methods and examples described herein, the sampling frequency was 10 measurements per second, and the web speed varied between 90 to 200 feet per minute. The results are analyzed to find the minimum thickness and the maximum thickness. The total thickness variation can then be calculated by subtracting the minimum thickness from the maximum thickness. The individual thickness measurements can be measured by, for example, shadowcasting techniques, a drop gauge, or any other useful method to measure a thickness. The measurements can be taken at multiple points across the width. For example, in the methods and examples described herein, measurements were taken at 1.5 inches from each edge of the PTFE article.

In certain embodiments, the PTFE article described herein can have a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns. In further embodiments, the PTFE article can have a total thickness variation of at least 0.1 microns, at least 1 micron, or even at least 2 microns. In particular embodiments, the PTFE article can have a total thickness variation in a range of any of the minimum and maximum values described above, such as, in a range of 0.1 microns to 20 microns, or even 1 micron to 16 microns, or even 2 microns to 10 microns.

In particular, it is to be understood that the total thickness variation values described above can apply over a continuous length as described above, such as a length of 60 meters, 100 meters, 250 meters, 320 meters, 500 meters, 750 meters, 1,000 meters, 1,250 meters, 1,500 meters, 1,750 meters, or even 2,000 meters. It is to be understood that the PTFE article does not have to be the exact length described above, just that the recited thickness variation applies over the specified length.

Further, it is to be understood that the total thickness variation values described above are independent of the total mean average thickness and can apply at the various different mean average thicknesses as described above. For example, in particular embodiments, the PTFE article can have a total thickness variation of less than 20 microns and a mean average thickness in a range of 30 microns to 500 microns, or even 30 microns to 130 microns. In fact, a particular advantage of embodiments of the present disclosure is the achievement of the low total thickness variations described herein at particularly low mean average thicknesses described herein.

In certain embodiments, the thickness variation can also be described as a percent variance from the mean average thickness. The percent thickness variation can be calculated as follows:

$$\% \text{ TV} = +/-((\text{TTV}/2)/(T_{AVG}))*100\%$$

wherein % TV represents percent thickness variation; TTV represents total thickness variation, as described above; and $T_{AVG}$ represents the mean average thickness variation.

For example, an article that has a total thickness variation of 20 microns, and a mean average thickness of 50 microns, would have a percent thickness variation of +/−20%. As a further example, an article that has a total thickness variation of 5 microns, and a mean average thickness of 50 microns, the article would have a percent thickness variation of 5%. As a third example, an article that has a total thickness variation of 20 microns, and a mean average thickness of 120 microns, the article would have a percent thickness variation of 8.3%.

In certain embodiments of the present disclosure, the PTFE article can have a percent thickness variation of less than 20%, no greater than 18%, no greater than 16%, no greater than 14%, no greater than 12%, no greater than 10%, no greater than 8%, no greater than 6%, or even no greater than 5%. In particular embodiments, the PTFE article can have a percent thickness variation of less than 20%, no greater than 10%, or even no greater than 5%.

The PTFE article can have the recited percent thickness variation over any of the continuous lengths described above, such as a length of 60 meters, 100 meters, 250 meters, 320 meters, 500 meters, 750 meters, 1,000 meters, 1,250 meters, 1,500 meters, 1,750 meters, or even 2,000 meters. It is to be understood that the PTFE article does not have to be the exact length described above, just that the recited thickness variation applies over the specified length.

The PTFE article can have the recited % thickness variation at any of the different ranges of mean average thicknesses discussed above. In particular embodiments, the PTFE article can have a percent thickness variation of less than 20%, no greater than 10%, or even no greater than 5% and a mean average thickness in a range of 20 microns to 150 microns. In even more particular embodiments, the PTFE article can have a percent thickness variation of less than 20%, no greater than 10%, or even no greater than 5% and a mean average thickness of less than 80 microns. A very particular advantage of the aspects of the present disclosure is the achievement of the improved thickness variation at low mean average thicknesses, such as mean average thicknesses of less than 250 microns, and particularly less than 150 microns, such as less than 100 microns or even less than 80 microns.

Another way to characterize the improved thickness variation is the standard deviation of the average thickness. The average thickness can be calculated as described herein. In certain embodiments, the standard deviation of the average thickness can be no more than 2.3 microns, no more than 2.2 microns, no more than 2.1 microns, no more than 2.0 microns, no more than 1.9 microns, no more than 1.8 microns, no more than 1.7 microns, no more than 1.6 microns, no more than 1.5 microns, no more than 1.4 microns, no more than 1.3 microns, no more than 1.2 microns, no more than 1.1 microns, no more than 1 microns, or even no more than 0.9 microns over a continuous length of 60 meters, 100 meters, 250 meters, 320 meters, 500 meters, 750 meters, 1,000 meters, 1,250 meters, 1,500 meters, 1,750 meters, or even 2,000 meters. In further embodiments, the standard deviation of the average thickness can be at least 0.01 microns, or even at least 0.1 microns, or even at least 0.2 microns. Moreover, in certain embodiments, the standard deviation of the average thickness can be in a range between any of the maximum and minimum values provided above. In very particular embodiments, the PTFE article can have a standard deviation of average thickness of less than 2.3 microns over a continuous length of 80 meters. In still even further very particular embodiments, the PTFE article can have a standard deviation of average thickness of less than 1.5 microns over a continuous length of 320 meters. It is further to be understood that the standard deviation of the average thickness values described above can be present at any of the mean average thicknesses recited herein, such as less than 250 microns.

Yet another way to characterize the improvements in the PTFE article is the article's maximum low spot thickness. Similar to the thickness variation, the maximum low spot thickness is determined relative to the mean average thickness. The maximum low spot thickness can be calculated as follows:

$$\text{Maximum Low Spot Thickness} = (T_{AVG} - T_{MIN}) / (T_{AVG}) * 100\%$$

where $T_{AVG}$ refers to the mean average thickness over a particular length and $T_{MIN}$ refers to the lowest thickness over the same length. In certain embodiments of the present disclosure, the PTFE article can have a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5%. In particular embodiments, the PTFE article can have a maximum low spot thickness of less than 20%, no greater than 10%, or even no greater than 5%.

The PTFE article can have the recited maximum low spot thickness over any of the continuous lengths described above, such as a length of 60 meters, 100 meters, 250 meters, 320 meters, 500 meters, 750 meters, 1,000 meters, 1,250 meters, 1,500 meters, 1,750 meters, or even 2,000 meters. It is to be understood that the PTFE article does not have to be the exact length described above, just that the recited thickness variation applies over the specified length.

The PTFE article can have the recited maximum low spot thickness at any of the different ranges of mean average thicknesses discussed above. In particular embodiments, the PTFE article can have a percent thickness variation of less than 20%, no greater than 10%, or even no greater than 5% and a mean average thickness in a range of 20 microns to 250 microns. In even more particular embodiments, the PTFE article can have a maximum low spot thickness of less than 20%, no greater than 10%, or even no greater than 5% and a mean average thickness of less than 80 microns. A very particular advantage of the aspects of the present disclosure is the achievement of the improved maximum low spot thickness at very low thicknesses, such as at average thicknesses of less than 50 microns.

The cross-sectional area of the PTFE article can be determined by multiplying the width by the thickness at a given point along the length.

In certain embodiments, the mean average cross-sectional area of the PTFE article along a given length can be at least 0.01 cm$^2$, 0.02 cm$^2$, or even at least 0.035 cm$^2$. In further embodiments, the PTFE article can have a mean average cross-sectional area of the PTFE along a given length of no greater than 2 cm$^2$, no greater than 1.0 cm$^2$ no greater than 1.5 cm$^2$, no greater than 1 cm$^2$, or even no greater than 0.8 cm$^2$. In even further embodiments, the PTFE article can have a mean average cross-section area of the PTFE article along a given length in a range of any of the minimum and maximum values described above, such as in a range of 0.01 cm$^2$ to 2 cm$^2$, or even 0.035 cm$^2$ to 1.9 cm$^2$. It is to be understood that the mean average cross-sectional area of the PTFE article is measured before any cutting or trimming operation in the widthwise direction.

In certain embodiments, the PTFE article described herein can have an average specific gravity of at least 1.4, at least 1.45, at least 1.51, or even at least 1.6 along a length of the PTFE article. In further embodiments, the PTFE article described herein can have an average specific gravity of no greater than 2.5, no greater than 2.2, no greater than 2.0, no greater than 1.9, or even no greater than 1.8. In particular embodiments, the PTFE article can have an average specific gravity in a range of any of the minimum and maximum values described above, such as in a range of 1.4 to 2.5, 1.51 to 2.0, or even 1.6 to 1.9.

In certain embodiments, the PTFE article can have a particular porosity, which can be quantified by Gurley Permeability. Gurley permeability measures the time for a volume of air to flow through a sheet of material. The Gurley tester is well known in the paper industry, and a higher value indicates a less permeable sheet. The Gurley permeability can be measured according to JIS P 8117. In certain embodiments, a PTFE article described herein can have an average Gurley Permeability of at least 10 seconds, at least 25 seconds, at least 50 seconds, at least 60 seconds, at least 70 seconds, at least 75 seconds, at least 80 seconds, at least 85 seconds, or even at least 90 seconds. In further embodiments, the PTFE article described herein can have an average Gurley Permeability of no greater than 500 seconds, no greater than 200 seconds, or even no greater than 100 seconds, or even no greater than 80 seconds. In particular embodiments, the PTFE article described herein can have an average Gurley Permeability in a range of any of the minimum and maximum values described above, such as in a range of 10 seconds to 80 seconds.

One useful parameter to describe the quality of a PTFE article is its machine direction tensile stress at a maximum load, which characterizes the PTFE article's mechanical strength in the machine direction. The machine direction tensile stress at a maximum load is commonly used and understood by one of ordinary skill in the art. The values of the machine direction tensile stress at a maximum load described herein are measured with an Instron tensile tester in accordance with ASTM-D882.

In certain embodiments, the machine direction tensile stress at a maximum load can be at least 1,900 psi, at least 2,100 psi, at least 2,300 psi, or even at least 2,500 psi. In further embodiments, the machine direction tensile stress at a maximum load can be no greater than 10,000 psi, no greater than 9,000 psi, or even no greater than 7,000 psi. In particular embodiments, the machine direction tensile stress at a maximum load can be in a range of any of the minimum and maximum values described above, such as, in a range of 1,900 psi to 10,000 psi, 2,100 psi to 9,000 psi, or even 2,300 psi to 7,000 psi.

Another useful parameter to describe the quality of a PTFE article is its cross-direction elongation to break, which characterizes the PTFE article's mechanical strength in the cross-machine direction. The cross-direction elongation to break is commonly used and understood by one of ordinary skill in the art. The values of the cross-direction elongation to break described herein are measured with an Instron tensile tester in accordance with ASTM-D882.

In certain embodiments, the PTFE article can have a cross-direction elongation to break of at least 500%, at least 600%, at least 800%, at least 900%. In further embodiments, the PTFE article can have a cross-direction elongation to break of no greater than about 1000%. In particular embodiments, the PTFE article can have a cross-direction elongation to break in a range of any of the minimum and maximum values described above, such as in a range of 600% to 1000%.

Another particular advantage of the present disclosure is the low variability of the cross-direction elongation to break at various locations across the width of the PTFE article. For example, as described in more detail herein, after extruding and finishing a PTFE article, the article is often cut lengthwise to generate multiple articles having a smaller width than the original article. Thus, it is desired to have a consistency of the cross-direction elongation to break between the outer ends and the middle of the PTFE article so there is consistency between the multiple cut rolls having a smaller width.

In certain embodiments, the PTFE article described herein can have a total variability between the outer ends and the middle of no greater than 20%, no greater than 15%, no greater than 10%, or even no greater than 5%. To measure the total variability of the cross-direction elongation to break, measurements are taken at the middle of the roll before cutting and at a point which is 10% of the total width from both outer ends. The total variability of the cross-direction elongation to break can then be determined by subtracting the maximum from the minimum, dividing by the average, and multiplying by 100%.

Other useful parameters to describe the effectiveness of the PTFE article described herein, particularly when it is employed in an electrical assembly, such as a cable or wire assembly and particularly in a coaxial cable, is the dielectric constant and loss tangent of the PTFE article, and even more particularly the variability of the dielectric constant and loss tangent over a given length of the PTFE article.

The dielectric constant ($\square_r$) of a PTFE article is a measure of the capacitance of a construction using the PTFE article as a dielectric, compared to the capacitance of a similar construction in which the dielectric is a vacuum. The loss tangent (tan $\square$) of the PTFE article, also called the dissipation factor, is a measure of the energy dissipated by the PTFE article when in an oscillating electric field. Specifically, it is a determination of the degree to which the phase difference between the current and the voltage of the charge motion generated in the PTFE article by an oscillating field in an adjacent conductor is shifted from 90 degrees. It is expressed as the tangent of the angular phase difference. The dielectric constant of the PTFE article employed as the dielectric material in a coaxial cable determines the speed at which an electrical signal will travel in that coaxial cable. Signal propagation speed is expressed relative to the speed of light in a vacuum, which is roughly $3.0 \times 10^{10}$ cm/sec. The dielectric constant of a hard vacuum (space) is defined as 1.00. Higher dielectric constants will result in slower signal propagation speed. Loss tangent is a measure of how much of the power of a signal is lost as it passes along a transmission line on a dielectric material. Testing of the dielectric constant can be conducted at frequencies of 1 MHz and 20 GHz. At 1 MHz, the dielectric constant can be measured according to the guidelines of ASTM D-150. In particular, the dielectric constant can be measured using a parallel-plate test fixture with 38 mm diameter electrodes. The electric field can be linear and perpendicular to the plane of the samples. At 20 GHz, testing can be conducted using the guidelines of IPC-TM-650-2.5.5.13 Relative Permittivity and Loss Tangent Using a Split=Cylinder Resonator in accordance with the guidelines of D2520-01. Results can be obtained using a split-cylinder cavity resonator and National Institute of Standards and Technology (NIST) SplitC Version 1.0 software. All measurements can be conducted under ambient conditions of 25 degrees Celsius and 48% Relative Humidity (RH). Each test sample can be comprised of two or more 2 inch by 2 inch pieces of film. Using multi-piece stacks can improve measurement accuracy.

In certain embodiments, a PTFE article described herein can have an average dielectric constant of no greater than 3, no greater than 2.7, no greater than 2.5, no greater than 2.3, no greater than 2.1, no greater than 1.9, no greater than 1.7, or even no greater than 1.5. Further, a PTFE article described herein can have an average dielectric constant of at least 0.5, at least 1, or even at least 1.3. In particular embodiments, a PTFE article described herein can have an average dielectric constant in a range of any of the minimum and maximum values described above, such as in a range of 1 to 3.

Further, another useful measure of the performance of a PTFE article described herein is the total dielectric constant variation along a given length. To determine the total dielectric constant variation along a given length, the dielectric constant is measured as discussed above at an interval of 5 meters over the specified length. The measurements are then analyzed to determine the minimum dielectric constant and the maximum dielectric constant over the given length. The total dielectric constant variation along a given length is then calculated as the difference between the minimum and maximum dielectric constant.

In certain embodiments, a PTFE article described herein can have a total dielectric constant variation of no greater than 1, no greater than 0.8, no greater than 0.6, no greater than 0.5, no greater than 0.4, no greater than 0.3, no greater than 0.2, no greater than 0.1, or even no greater than 0.05. Further, a PTFE article described herein can have a total dielectric constant variation of at least 0.005, or even no greater than 0.01. In particular embodiments, a PTFE article described herein can have a total dielectric constant variation in a range of any of the minimum and maximum values described above, such as in a range of 0.01 to 0.5.

In certain embodiments, the PTFE article described herein can have an average dielectric constant and/or a total dielectric constant variation as recited above over a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters. In particular embodiments, the PTFE article described herein can have an average dielectric constant and/or a total dielectric constant variation as recited above over a continuous length of at least 320 meters. In further embodiments, the PTFE article described herein can have an average dielectric constant and/or a total dielectric constant variation as recited above over a continuous length of no greater than 10,000 meters, no greater than 6,000 meters, or even no greater than 3,000 meters. In particular embodiments, the PTFE article can have an average dielectric constant and/or a total dielectric constant variation as recited above over a continuous length in a range of any of the minimum and maximum values described above, such as, 60 meters to 10,000 meters or even 320 meters to 6,000 meters.

In certain embodiments, the PTFE article described herein can have an average loss tangent (dissipation factor (tan δ)) of no greater than 0.0003, no greater than 0.0002, no greater than 0.00013, no greater than 0.0001, no greater than 0.00005, no greater than 0.00002, or even no greater than 0.00001, or even no greater than 0.000005. In further embodiments, the PTFE article described herein can have an average loss tangent (dissipation factor (tan δ)) of at least 0.00000001 or even at least 0.0000001. Moreover, the PTFE article described herein can have an average loss tangent (dissipation factor (tan δ)) in a range of any of the minimum and maximum values described above, such as in a range of 0.0000001 to 0.0002.

Further, another useful measure of the performance of a PTFE article described herein is the loss tangent variation along a given length. To determine the loss tangent variation along a given length, the loss tangent is measured as discussed above at an interval of 5 meters over the specified length. The measurements are then analyzed to determine the minimum loss tangent and the maximum loss tangent over the given length. The loss tangent variation along a given length is then calculated as the difference between the minimum and maximum loss tangent, divided by the average loss tangent and multiplied by 100%.

In certain embodiments, the PTFE article described herein can have a loss tangent variation of no greater than 20%, no greater than 10%, no greater than 8%, or even no greater than 5%, no greater than 3%, no greater than 2%, no greater than 1%, or even no greater than 0.1%. Further, in certain embodiments, the PTFE article described herein can have a loss tangent variation of at least 0.001%, at least 0.01%, or even at least 0.1%. Moreover, in certain embodiments, the PTFE article described herein can have a loss tangent variation in a range of any of the minimum and maximum values described above, such as in a range of 0.01% to 8%, or even 0.1% to 5%. In certain embodiments, the PTFE article described herein can have an average loss tangent and/or a loss tangent variation as recited above over a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters. In particular embodiments, the PTFE article described herein can have an average loss tangent and/or a loss tangent variation as recited above over a continuous length of at least 320 meters. In further embodiments, the PTFE article described herein can have an average loss tangent and/or a loss tangent variation as recited above over a continuous length of no greater than 10,000 meters, no greater than 6,000 meters, or even no greater than 3,000 meters. In particular embodiments, the PTFE article can have an average loss tangent and/or a loss tangent variation as recited above over a continuous length in a range of any of the minimum and maximum values described above, such as, 60 meters to 10,000 meters or even 320 meters to 6,000 meters.

It is noted that the values of dielectric constant, dielectric constant variation, loss tangent, and loss tangent variation described above, can be obtained as measured in a low and/or high frequency of 1 MHz and 20 GHz respectively.

Figure 12B:
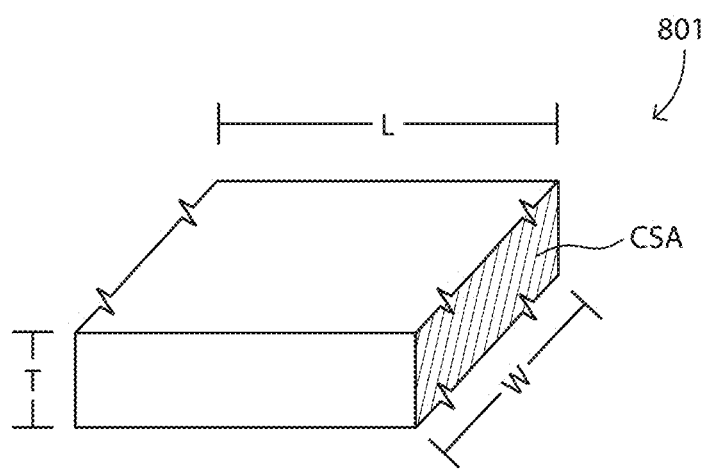
FIG. 12B illustrates a perspective view of a segment of expanded PTFE article according to an embodiment.

Another aspect of the present disclosure is directed to an expanded PTFE article, also referred to as ePTFE. The expanded PTFE article described herein can have a number of different desired dimensions depending on the intended use. Referring to FIG. 12B, which illustrates a segment of expanded PTFE article 801, the expanded PTFE article described herein can have a length L, a width W, a thickness T, and a cross-sectional area CSA. The length is also referred to as the machine direction, and the width is also referred to as the cross direction. The cross-sectional area CSA can be determined by multiplying the width and the thickness at a given point along the length.

The length can be greater than the width, and the width can be greater than the thickness. In particular embodiments, a ratio of the length to the width can be at least 100, at least 500, at least 1,000, or even, at least 5,000. Further a ratio of the length to the width can be no greater than 1,000,000, no greater than 100,000, or even no greater than 50,000. Moreover, in particular embodiments, the expanded PTFE article can have a ratio of its length to its width in a range of any of the minimum and maximum values described above, such as in a range of 5,000 to 50,000.

In further particular embodiments, a ratio of the width to the thickness can be at least 50, at least 100, or even at least 1,000. Further, a ratio of the width the thickness can be no greater than 50,000, no greater than 25,000, or even no greater than 10,000. Moreover, in particular embodiments, the expanded PTFE article can have a ratio of its width to its thickness in a range of any of the minimum and maximum values described above, such as in a range of 100 to 10,000.

In certain embodiments, the expanded PTFE article described herein can have a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters. In particular embodiments, the expanded PTFE article described herein can have a continuous length of at least 320 meters. In further embodiments, the expanded PTFE article described herein can have a continuous length of no greater than 10,000 meters, no greater than 6,000 meters, or even no greater than 3,000 meters. In particular embodiments, the expanded PTFE article can have a continuous length in a range of any of the minimum and maximum values described above, such as, 60 meters to 10,000 meters or even 320 meters to 6,000 meters.

In certain embodiments, the expanded PTFE article can have an average, uncut width of at least 0.001 meters, at least 0.01 meters, at least 0.1 meters or even at least 0.2 meters. In further embodiments, the expanded PTFE article can have an average, uncut width of no greater than 2 meters, no greater than 1 meter, or even no greater than 0.5 meters. In particular embodiments, the expanded PTFE article can have an average, uncut width in a range of any of the minimum and maximum values described above, such as, in a range of 0.001 meters to 2 meters, or even 0.2 meters to 0.5 meters.

The nominal width values described above are referred to as an "uncut width." In further embodiments, the width values described herein can be for a finished or cut width. Traditionally, after completion of the finishing operations, i.e. calendering, drying, and expansion, the article can be cut along its length to reduce the width of the expanded PTFE article as described above. For example, the width of the article can first be trimmed or cut to reduce the amount of width variation along the length of the roll. In this type of operation, care is taken to cut the entire roll to match the smallest width seen along the length to thereby greatly diminish any width variation. In fact, a particular advantage of the present disclosure is the reduction in yield loss resulting from an improved width variation. The yield loss can be calculated as a weight percentage of the usable material from the as extruded material. For example, the yield loss can be calculated according to the following equation:

$$YL=((M_B-M_A)/M_B))*100\%$$

wherein YL refers to Yield Loss, $M_B$ refers to the mass of the PTFE roll before cutting, and $M_A$ refers to the mass of the expanded PTFE roll after cutting.

In certain embodiments, the expanded PTFE article described herein can have a widthwise yield loss (also known as the cross-direction yield loss) of no greater than 20%, no greater than 18%, no greater than 16%, no greater than 14%, no greater than 12%, no greater than 10%, no greater than 8%, or even no greater than 7%, or still even no greater than 5%. In even further embodiments, the expanded PTFE article described herein can have a widthwise yield loss at least 1% or even at least 3%. In even further embodiments, the expanded PTFE article described herein can have a widthwise yield loss in a range of any of the minimum and maximum values described above, such as in a range of 1% to 20%, or even in a range of 1% to 10%.

In certain embodiments, the expanded PTFE article can have a mean average thickness of no greater than 1000 microns, no greater than 500 microns, no greater than 250 microns, no greater than 200 microns, no greater than 150 microns, no greater than 125 microns, no greater than 100 microns, no greater than 75 microns, or even no greater than 60 microns across the continuous length. In further embodiments, the expanded PTFE article can have a mean average thickness of at least 0.1 microns, at least 1 micron, at least 5 microns, at least 10 microns, at least 20 microns, at least 30 microns, or even at least 40 microns. In particular embodiments, the expanded PTFE article can have a mean average thickness in a range of any of the minimum and maximum values described above, such as, in a range of 0.1 microns to 1000 microns, or even 1 micron to 500 microns. It is particularly noted that embodiments described herein can achieve a very low thickness variation as described below at very low thicknesses.

As discussed above, a particular advantage of the present disclosure is the reduction and even elimination of joints or seams along various lengths. In certain embodiments, the expanded PTFE article can have no more than 5 joints, no more than 4 joints, no more than 3 joints, no more than 2 joints, no more than 1 joint, or is even essentially joint free. Further, the expanded PTFE article can have no more than 5 joints, no more than 4 joints, no more than 3 joints, no more than 2 joints, no more than 1 joint, or is even essentially joint free over any of the continuous lengths described above, such as a continuous length of 60 meters, 100 meters, 250 meters, 320 meters, 500 meters, 750 meters, 1,000 meters, 1,250 meters, 1,500 meters, 1,750 meters, or even 2,000 meters. In very particular embodiments, the expanded PTFE can be essentially joint free over a continuous length of at least 100 meters, or even at least 300 meters.

Many different features described above have enabled achievement of a significantly improved total thickness variation described below, particularly along the continuous lengths described above. The total thickness variation is the difference between the maximum thickness and minimum thickness along a given length of the expanded article. To determine the total thickness variation, individual thickness measurements can be taken at various points along the length and width. For example, in the methods and examples described herein, the sampling frequency was 10 per second, and the web speed varied between 90 to 200 feet per minute. The results are analyzed to find the minimum thickness and the maximum thickness. The total thickness variation can then be calculated by subtracting the minimum thickness from the maximum thickness. The individual thickness measurements can be measured by, for example, shadow-casting techniques, a drop gauge, or any other useful method to measure a thickness. The measurements can be taken at multiple points across the width. For example, in the methods and examples described herein, measurements were taken at 1.5 inches from each edge of the PTFE article. Measurements were taken after extrusion and before stretching. The dimensional tolerances achieved after extrusion were maintained after expansion.

In certain embodiments, the expanded PTFE article described herein can have a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns. In further embodiments, the expanded PTFE article can have a total thickness variation of at least 0.1 microns, at least 1 micron, or even at least 2 microns. In particular embodiments, the expanded PTFE article can have a total thickness variation in a range of any of the minimum and maximum values described above, such as, in a range of 0.1 microns to 20 microns, or even 1 micron to 16 microns, or even 2 microns to 10 microns.

In particular, it is to be understood that the total thickness variation values described above can apply over a continuous length as described above, such as a length of 60 meters, 100 meters, 250 meters, 320 meters, 500 meters, 750 meters, 1,000 meters, 1,250 meters, 1,500 meters, 1,750 meters, or even 2,000 meters. It is to be understood that the expanded PTFE article does not have to be the exact length described above, just that the recited thickness variation applies over the specified length.

Further, it is to be understood that the total thickness variation values described above are independent of the total mean average thickness and can apply at the various different mean average thicknesses as described above. For example, in particular embodiments, the expanded PTFE article can have a total thickness variation of less than 20 microns and a mean average thickness in a range of 30 microns to 500 microns, or even 30 microns to 130 microns.

In certain embodiments, the thickness variation can also be described as a percent variance from the mean average thickness. The percent thickness variation can be calculated as follows:

$$\% \ TV=+/-((TTV/2)/(T_{AVG}))*100\%$$

wherein % TV represents percent thickness variation; TTV represents total thickness variation, as described above; and $T_{AVG}$ represents the mean average thickness variation.

For example, an article that has a total thickness variation of 20 microns and a mean average thickness of 50 microns would have a percent thickness variation of +/−20%. As a further example, an article that has a total thickness variation of 5 microns and a mean average thickness of 50 microns would have a percent thickness variation of 5%. As a third example, an article that has a total thickness variation of 20 microns and a mean average thickness of 120 microns would have a percent thickness variation of 8.3%.

In certain embodiments of the present disclosure, the expanded PTFE article can have a percent thickness variation of less than 20%, no greater than 18%, no greater than 16%, no greater than 14%, no greater than 12%, no greater than 10%, no greater than 8%, no greater than 6%, or even no greater than 5%. In particular embodiments, the expanded PTFE article can have a percent thickness variation of less than 20%, no greater than 10%, or even no greater than 5%.

The expanded PTFE article can have the recited percent thickness variation over any of the continuous lengths described above, such as a length of 60 meters, 100 meters, 250 meters, 320 meters, 500 meters, 750 meters, 1,000 meters, 1,250 meters, 1,500 meters, 1,750 meters, or even 2,000 meters. It is to be understood that the expanded PTFE article does not have to be the exact length described above, just that the recited thickness variation applies over the specified length.

The expanded PTFE article can have the recited % thickness variation at any of the different ranges of mean average thicknesses discussed above. In particular embodiments, the expanded PTFE article can have a percent thickness variation of less than 20%, no greater than 10%, or even no greater than 5% and a mean average thickness in a range of 20 microns to 150 microns. In even more particular embodiments, the expanded PTFE article can have a percent thickness variation of less than 20%, no greater than 10%, or even no greater than 5% and a mean average thickness of less than 80 microns. A very particular advantage of the aspects of the present disclosure is the achievement of the improved thickness variation at very low mean average thicknesses, such as mean average thicknesses of less than 250 microns, less than 150 microns, less than 100 microns, or even less than 80 microns.

Another way to characterize the improved thickness variation is the standard deviation of the average thickness. The average thickness can be calculated as described herein. In certain embodiments, the standard deviation of the average thickness can be no more than 2.3 microns, no more than 2.2 microns, no more than 2.1 microns, no more than 2.0 microns, no more than 1.9 microns, no more than 1.8 microns, no more than 1.7 microns, no more than 1.6 microns, no more than 1.5 microns, no more than 1.4 microns, no more than 1.3 microns, no more than 1.2 microns, no more than 1.1 microns, no more than 1 micron, or even no more than 0.9 microns over a continuous length of 60 meters, 100 meters, 250 meters, 320 meters, 500 meters, 750 meters, 1,000 meters, 1,250 meters, 1,500 meters, 1,750 meters, or even 2,000 meters. In further embodiments, the standard deviation of the average thickness can be at least 0.01 microns, or even at least 0.1 microns, or even at least 0.2 microns. Moreover, in certain embodiments, the standard deviation of the average thickness can be in a range between any of the maximum and minimum values provided above. In very particular embodiments, the expanded article can have a standard deviation of average thickness of less than 2.3 microns over a continuous length of 80 meters. In still even further very particular embodiments, the expanded article can have a standard deviation of average thickness of less than 1.5 microns over a continuous length of 320 meters. It is further to be understood that the standard deviation of the average thickness values described above can be present at any of the mean average thicknesses recited herein.

Yet another way to characterize the improvements in the expanded PTFE article is the expanded article's maximum low spot thickness. Similar to the thickness variation, the maximum low spot thickness is determined relative to the mean average thickness. The maximum low spot thickness can be calculated as follows:

Maximum Low Spot Thickness=$(T_{AVG}-T_{MIN})/(T_{AVG})*100\%$ where $T_{AVG}$ refers to the mean average thickness over a particular length and $T_{MIN}$ refers to the lowest thickness over the same length. In certain embodiments of the present disclosure, the expanded PTFE article can have a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5%. In particular embodiments, the expanded PTFE article can have a maximum low spot thickness of less than 20%, no greater than 10%, or even no greater than 5%.

The expanded PTFE article can have the recited maximum low spot thickness over any of the continuous lengths described above, such as a length of 60 meters, 100 meters, 250 meters, 320 meters, 500 meters, 750 meters, 1,000 meters, 1,250 meters, 1,500 meters, 1,750 meters, or even 2,000 meters. It is to be understood that the expanded PTFE article does not have to be the exact length described above, just that the recited thickness variation applies over the specified length.

The expanded PTFE article can have the recited maximum low spot thickness at any of the different ranges of mean average thicknesses discussed above. In particular embodiments, the expanded PTFE article can have a percent thickness variation of less than 20%, no greater than 10%, or even no greater than 5% and a mean average thickness in a range of 20 microns to 250 microns. In even more particular embodiments, the expanded PTFE article can have a maximum low spot thickness of less than 20%, no greater than 10%, or even no greater than 5% and a mean average thickness of less than 80 microns. A very particular advantage of the aspects of the present disclosure is the achievement of the improved maximum low spot thickness at very low thicknesses, such as at average thicknesses of less than 50 microns.

The cross-sectional area of the expanded PTFE article can be determined by multiplying the width by the thickness at a given point along the length.

In certain embodiments, the mean average cross-sectional area of the expanded PTFE article along a given length can be at least 0.01 cm$^2$, 0.02 cm$^2$, or even at least 0.035 cm$^2$. In further embodiments, the expanded PTFE article can have a mean average cross-sectional area of the expanded PTFE along a given length of no greater than 2 cm$^2$, no greater than 1.5 cm$^2$, no greater than 1.4 cm$^2$, no greater than 1 cm$^2$, or even no greater than 0.8 cm$^2$. In even further embodiments, the expanded PTFE article can have a mean average cross-section area of the expanded PTFE article along a given length in a range of any of the minimum and maximum values described above, such as in a range of 0.01 cm$^2$ to 1.5 cm$^2$, or even 0.035 cm$^2$ to 1.4 cm$^2$. It is to be understood that the mean average cross-sectional area of the expanded PTFE article is measured before any cutting or trimming operation in the widthwise direction.

In certain embodiments, the expanded PTFE article described herein can have an average specific gravity of at least 0.3, at least 0.4, or even at least 0.5 along a length of the expanded PTFE article. In further embodiments, the expanded PTFE article described herein can have an average specific gravity of no greater than 2.5, no greater than 2.2, no greater than 2.0, no greater than 1.9, or even no greater than 1.8, no greater than 1.5, no greater than 1.3, or even no greater than 1.2. In particular embodiments, the expanded PTFE article can have an average specific gravity in a range of any of the minimum and maximum values described above, such as in a range of 0.5 to 1.2.

In certain embodiments, the expanded PTFE article can have a particular porosity quantified by its Gurley Permeability. Gurley permeability measures the time for a volume of air to flow through a sheet of material. The Gurley tester is well known in the paper industry, and a higher value indicates a less permeable sheet. In particular embodiments, an expanded PTFE article described herein can have an average Gurley Permeability of at least 10 seconds, at least 25 seconds, at least 50 seconds, at least 60 seconds, at least 70 seconds, at least 75 seconds, at least 80 seconds, at least 85 seconds, or even at least 90 seconds. In further embodiments, the expanded PTFE article described herein can have an average Gurley Permeability of no greater than 500 seconds, no greater than 200 seconds, or even no greater than 100 seconds, or even no greater than 80 seconds. In particular embodiments, the expanded PTFE article described herein can have an average Gurley Permeability in a range of any of the minimum and maximum values described above, such as in a range of 10 seconds to 80 seconds. Gurley permeability measures the time for a volume of air to flow through a sheet of material. The Gurley tester is well known in the paper industry, and a higher value indicates a less permeable sheet.

One useful parameter to describe the quality of an expanded PTFE article is its machine direction tensile stress at a maximum load, which characterizes the expanded PTFE article's mechanical strength in the machine direction. The machine direction tensile stress at a maximum load is commonly used and understood by one of ordinary skill in the art. The values of the machine direction tensile stress at a maximum load described herein are measured with an Instron tensile tester in accordance with ASTM-D882.

In certain embodiments, the machine direction tensile stress at a maximum load can be at least 1,900 psi, at least 2,100 psi, at least 2,300 psi, or even at least 2,500 psi, at least 3,000 psi, or even at least 4,000 psi. In further embodiments, the machine direction tensile stress at a maximum load can be no greater than 10,000 psi, no greater than 9,000 psi, or even no greater than 7,000 psi. In particular embodiments, the machine direction tensile stress at a maximum load can be in a range of any of the minimum and maximum values described above, such as, in a range of 1,900 psi to 10,000 psi, 2,100 psi to 9,000 psi, or even 4,000 psi to 7,000 psi.

Another useful parameter to describe the quality of an expanded PTFE article is its cross-direction elongation to break, which characterizes the expanded PTFE article's mechanical strength in the cross-machine direction. The cross-direction elongation to break is commonly used and understood by one of ordinary skill in the art. The values of the cross-direction elongation to break described herein are measured with an Instron tensile tester in accordance with ASTM-D882.

In certain embodiments, the expanded PTFE article can have a cross-direction elongation to break of at least 500%, at least 600%, at least 800%, at least 900%. In further embodiments, the PTFE article can have a cross-direction elongation to break of no greater than about 1000%. In particular embodiments, the PTFE article can have a cross-direction elongation to break in a range of any of the minimum and maximum values described above, such as in a range of 600% to 1000%.

Another particular advantage of the present disclosure is the low variability of the cross-direction elongation to break at various locations across the width of the expanded PTFE article. For example, as described in more detail herein, after extruding and finishing an expanded PTFE article, the article is often cut lengthwise to generate multiple articles having a smaller width than the original article. Thus, it is desired to have a consistency of the cross-direction elongation to break between the outer ends and the middle of the expanded PTFE article so there is consistency between the multiple rolls having a smaller width.

In certain embodiments, the expanded PTFE article described herein can have a total variability between the outer ends and the middle of no greater than 20%, no greater than 15%, no greater than 10%, or even no greater than 5%. To measure the total variability of the cross-direction elongation to break, measurements are taken at the middle of the roll before cutting and at a point which is 10% of the total width from both outer ends. The total variability of the cross-direction elongation to break can then be determined by subtracting the maximum from the minimum, dividing by the average, and multiplying by 100%.

Another useful parameter to describe the effectiveness of the expanded PTFE article described herein, particularly in a cable or wire assembly, is the dielectric constant and loss tangent of the expanded PTFE article, and even more particularly the variability of the dielectric constant and loss tangent over a given length of the expanded PTFE article.

The dielectric constant ($\Box_r$) of a PTFE article is a measure of the capacitance of a construction using the PTFE article as a dielectric, compared to the capacitance of a similar construction in which the dielectric is a vacuum. The loss tangent (tan $\Box$) of the PTFE article, also called the dissipation factor, is a measure of the energy dissipated by the PTFE article when in an oscillating electric field. Specifically, it is a determination of the degree to which the phase difference between the current and the voltage of the charge motion generated in the PTFE article by an oscillating field in an adjacent conductor is shifted from 90 degrees. It is expressed as the tangent of the angular phase difference. The dielectric constant of the PTFE article employed as the dielectric material in a coaxial cable determines the speed at which an electrical signal will travel in that coaxial cable. Signal propagation speed is expressed relative to the speed of light in a vacuum, which is roughly 3.0×10$^{10}$ cm/sec. The dielectric constant of a hard vacuum (space) is defined as 1.00. Higher dielectric constants will result in slower signal propagation speed. Loss tangent is a measure of how much of the power of a signal is lost as it passes along a transmission line on a dielectric material. Testing of the dielectric constant can be conducted at frequencies of 1 MHz and 20 GHz. At 1 MHz, the dielectric constant can be measured according to the guidelines of ASTM D-150. In particular, the dielectric constant can be measured using a parallel-plate test fixture with 38 mm diameter electrodes.

The electric field can be linear and perpendicular to the plane of the samples. At 20 GHz, testing can be conducted using the guidelines of IPC-TM-650-2.5.5.13 Relative Permittivity and Loss Tangent Using a Split=Cylinder Resonator in accordance with the guidelines of D2520-01. Results can be obtained using a split-cylinder cavity resonator and National Institute of Standards and Technology (NIST) SplitC Version 1.0 software. All measurements can be conducted under ambient conditions of 25 degrees Celsius and 48% Relative Humidity (RH). Each test sample can be comprised of two or more 2 inch by 2 inch pieces of film. Using multi-piece stacks can improve measurement accuracy.

In certain embodiments, an expanded PTFE article described herein can have an average dielectric constant of no greater than 3, no greater than 2.7, no greater than 2.5, no greater than 2.3, no greater than 2.1, no greater than 1.9, no greater than 1.7, or even no greater than 1.5. Further, an expanded PTFE article described herein can have an average dielectric constant of at least 0.5, at least 1, or even at least 1.3. In particular embodiments, an expanded PTFE article described herein can have an average dielectric constant in a range of any of the minimum and maximum values described above, such as in a range of 1 to 3.

Further, another useful measure of the performance of an expanded PTFE article described herein is the total dielectric constant variation along a given length. To determine the total dielectric constant variation along a given length, the dielectric constant is measured as discussed above at an interval of 5 meters over the specified length. The measurements are then analyzed to determine the minimum dielectric constant and the maximum dielectric constant over the given length. The total dielectric constant variation along a given length is then calculated as the difference between the minimum and maximum dielectric constant.

In certain embodiments, an expanded PTFE article described herein can have a total dielectric constant variation of no greater than 1, no greater than 0.8, no greater than 0.6, no greater than 0.5, no greater than 0.4, no greater than 0.3, no greater than 0.2, no greater than 0.1, or even no greater than 0.05. Further, an expanded PTFE article described herein can have a total dielectric constant variation of at least 0.005, or even no greater than 0.01. In particular embodiments, an expanded PTFE article described herein can have a total dielectric constant variation in a range of any of the minimum and maximum values described above, such as in a range of 0.01 to 0.5.

In certain embodiments, the expanded PTFE article described herein can have an average dielectric constant and/or a total dielectric constant variation as recited above over a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters. In particular embodiments, the expanded PTFE article described herein can have an average dielectric constant and/or a total dielectric constant variation as recited above over a continuous length of at least 320 meters. In further embodiments, the expanded PTFE article described herein can have an average dielectric constant and/or a total dielectric constant variation as recited above over a continuous length of no greater than 10,000 meters, no greater than 6,000 meters, or even no greater than 3,000 meters. In particular embodiments, the expanded PTFE article can have an average dielectric constant and/or a total dielectric constant variation as recited above over a continuous length in a range of any of the minimum and maximum values described above, such as, 60 meters to 10,000 meters or even 320 meters to 6,000 meters.

In certain embodiments, the expanded PTFE article described herein can have an average loss tangent (dissipation factor ($\tan \delta$)) of no greater than 0.0003, no greater than 0.0002, no greater than 0.00013, no greater than 0.0001, no greater than 0.00005, no greater than 0.00002, or even no greater than 0.00001, or even no greater than 0.000005. In further embodiments, the expanded PTFE article described herein can have an average loss tangent (dissipation factor ($\tan \delta$)) of at least 0.00000001 or even at least 0.0000001. Moreover, the expanded PTFE article described herein can have an average loss tangent (dissipation factor ($\tan \delta$)) in a range of any of the minimum and maximum values described above, such as in a range of 0.0000001 to 0.0002.

Further, another useful measure of the performance of an expanded PTFE article described herein is the loss tangent variation along a given length. To determine the loss tangent variation along a given length, the loss tangent is measured as discussed above at an interval of 5 meters over the specified length. The measurements are then analyzed to determine the minimum loss tangent and the maximum loss tangent over the given length. The loss tangent variation along a given length is then calculated as the difference between the minimum and maximum loss tangent, divided by the average loss tangent and multiplied by 100%.

In certain embodiments, the expanded PTFE article described herein can have a loss tangent variation of no greater than 20%, no greater than 10%, no greater than 8%, or even no greater than 5%, no greater than 3%, no greater than 2%, no greater than 1%, or even no greater than 0.1%. Further, in certain embodiments, the expanded PTFE article described herein can have a loss tangent variation of at least 0.001%, at least 0.01%, or even at least 0.1%. Moreover, in certain embodiments, the expanded PTFE article described herein can have a loss tangent variation in a range of any of the minimum and maximum values described above, such as in a range of 0.01% to 8%, or even 0.1% to 5%. In certain embodiments, the expanded PTFE article described herein can have an average loss tangent and/or a loss tangent variation as recited above over a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters. In particular embodiments, the expanded PTFE article described herein can have an average loss tangent and/or a loss tangent variation as recited above over a continuous length of at least 320 meters. In further embodiments, the expanded PTFE article described herein can have an average loss tangent and/or a loss tangent variation as recited above over a continuous length of no greater than 10,000 meters, no greater than 6,000 meters, or even no greater than 3,000 meters. In particular embodiments, the expanded PTFE article can have an average loss tangent and/or a loss tangent variation as recited above over a continuous length in a range of any of the minimum and maximum values described above, such as, 60 meters to 10,000 meters or even 320 meters to 6,000 meters.

It is noted that the values of dielectric constant, dielectric constant variation, loss tangent, and loss tangent variation described above, can be obtained as measured in a low and/or high frequency of 1 MHz and 20 GHz respectively.

Another aspect of the present disclosure is directed to a cable or wire assembly containing a PTFE article and/or an expanded PTFE article according to any of the embodiments described above. The PTFE article and/or the expanded PTFE article of the present disclosure may be used to wrap an entire cable or wire or be used as an initial, intermediate and/or final wrap of the cable or wire.

Figure 13:
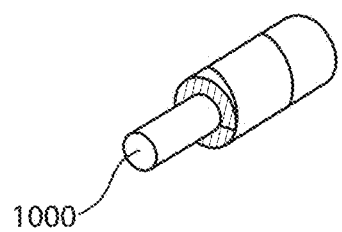
FIG. 13 illustrates a cross-section of a cable assembly according to an embodiment.

Referring to FIG. 13, a cable assembly can include a transmission member 1000 and an insulation member 1100 disposed around and covering the transmission member 1000.

Figure 14:
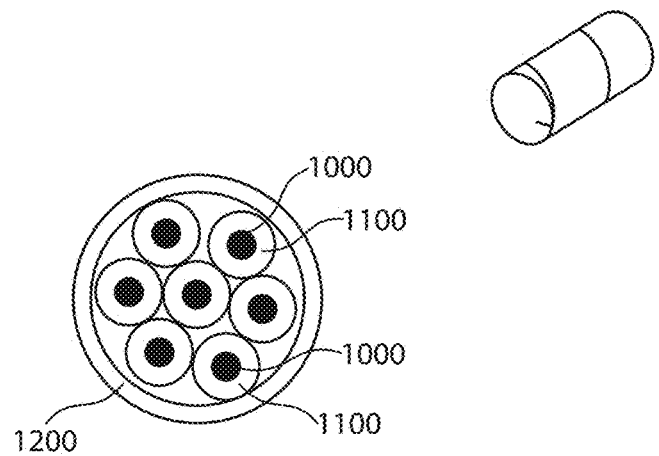
FIG. 14 illustrates a cross-section of a cable assembly according to another embodiment.

The transmission member 1000 can be constructed out of any material capable of allowing a signal to pass from a first end to a second end, opposite the first end. As illustrated in FIG. 13, there can be a single transmission member 1000. In other embodiments, as illustrated in FIG. 14, there can be a plurality of transmission members 1000. When there is a plurality of transmission members 1000, each transmission member 1000 may be wrapped with an insulation member 1100 as will be discussed in more detail below. Further, a second insulation member 1200 can be wrapped around the plurality of transmission members.

Figure 15:
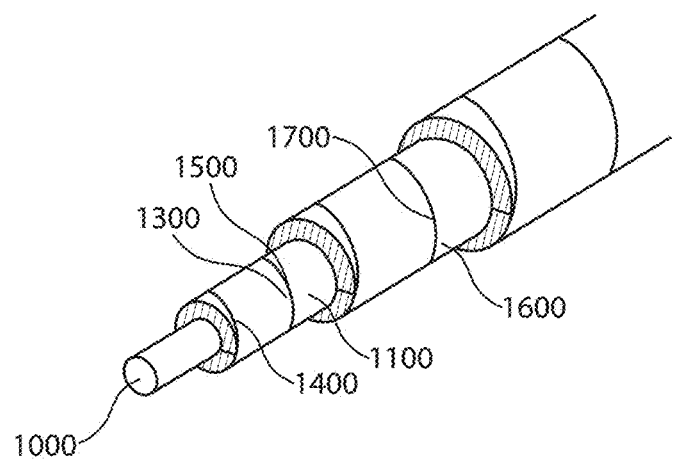
FIG. 15 illustrates a break away perspective view of a cable assembly according to another embodiment.

The insulation member 1100 can be wrapped around the transmission member 1000 by any method in the art. For example, as illustrated in FIG. 13, the insulation member 1100 can be wrapped around the transmission member in a spiral or helical fashion. In other embodiments, the insulation member can be wrapped around the transmission member about its width. As illustrated in FIG. 15, the insulation member 1100 can have a first edge 1300 and a second edge 1400, opposite the first edge 1300. In very particular embodiments, when wrapped around the transmission member 1000, the first edge 1300 of the insulation member 1100 can not overlap and even abut with the second edge 1400 of the insulation member and form a seam 1,500 along the length direction. In even further particular embodiments, a second insulation member 1600 can be wrapped around the first transmission member 1100. The second insulation member 1600 can be wrapped around the first transmission member 1000 in the same or different fashion as the first transmission member. In even more particular embodiments, the seam 1700 of the second insulation member can not align with, or in other words, can be spaced apart from the seam 1,500 in the first insulation member. This way, it is ensured that there is always a continuous layer of an insulation member about the circumference of the transmission member.

In other embodiments, as illustrated in FIG. 13, the first edge of the insulation member can overlap the second edge of the insulation member.

In certain embodiments, the cable or wire assembly can include more than one insulation members, which can be the same or different. For example, referring again to FIG. 15, the cable or wire assembly can include a first insulation member 1100 and a second insulation member 1600. The second insulation member 1600 can be wrapped about the first insulation member in a manner that staggers any seam formed by the insulation members.

In particular embodiments, any of the one or more insulation members or any other cable assembly can contain a PTFE article and/or expanded PTFE article described herein. The layering and wrapping can be configured in any manner useful for the desired cabling assembly.

EXAMPLES

Example 1

Mix Time Analysis

Two different mixers were tested and compared for their mix time and mix uniformity. The two different mixers tested included Mixer 1—a standard cement mixer, which was the prior industry standard; and Mixer 2, which differed from Mixer 1 in that it included 2 spray tips, a significantly increased volume capacity, an internal mechanism for intesification, and was enclosed. For Mixer 2, 75 lbs of PTFE were loaded, and lubricant was added to achieve the target of 20% content of lubricant in the mixture. For Mixer 1, 30 lbs of PTFE were added, and lubricant was added to achieve the target of 20% content of lubricant in the mixture. It is noted that the reduced amount of mixture in Mixer 1 was due to the capacity limitations of the industry standard mixer. The mix time per pound for each mixture was held constant, and samples were evaluated at the end of the mix cycle to determine the variation of lubricant concentration between the samples.

Figure 16:
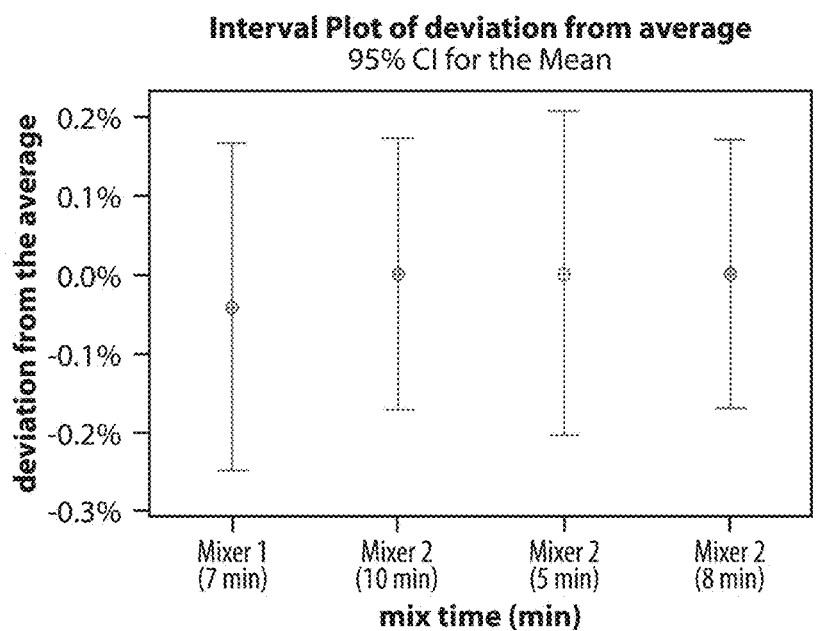
FIG. 16 illustrates a plot showing the improvement in lubricant concentration during mixing according to an embodiment.
Figure 17:
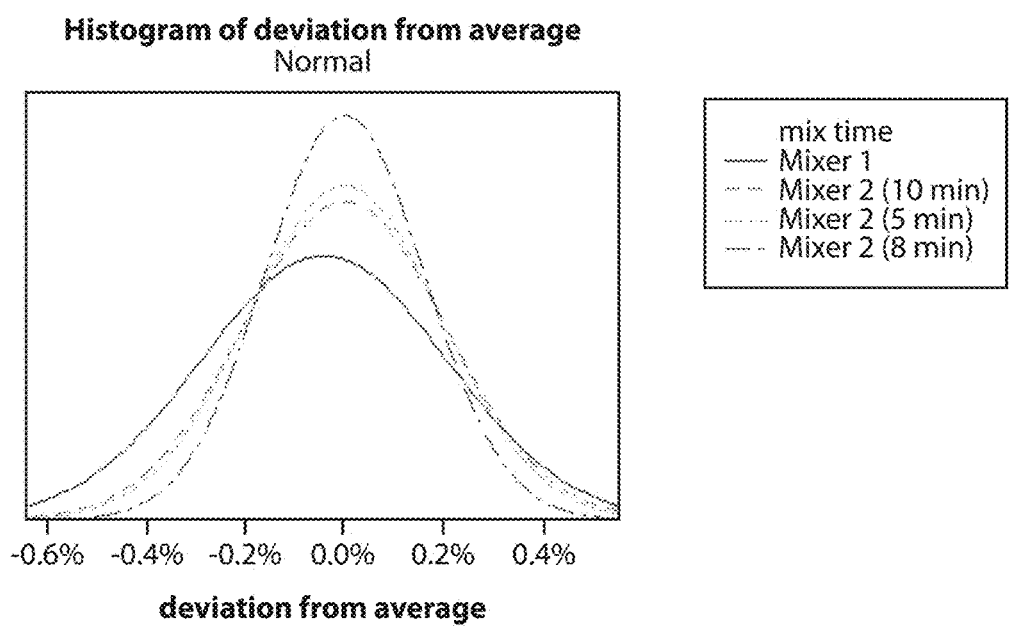
FIG. 17 illustrates a plot showing the improvement in lubricant concentration during mixing according to an embodiment.

A mixture was loaded into Mixer 1 and was mixed for 7 minutes. Three separate mixtures were loaded into Mixer 2 was mixed for 5 minutes, 8 minutes, and 10 minutes respectively. After mixing, multiple samples of each mixture were tested to determine the mix uniformity, reported as a deviation from an average value of lubricant concentration. The results are reported in FIGS. 16 and 17. FIG. 16 illustrates an interval plot of the deviation from average lubricant concentration for Mixer 1 and the three different mix times for Mixer 2. FIG. 17 illustrates a histogram of the deviation from average. As illustrated, the Mixer 2 demonstrated improved mix uniformity, represented by a lower deviation from the average lubricant concentration.

Example 2

Lubricant Distribution After Incubation

As discussed above, a particular problem with increasing the size of a batch is the difficulty in maintaining a homogeneous distribution of lubricant after mixing and during incubation. The inventors discovered that when dealing with such large mixtures, vapor loss of the lubricant in the mixture can create significant variation in lubricant distribution in the mixture after incubation.

Two large container assemblies having an interior capacity of about 17 gallons were filled and tested to determine the % lubricant deviation from the original after incubation at 6 hours, 16 hours, and 6 days.

Container Assembly 1A—The first sample container assembly included a barrier structure containing a PVC disk and a flexible polymer sheet between the disk such that the PTFE and lubricant mixture had little to no air between the mixture and the flexible sheet.

Container Assembly 1B—The second sample container assembly was identical to the first container assembly except that no barrier structure was present. The same amount of PTFE and lubricant was added to the container assembly, and the container assembly was capped at its distal end, resulting in a significant air gap between the mixture and the cap.

Container Assembly 1B was stored for 6 hours, 16 hours, and 6 days.

Container Assembly 1A was stored for 16 hours, and the incubation procedure was duplicated for 4 different samples.

Figure 18:
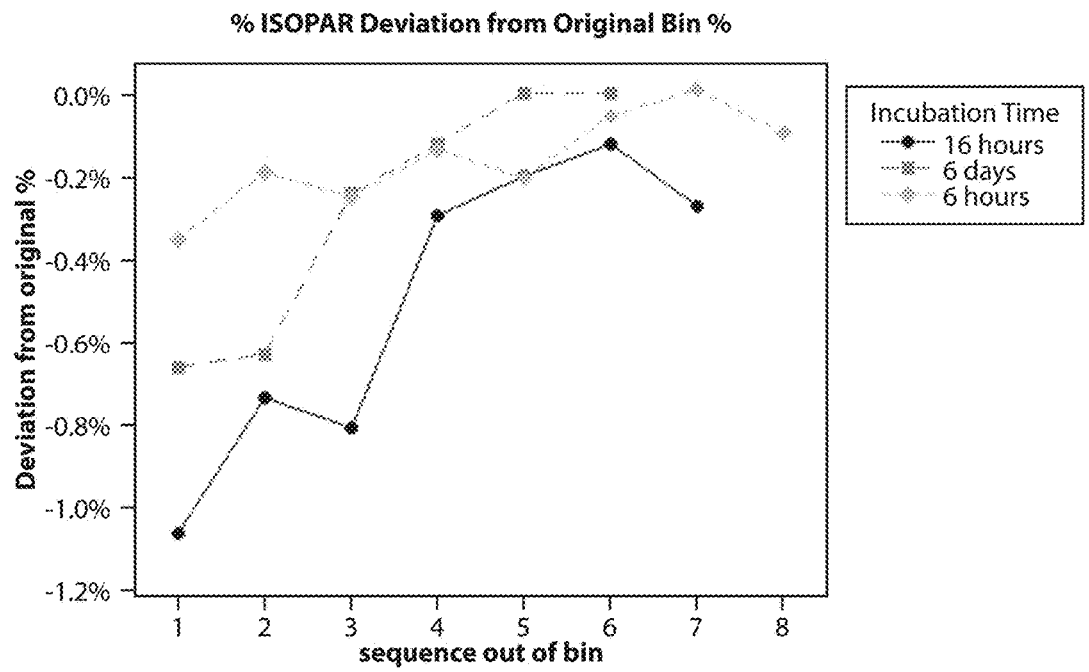
FIG. 18 illustrates a plot showing the lubricant concentration deviations after incubation without a barrier structure.
Figure 19:
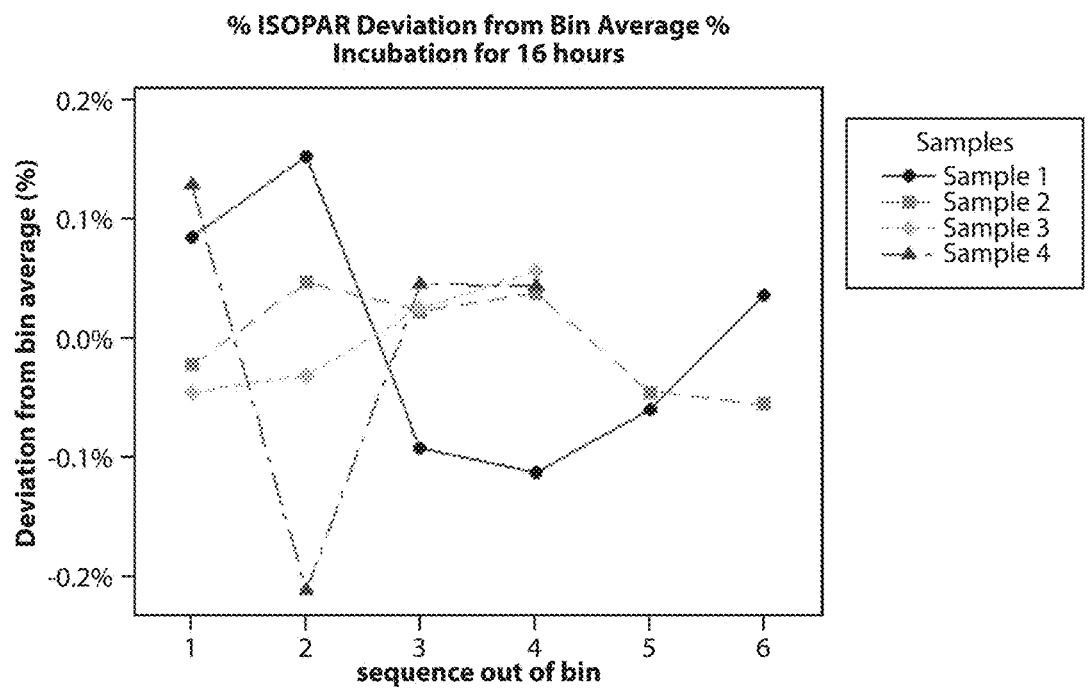
FIG. 19 illustrates a plot showing the lubricant concentration deviations after incubation with a barrier structure according to an embodiment.

Each Container Assembly was tested before capping for the % lubricant within the mixture. After each incubation time period, multiple samples were sequentially taken from the container assembly to see the deviation from the original % lubricant throughout the length of the container assembly. The results are illustrated in FIGS. 18 and 19 which include plots of the % lubricant deviation from the original and average at sequential samples throughout the length of the container assembly. FIG. 18 illustrates the container assembly 1B, and FIG. 19 illustrates the multiple samples of container assembly 1A. As shown, use of the barrier structure in the container assembly resulted in a more consistent and uniform lubricant distribution throughout the container assembly after incubation.

Example 3

Final Tape Properties

Mechanical Properties

Three samples, 1A, 2A, and 3A were prepared according to one or more embodiments of the disclosure and compared to commercially available articles formed from traditional processes using preform sizes having about 3 lbs of PTFE (samples 1B, 2B, and 3B). In particular, samples 1A, 2A, and 3A were formed in a process as generally outlined in FIG. 1. In particular, 100 parts of PTFE powder was mixed with 20 parts of Isopar. The total mixture included 75 lbs of PTFE. The mixture was mixed in a Mixer 2, as detailed in Example 1 above. After incubation, the mixture was then transferred into the preform. The mixture was compressed in the preform at a compaction force of about 300 psi. The preform was then rotated into position above the die. Once in position, the compacted mixture was paste extruded through a die. All samples were then calendared, dried, and wound as illustrated in the set up of FIG. 1, with standard adjustments for the various thickness and specific gravity targets. Sample 1A included the same formulation and target thickness as Sample 1B. Sample 2A included the same formulation and target thickness as Sample 2B. Sample 3A included the same formulation and target thickness as Sample 3B.

Sample 1B—is a commercially available PTFE article from Saint-Gobain under the designation NORTON® R128. This article was constructed from a process which uses preforms of about 3 lbs of PTFE. The thickness target was 3 mil.

Sample 2B—is a commercially available PTFE article from Saint-Gobain under the designation NORTON® R141. This article was constructed from a process which uses preforms of about 3 lbs of PTFE. The thickness target was 3.5 mil.

Sample 3B—is a commercially available PTFE article from Saint-Gobain under the designation NORTON® R142. This article was constructed from a process which uses preforms of about 3 lbs of PTFE. The thickness target was 2.0 mil.

All samples were then tested and compared for their mechanical properties and dimensional tolerances. All property measurements were conducted according to the testing methods described above.

Tensile Properties CD Uniformity

Figure 20:
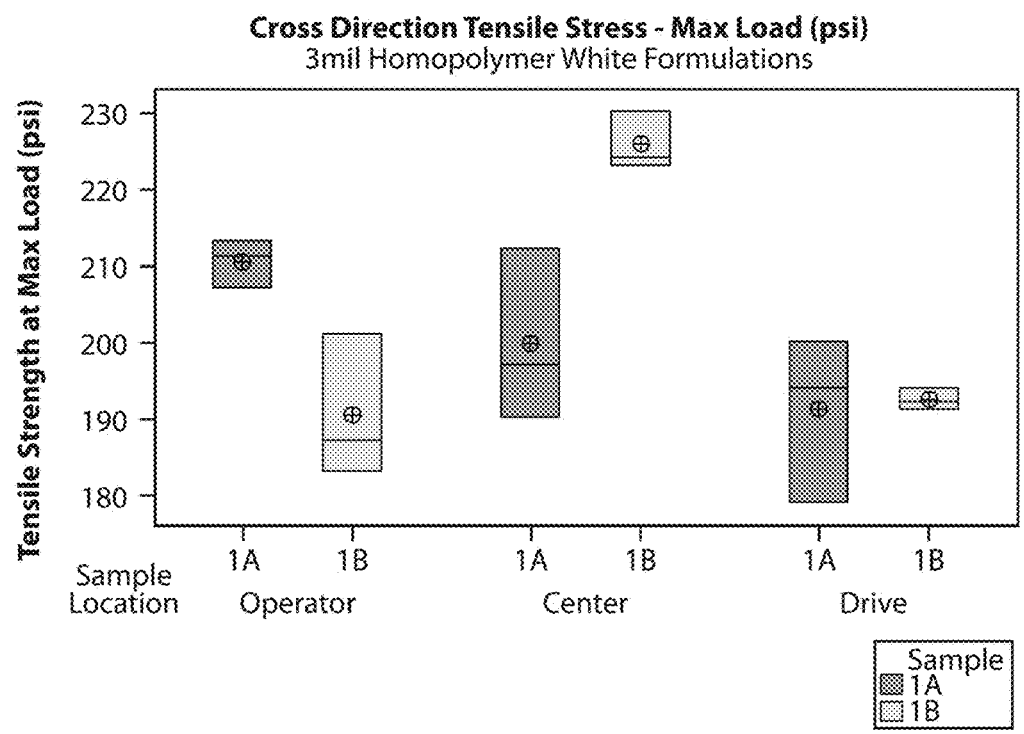
FIG. 20 illustrates a plot showing the cross direction tensile stress performance of a PTFE article according to an embodiment compared to a standard PTFE article.
Figure 21:
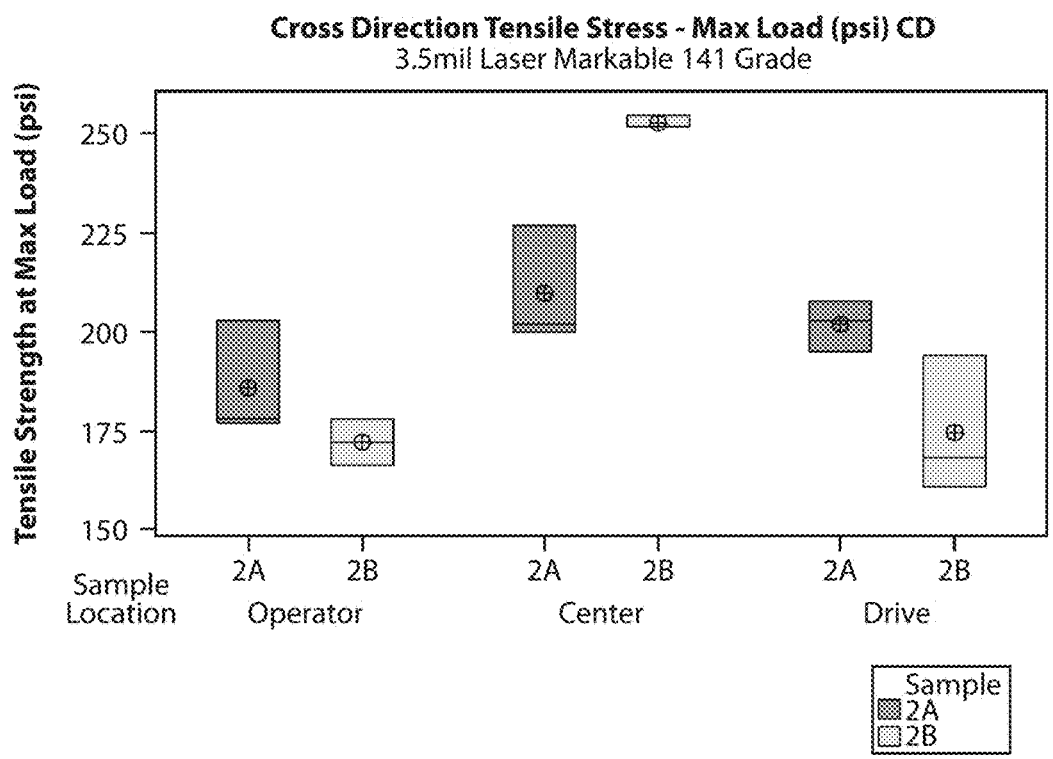
FIG. 21 illustrates a plot showing the cross direction tensile stress performance of a PTFE article according to another embodiment compared to a standard PTFE article.

Samples 1A, 1B, 2A, and 2B were further tested for various mechanical and dimension property uniformity. In particular, the samples were tested for their cross direction tensile stress variation at the center, operator side and drive side of the PTFE article. The results are illustrated in FIGS. 20-21. FIG. 20 corresponds to samples 1A and 1B, and FIG. 21 corresponds to samples 2A and 2B. As shown, there is significantly less variability of the tensile properties across the width of the PTFE article.

Thickness Variation

Figure 22:
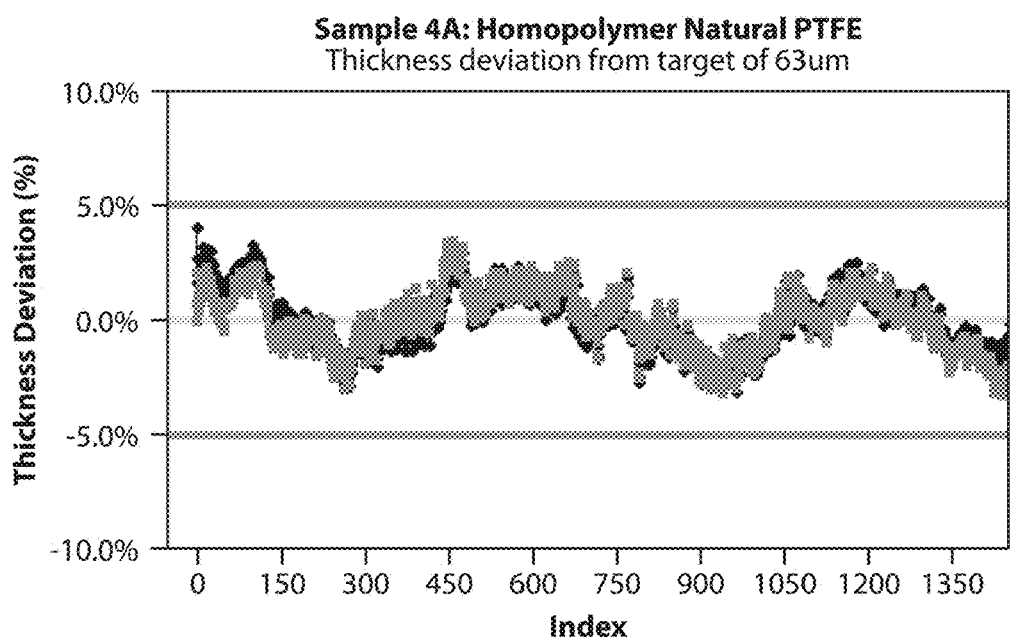
FIG. 22 illustrates a plot showing the thickness deviation of a PTFE article according to an embodiment.
Figure 23:
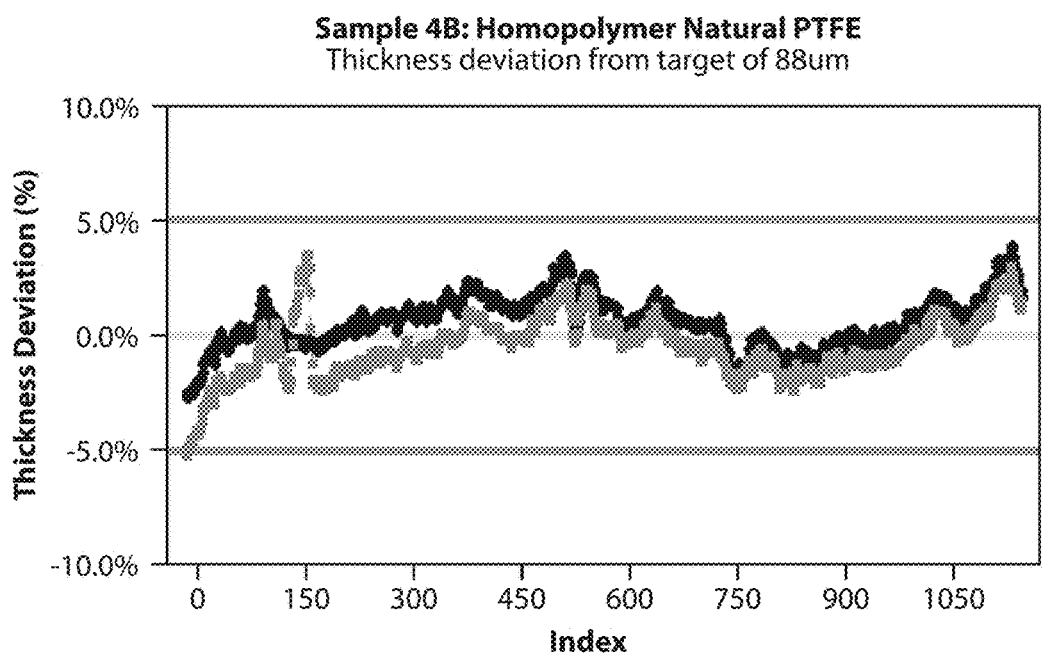
FIG. 23 illustrates a plot showing the thickness deviation of a PTFE article according to another embodiment.
Figure 24:
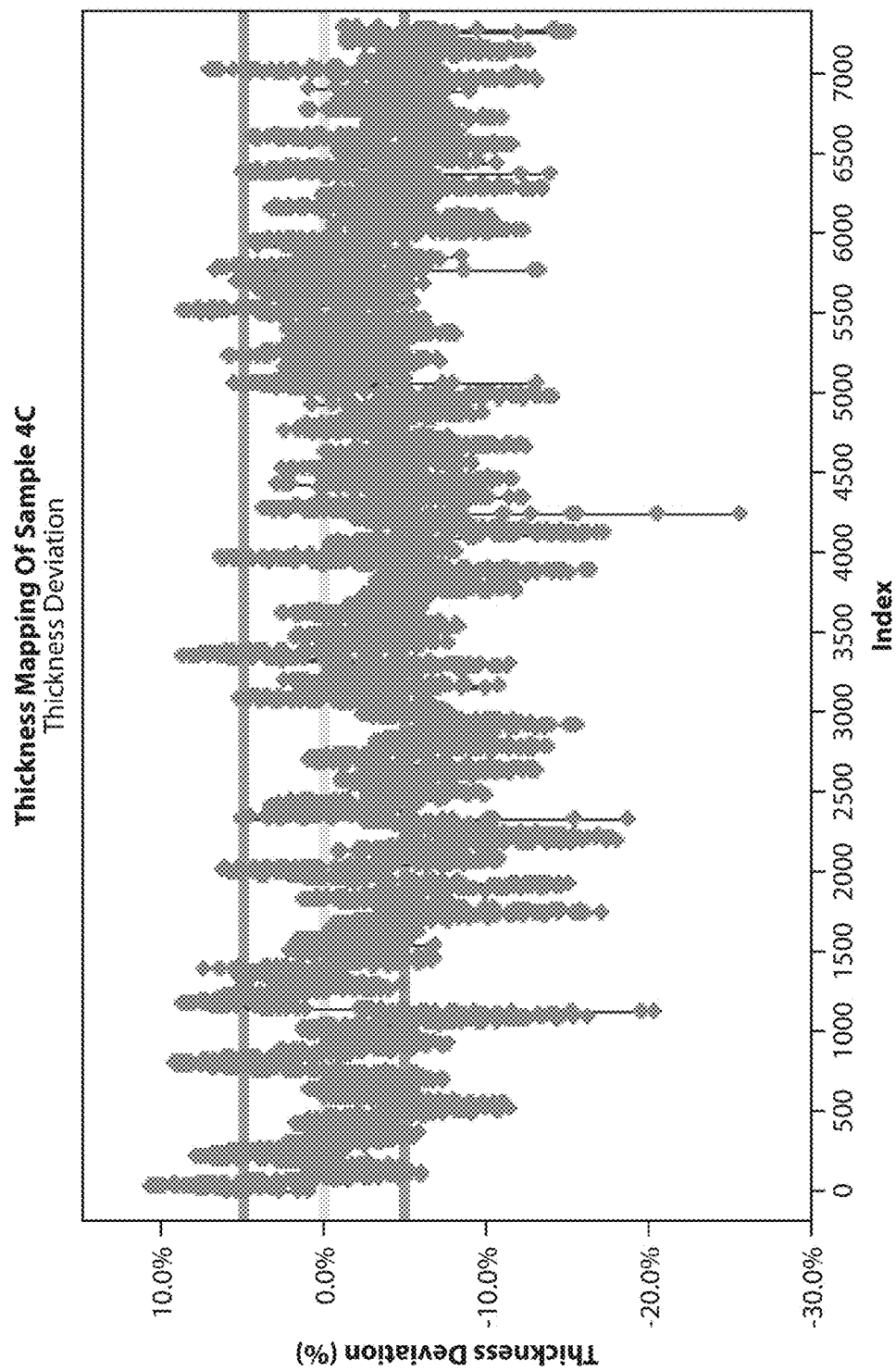
FIG. 24 illustrates a plot showing the thickness deviation of a standard PTFE article.

Sample 4A was prepared like Sample 1A, except with a thickness target of 63 microns (2.5 mil). Sample 4B was prepared like Sample 4A, except with a thickness target of 88 microns (3.1 mil). Sample 4C was commercially available from Saint-Gobain under the designation NORTON® R137, and a thickness target of 50 microns (2 mil). Sample 4C was produced from a process in which the preform of about 3 lbs of PTFE. Each sample was tested for its thickness variation across its length. The thickness was measured by a shadowcasting technique at intervals of 10 measurements per second with a line speed varying between 90 and 200 feet per minute. The results are illustrated in FIGS. 22-24, with FIG. 22 illustrating the thickness variation of two articles of sample 4A, FIG. 23 illustrating the thickness variation of two articles of sample 4B, and FIG. 24 illustrating the thickness variation of sample 4C. Further, the average plus or minus the standard deviation for samples 4A-4C are provided in Table 3 below.

TABLE 3

Average Thickness and Standard Deviation of Samples 4A-4C

|  | Sample 4A | Sample 4B | Sample 4C |
| --- | --- | --- | --- |
| Average Thickness (microns) | 63.0 | 88.5 | 49.2 |
| Standard Deviation | 0.838 | 0.989 | 2.36 |

As shown, the PTFE article of Samples 4A and 4B illustrates significantly improved thickness variation across the entire length. It is particularly noted that the large spikes shown in the measurements for Sample 4C correspond to the presence of a joint from the successive extrusion of small preforms.

Example 4

Experiments Showing Improvement in an Expanded PTFE Article

Sample 5A—The article of sample 1A was expanded to obtain a 6 mil target finished article having a specific gravity target of 0.7.

TABLE 2

Performance Properties - values are average ± 1 standard deviation.

| Sample | Gurley (seconds) | MD Tensile Stress at Max Load (psi) | MD Tensile Strain at Max Load (%) | CD Tensile Stress at Max Load (psi) | CD Tensile Strain at Break (%) |
| --- | --- | --- | --- | --- | --- |
| 1A | 80.7 ± 2.9 | 2633 ± 44 | 32.6 ± 2.5 | 200 ± 12 | 956 ± 69 |
| 1B | 52.1 ± 0.9 | 1870 ± 64 | 72.2 ± 7.6 | 203 ± 18 | 796 ± 63 |
| 2A | 89.3 ± 4.3 | 2479 ± 81 | 34.8 ± 3.5 | 199 ± 15 | 1000 ± 1 |
| 2B | 60.9 ± 4.0 | 1639 ± 77 | 62.8 ± 17.7 | 200 ± 41 | 516 ± 166 |
| 3A | 109.8 ± 34.2 | 4384 ± 118 | 23.7 ± 0.9 | 268 ± 17 | 917 ± 113 |
| 3B | N/A | 2962 ± 301 | 48.1 ± 3.7 | 279 ± 19 | 630 ± 116 |

Sample 5B—The expanded PTFE article commercially available from Saint-Gobain under the designation Norton® R167. This article was made from a process incorporating a preform which could only hold about 3 lbs of PTFE.

Samples 5A and 5B were tested for their dimensional and mechanical properties, and particularly the variability of those properties throughout the length of the article.

Machine Direction Tensile Strength

Figure 25:
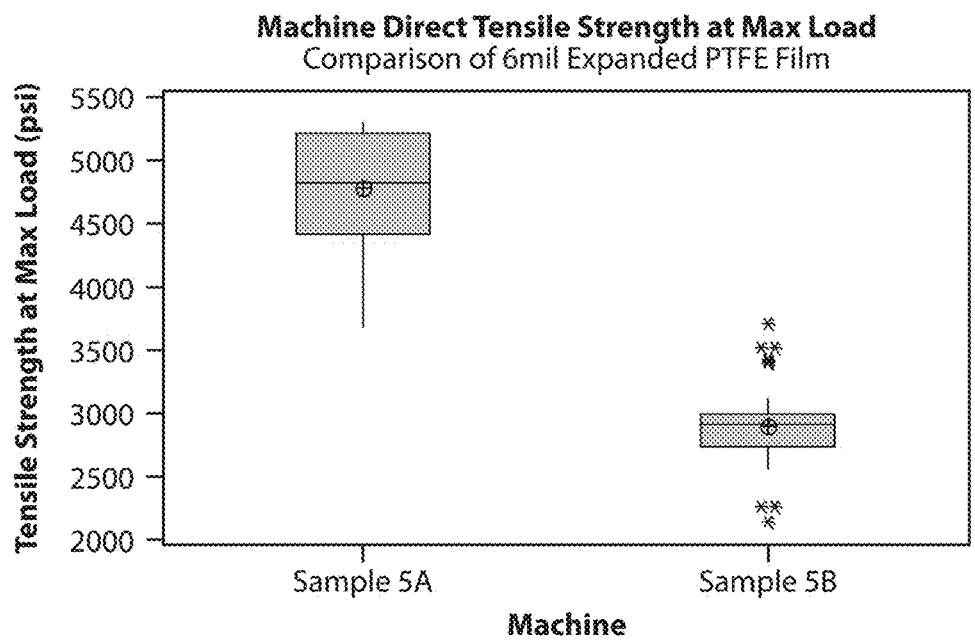
FIG. 25 illustrates a plot showing the machine direction tensile strength at max load of an expanded PTFE article according to an embodiment compared to a standard PTFE article.

Samples 5A and 5B were measured for their machine direction tensile strength as described above. The results are illustrated in FIG. 25. As illustrated, Sample 5A shows a significantly higher machine direction tensile strength indicating that the higher values observed before expansion and illustrated in the Examples above also translated to the finished expanded material.

Machine Direction Elongation

Figure 26:
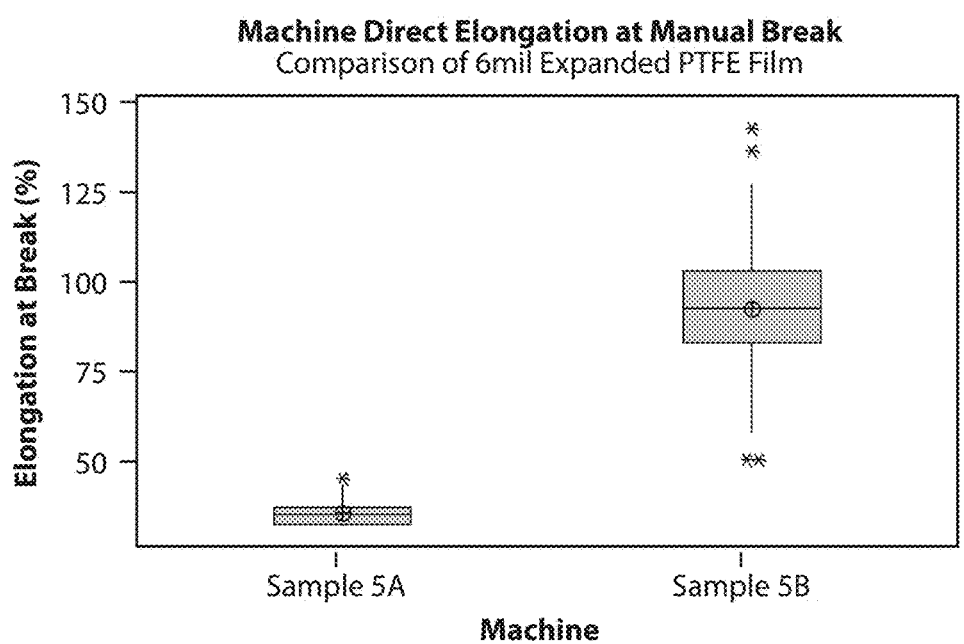
FIG. 26 illustrates a plot showing the machine direction tensile strength at manual break of an expanded PTFE article according to an embodiment compared to a standard expanded PTFE article.

Samples 5A and 5B were measured for their machine direction elongation as described above. The results are illustrated in FIG. 26. As illustrated, Sample 5A shows a significantly lower machine direction elongation than Sample 5B.

Cross Direction Tensile Strength

Figure 27:
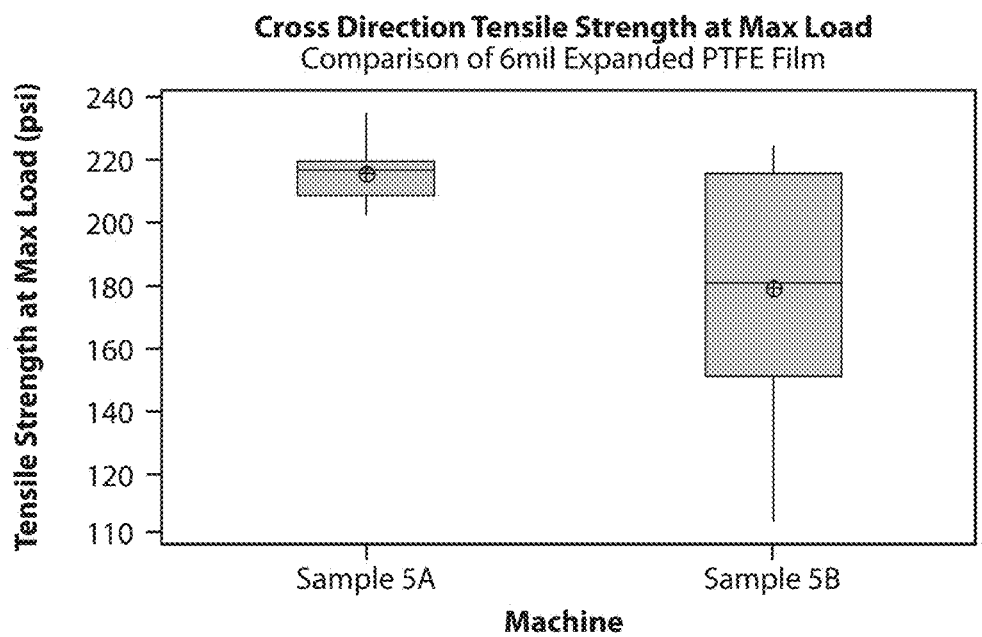
FIG. 27 illustrates a plot showing the cross direction tensile strength at max load of an expanded PTFE article according to an embodiment compared to a standard expanded PTFE article.

Samples 5A and 5B were measured for their cross direction tensile strength as described above. The results are illustrated in FIG. 27. As illustrated, Sample 5A shows a higher average cross direction tensile strength and a lower variation of cross direction tensile strength.

Specific Gravity

Figure 28:
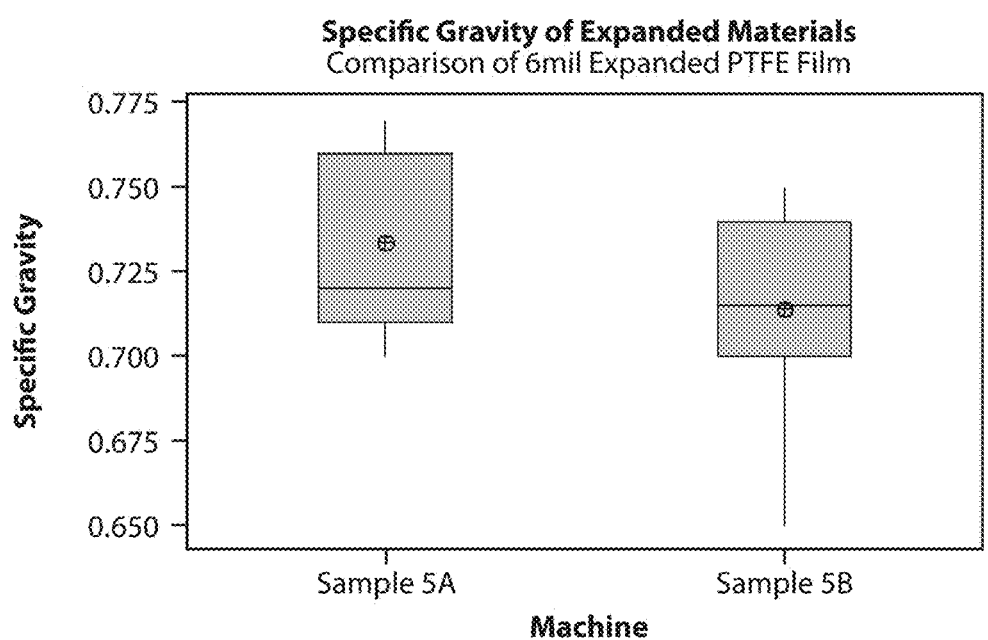
FIG. 28 illustrates a plot showing the specific gravity of an expanded PTFE article according to an embodiment compared to a standard expanded PTFE article.
Figure 29:
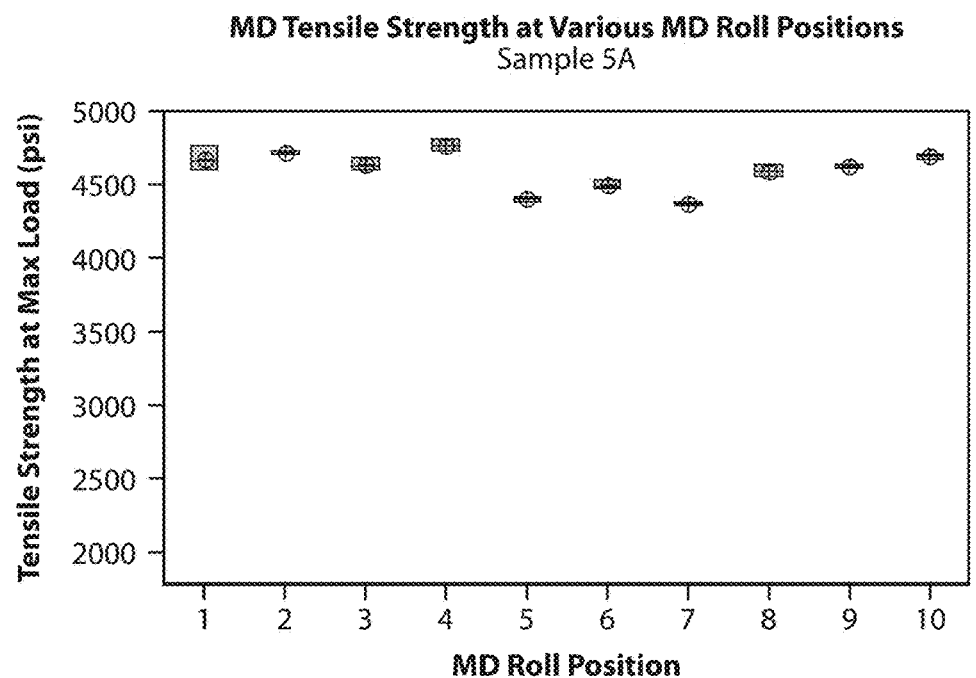
FIG. 29 illustrates a plot showing the machine direction tensile strength at various positions across the length of an expanded PTFE article according to an embodiment.
Figure 30:
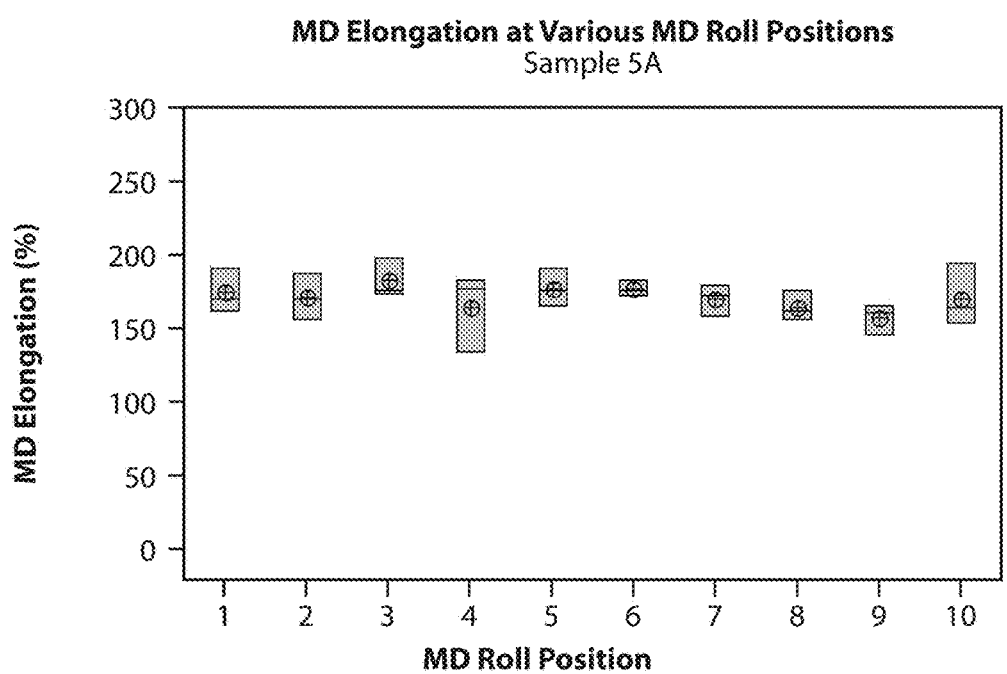
FIG. 30 illustrates a plot showing the machine direction elongation at various positions across the length of an expanded PTFE article according to an embodiment.
Figure 31:
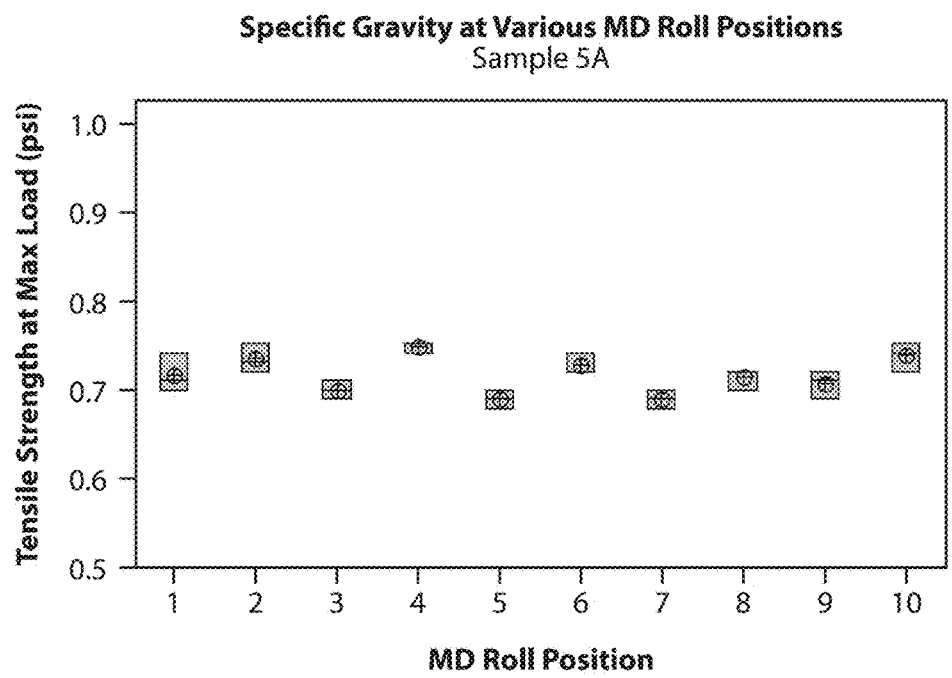
FIG. 31 illustrates a plot showing the specific gravity at various positions across the length of an expanded PTFE article according to an embodiment.
Figure 32:
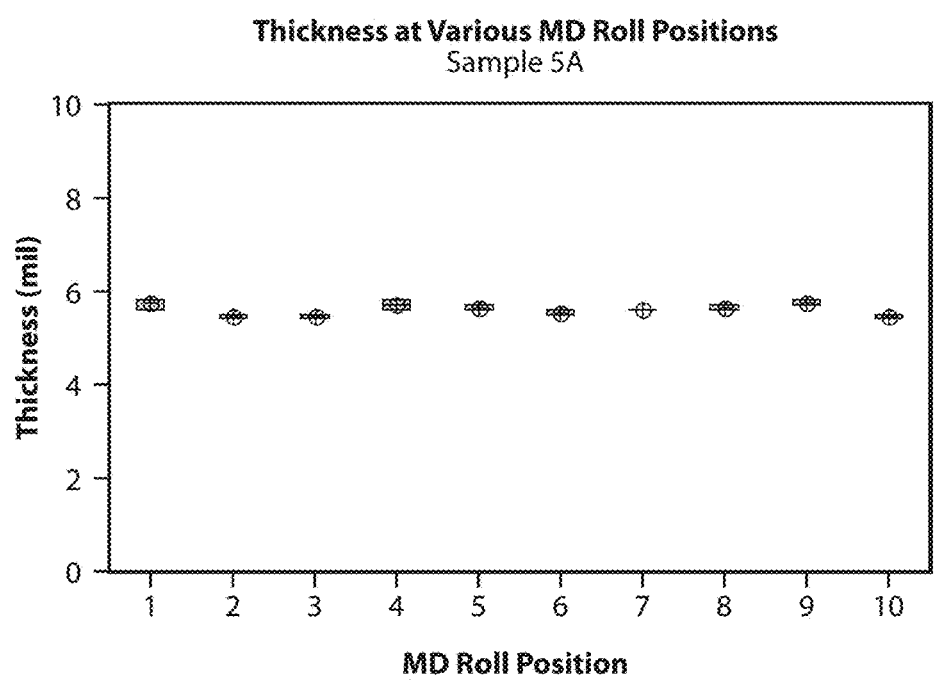
FIG. 32 illustrates a plot showing the thickness at various positions across the length of an expanded PTFE article according to an embodiment.

Samples 5A and 5B were measured for their specific gravity as described above. The results are illustrated in FIG. 28.

Variability Over the Length

Sample 5A was measured for its variation in machine direction tensile strength, machine direction elongation, specific gravity, and thickness. As described above, during production, the target was a 6 millimeter thickness and a specific gravity of 0.7. To measure the variability of the properties described above, measurements were taken off a single, monolithic article at 10 different positions across the length, spaced 30 yards apart. The total length of the article measured was about 300 yards. The results are illustrated in FIGS. 29-32. As illustrated, Sample 5A shows a high average cross-direction tensile strength and a low variation of cross direction tensile strength among the 10 different measurements throughout the length. Further, the sample 5A shows a very low variability of thickness and specific gravity throughout the length.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A cable or wire assembly, the cable comprising: a transmission member, having a first end and a second end spaced apart from the first end, wherein the transmission member is adapted to pass a signal from the first end of the transmission member to the second end of the transmission member; an insulation member disposed around and covering the transmission member, wherein the insulation member comprises PTFE; and wherein the insulation member has a total thickness variation of no greater than 20 microns over a length of at least 80 meters.

Item 2. A cable or wire assembly, comprising: a transmission member, having a first end and a second end spaced apart from the first end, wherein the transmission member is adapted to pass a signal from the first end of the transmission member to the second end of the transmission member; an insulation member disposed around and covering the transmission member, wherein the insulation member comprises PTFE; and wherein the insulation member has a Total Dielectric Constant Variation of no greater than 0.5, measured at 1 MHz.

Item 3. A cable or wire assembly, comprising: a transmission member, having a first end and a second end spaced apart from the first end, wherein the transmission member is adapted to pass a signal from the first end of the transmission member to the second end of the transmission member; an insulation member disposed around and covering the transmission member, wherein the insulation member comprises PTFE; and wherein the insulation member is essentially joint free over a continuous length of at least 80 meters.

Item 4. The cable or wire assembly of any one of the preceding items, wherein the insulation member is wrapped helically around the transmission member.

Item 5. The cable or wire assembly of any one of the preceding items, wherein the cable or wire assembly comprises a first insulation member wrapped around the transmission member, and a second insulation member wrapped around the first insulation member.

Item 6. The cable or wire assembly of any one of the preceding items, wherein the insulation member has a first edge along the length direction and a second edge along the length direction, opposite the first edge, wherein the insulation member is wrapped around the transmission member, and wherein the first edge does not overlap the second edge.

Item 7. The cable or wire assembly of any one of the preceding items, wherein the cable comprises a plurality of insulation members, and wherein at least two of the plurality of insulation members is wrapped around the one or more transmission members.

Item 8. The cable or wire assembly of any one of the preceding items, wherein the cable comprises a first insulation member and a second insulation member, and the first insulation member is wrapped around the transmission member, and wherein the second insulation member is wrapped around the first insulation member, wherein the first and second insulation members have a first edge along the length direction and a second edge along the length direction, opposite the first edge.

Item 9. The cable or wire assembly of any one of the preceding items, wherein the cable or wire assembly is in the form of a coaxial cable.

Item 10. The cable or wire assembly of any one of the preceding items, wherein the insulation member has a first edge along the length direction and a second edge along the length direction, opposite the first edge, wherein at least one of the one or more insulation member is wrapped around the one or more transmission members, and wherein the first edge overlaps the second edge.

Item 11. The cable or wire assembly of any one of the preceding items, wherein the insulation member has a Total Dielectric Constant Variation of no greater than 1, no greater than 0.8, no greater than 0.6, no greater than 0.5, no greater than 0.4, no greater than 0.3, no greater than 0.2, no greater than 0.1, or even no greater than 0.05, measured at 1 MHz.

Item 12. The cable or wire assembly of any one of the preceding items, wherein the insulation member has a Total Dielectric Constant Variation of no greater than 1, no greater than 0.8, no greater than 0.6, no greater than 0.5, no greater than 0.4, no greater than 0.3, no greater than 0.2, no greater than 0.1, or even no greater than 0.05, measured at 20 GHz.

Item 13. The cable or wire assembly of any one of the preceding items, wherein the insulation member has no more than 5 joints, no more than 4 joints, no more than 3 joints, no more than 2 joints, no more than 1 joint, or is even essentially joint free.

Item 14. The cable or wire assembly of any one of the preceding items, wherein the insulation member has a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters.

Item 15. The cable or wire assembly of any one of the preceding items, wherein the insulation member has a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters; and wherein the PTFE article has no more than 5 joints, no more than 4 joints, no more than 3 joints, no more than 2 joints, no more than 1 joint, or is even essentially joint free.

Item 16. The cable or wire assembly of any one of the preceding items, wherein the insulation member has a continuous length of at least 320 meters and is essentially joint free.

Item 17. The cable or wire assembly of any one of the preceding items, wherein the insulation member has a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns.

Item 18. The cable or wire assembly of any one of the preceding items, wherein the insulation member has a total thickness variation of at least 0.1 microns, at least 1 micron, or even at least 2 microns.

Item 19. The cable or wire assembly of any one of the preceding items, wherein the insulation member has a total thickness variation in a range of 0.1 microns to 20 microns, 1 micron to 16 microns, or even 2 microns to 10 microns.

Item 20. The cable or wire assembly of any one of the preceding items, wherein the insulation member has a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns; and wherein the insulation member has the specified total thickness variation across a continuous length of 60 meters, 100 meters, 250 meters, 320 meters, 500 meters, 750 meters, 1,000 meters, 1,250 meters, 1,500 meters, 1,750 meters, or even 2,000 meters.

Item 21. The cable or wire assembly of any one of the preceding items, wherein the insulation member comprises expanded PTFE.

Item 22. The cable or wire assembly of any one of the preceding items, wherein the cable or wire comprises a first insulation member and a second insulation member, wherein the first insulation member is disposed nearer to the transmission member than the second insulation member; and wherein the first insulation member has a specific gravity that is greater than a specific gravity of the second insulation member.

Item 23. The cable or wire assembly of any one of the preceding items, wherein the insulation member has an average loss tangent (dissipation factor (tan δ)) of no greater than 0.0003, no greater than 0.0002, no greater than 0.00013, no greater than 0.0001, no greater than 0.00005, no greater than 0.00002, or even no greater than 0.00001, or even no greater than 0.000005.

Item 24. The cable or wire assembly of any one of the preceding items, wherein the insulation member has an average loss tangent (dissipation factor (tan δ)) in a range of any of the minimum and maximum values described above, such as in a range of 0.0000001 to 0.0002.

Item 25. The cable or wire assembly of any one of the preceding items, wherein the insulation member has a loss tangent variation of no greater than 20%, no greater than 10%, no greater than 8%, or even no greater than 5%, no greater than 3%, no greater than 2%, no greater than 1%, or even no greater than 0.1%.

Item 26. The cable or wire assembly of any one of the preceding items, wherein the insulation member has a standard deviation of average thickness of no more than 2.3, no more than 2.2, no more than 2.1, no more than 2.0, no more than 1.9, no more than 1.8, no more than 1.7, no more than 1.6, no more than 1.5, no more than 1.4, no more than 1.3, no more than 1.2, no more than 1.1, no more than 1, or even no more than 0.9 over a continuous length of 60 meters, 100 meters, 250 meters, 320 meters, 500 meters, 750 meters, 1,000 meters, 1,250 meters, 1,500 meters, 1,750 meters, or even 2,000 meters.

Item 27. The cable or wire assembly of any one of the preceding items, wherein the insulation member has a standard deviation of average thickness of less than 2.3 over a continuous length of 80 meters.

Item 28. The cable or wire assembly of any one of the preceding items, wherein the insulation member has a standard deviation of average thickness of less than 1.5 over a continuous length of 320 meters.

Item 29. An article comprising Polytetrafluoroethylene (PTFE), the article having a continuous length of at least 80 meters, and wherein the article is essentially joint free over a continuous length of 80 meters.

Item 30. An article comprising PTFE, the article having a continuous length of at least 80 meters, and wherein the article has a mean average thickness of less than 125 microns, and wherein the article is joint free over a continuous length of 80 meters.

Item 31. An article comprising PTFE, the article having a continuous length of at least 80 meters, wherein the article has a total thickness variation (TTV) of less than 20 microns over a continuous length of 80 meters, and wherein the article has a mean average thickness of less than 250 microns.

Item 32. An article comprising PTFE, the article having a continuous length of at least 80 meters, wherein the article has a % thickness variation of less than 20% over a continuous length of 80 meters, and wherein the article has a mean average thickness of less than 80 microns.

Item 33. An article comprising PTFE, the article having a continuous length of at least 80 meters, wherein the article has a % thickness variation of less than 15% over a continuous length of 80 meters, and wherein the article has a mean average thickness of less than 250 microns.

Item 34. An article comprising PTFE, the article having a continuous length of at least 80 meters, wherein the article has a % thickness variation of no greater than 10% over a continuous length of 80 meters, and wherein the article has a mean average thickness of less than 80 microns.

Item 35. An article comprising PTFE, wherein the article has a machine direction tensile stress at a max load of greater than 1,900 psi.

Item 36. An article comprising PTFE, wherein the article has a continuous length of at least 80 meters, and wherein the article has an average Gurley Permeability of at least 50 seconds across a continuous length of 80 meters.

Item 37. The article according to any one of the preceding items, wherein the PTFE article has no more than 5 joints, no more than 4 joints, no more than 3 joints, no more than 2 joints, no more than 1 joint, or is even essentially joint free.

Item 38. The article according to any one of the preceding items, wherein the PTFE article has a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters.

Item 39. The article according to any one of the preceding items, wherein the PTFE article has no more than 5 joints, no more than 4 joints, no more than 3 joints, no more than 2 joints, no more than 1 joint, or is even essentially joint free over a continuous length of 60 meters, 100 meters, 250 meters, 320 meters, 500 meters, 750 meters, 1,000 meters, 1,250 meters, 1,500 meters, 1,750 meters, or even 2,000 meters.

Item 40. The article according to any one of the preceding items, wherein the article has no more than 5 joints over a continuous length of 500 meters.

Item 41. The article according to any one of the preceding items, wherein the article has no more than 4 joints over a continuous length of 320 meters.

Item 42. The article according to any one of the preceding items, wherein the article has no more than 3 joints over a continuous length of 250 meters.

Item 43. The article according to any one of the preceding items, wherein the article has a continuous length of at least 320 meters, and is essentially joint free over a continuous length of 320 meters.

Item 44. The article according to any one of the preceding items, wherein the article has a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns over a continuous length of 80 meters.

Item 45. The article according to any one of the preceding items, wherein the article has a total thickness variation of at least 0.1 microns, at least 1 micron, or even at least 2 microns over a continuous length of 80 meters.

Item 46. The article according to any one of the preceding items, wherein the article has a total thickness variation in a range of 0.1 microns to 20 microns, 1 micron to 16 microns, or even 2 microns to 10 microns over a continuous length of 80 meters.

Item 47. The article according to any one of the preceding items, wherein the article has a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns over a continuous length of 60 meters, 100 meters, 250 meters, 320 meters, 500 meters, 750 meters, 1,000 meters, 1,250 meters, 1,500 meters, 1,750 meters, or even 2,000 meters.

Item 48. The article according to any one of the preceding items, wherein the article has a total thickness variation of no greater than 20 microns over a continuous length of 80 meters.

Item 49. The article according to any one of the preceding items, wherein the article has a total thickness variation of no greater than 20 microns over a continuous length of 100 meters.

Item 50. The article according to any one of the preceding items, wherein the article has a total thickness variation of no greater than 20 microns over a continuous length of 250 meters.

Item 51. The article according to any one of the preceding items, wherein the article has a total thickness variation of no greater than 20 microns over a continuous length of 500 meters.

Item 52. The article according to any one of the preceding items, wherein the article has a total thickness variation of no greater than 20 microns over a continuous length of 2,000 meters.

Item 53. The article according to any one of the preceding items, wherein the article, has a mean average thickness of no greater than 1000 microns, no greater than 500 microns, no greater than 250 microns, no greater than 200 microns, no greater than 150 microns, no greater than 125 microns, no greater than 100 microns, no greater than 75 microns, or even no greater than 60 microns over a continuous length of 80 meters; and/or a mean average thickness of at least 0.1 microns, at least 1 micron, at least 5 microns, at least 10 microns, at least 20 microns, at least 30 microns, or even at least 40 microns over a continuous length of 80 meters.

Item 54. The article according to any one of the preceding items, wherein the article has a width, and a length, and wherein the length is greater than the width, wherein the length is in a machine direction, and wherein the width is in a cross machine direction.

Item 55. The article according to any one of the preceding items, wherein the article has an average, uncut width, of at least 0.001 meters, at least 0.01 meters, at least 0.1 meters or even at least 0.2 meters; an average, uncut width, of no greater than 2 meters, no greater than 1 meter, or even no greater than 0.5 meters; or an average, uncut width, in a range of 0.001 meters to 2 meters, or even 0.2 meters to 0.5 meters.

Item 56. The article according to any one of the preceding items, wherein the article has a machine direction tensile stress at a max load of greater than 1,900 psi, greater than 2,100 psi, greater than 2,300 psi, or greater than 2,500 psi as measured according to ASTM-D882.

Item 57. The article according to any one of the preceding items, wherein the article has a machine direction tensile stress at a max load of greater than 2,300 psi as measured according to ASTM-D882.

Item 58. The article according to any one of the preceding items, wherein the article has a machine direction tensile stress at a max load of greater than 2400 psi as measured according to ASTM-D882.

Item 59. The article according to any one of the preceding items, wherein the article has a cross direction elongation to break of at least 600%, or even at least 900% as measured according to ASTM-D882.

Item 60. The article according to any one of the preceding items, wherein the article has a cross direction tensile stress that varies by no more than 20% between the center and edges.

Item 61. The article according to any one of the preceding items, wherein the article has an average specific gravity of at least 1.4, at least 1.45, at least 1.51, or even at least 1.6.

Item 62. The article according to any one of the preceding items, wherein the article has an average specific gravity of no greater than 2.5, no greater than 2.2, no greater than 2.0, no greater than 1.9, no greater than 1.8.

Item 63. The article according to any one of the preceding items, wherein the article has an average Gurley Permeability of at least 50 seconds, at least 60 seconds, at least 70 seconds, at least 75 seconds, at least 80 seconds, at least 85 seconds, or even at least 90 seconds.

Item 64. The article according to any one of the preceding items, wherein the article is laser markable.

Item 65. The article according to any one of the preceding items, wherein the article is in the form of a roll.

Item 66. The article according to any one of the preceding items, wherein the PTFE comprises a PTFE homopolymer, a PTFE copolymer, or combinations thereof.

Item 67. The article according to any one of the preceding items, wherein the article comprises a photosensitive material.

Item 68. The article according to any one of the preceding items, wherein the article comprises a photosensitive material, and wherein the photosensitive material comprises a metal oxide.

Item 69. The article according to any one of the preceding items, wherein the article comprises an oxide, and wherein the oxide comprises $SnO_2$, $ZnO$, AZO, $TiO_2$, $CeO_2$, $Nb_2O_5$, $MoO_3$, $WO_3$, $V_2O_5$, $Cr_2O_3$, $Fe_2O_3$, NiO, CuO, CdO and $Tl_2O_3$.

Item 70. The article according to any one of the preceding items, wherein the article comprises a photosensitive material in an amount of at least about 0.1%, at least about 0.5%, or even at least about 1% by weight, based on the weight of the PTFE.

Item 71. The article according to any one of the preceding items, wherein the article comprises a photosensitive material in an amount of no greater than 20%, no greater than 10%, or even no greater than about 5% by weight, based on the weight of the PTFE.

Item 72. The article according to any one of the preceding items, wherein the article has an average loss tangent (dissipation factor (tan δ)) of no greater than 0.0003, no greater than 0.0002, no greater than 0.00013, no greater than 0.0001, no greater than 0.00005, no greater than 0.00002, or even no greater than 0.00001, or even no greater than 0.000005.

Item 73. The article according to any one of the preceding items, wherein the article has an average loss tangent (dissipation factor (tan δ)) in a range of any of the minimum and maximum values described above, such as in a range of 0.0000001 to 0.0002.

Item 74. The article according to any one of the preceding items, wherein the article has a loss tangent variation of no greater than 20%, no greater than 10%, no greater than 8%, or even no greater than 5%, no greater than 3%, no greater than 2%, no greater than 1%, or even no greater than 0.1%.

Item 75. The article according to any one of the preceding items, wherein the article has a standard deviation of average thickness of no more than 2.3 microns, no more than 2.2 microns, no more than 2.1 microns, no more than 2.0 microns, no more than 1.9 microns, no more than 1.8 microns, no more than 1.7 microns, no more than 1.6 microns, no more than 1.5 microns, no more than 1.4 microns, no more than 1.3 microns, no more than 1.2 microns, no more than 1.1 microns, no more than 1 micron, or even no more than 0.9 microns over a continuous length of 60 meters, 100 meters, 250 meters, 320 meters, 500 meters, 750 meters, 1,000 meters, 1,250 meters, 1,500 meters, 1,750 meters, or even 2,000 meters.

Item 76. The article according to any one of the preceding items, wherein the article has a standard deviation of average thickness of less than 2.3 microns over a continuous length of 80 meters.

Item 77. The article according to any one of the preceding items, wherein the article has a standard deviation of average thickness of less than 1.5 microns over a continuous length of 320 meters.

Item 78. The article according to any one of the preceding items, wherein the article is in the form of a film.

Item 79. The article according to any one of the preceding items, wherein the article is in the form of a tape.

Item 80. The article according to any one of the preceding items, wherein the article further comprises a transmission member, and an insulation member, and wherein the insulation member is wrapped around the transmission member, and wherein the PTFE is contained in the insulation member.

Item 81. A wire or cable assembly comprising the article according to any one of the preceding items.

Item 82. An expanded article comprising PTFE, wherein the article has a continuous length of at least 80 meters, and wherein the expanded PTFE article is essentially joint free.

Item 83. An expanded article comprising PTFE, wherein the article has a continuous length of at least 80 meters, and a total thickness variation of less than 20 microns over a continuous length of 80 meters.

Item 84. An expanded article comprising PTFE, the article having a continuous length of at least 80 meters, wherein the article has a total thickness variation (TTV) of less than 20 microns over a continuous length of 80 meters, and wherein the article has a mean average thickness of less than 250 microns.

Item 85. An expanded article comprising PTFE, the article having a continuous length of at least 80 meters, wherein the article has a % thickness variation of less than 20% over a continuous length of 80 meters, and wherein the article has a mean average thickness of less than 80 microns.

Item 86. An expanded article comprising PTFE, the article having a continuous length of at least 80 meters, wherein the article has a % thickness variation of less than 15% over a continuous length of 80 meters, and wherein the article has a mean average thickness of less than 250 microns.

Item 87. An expanded article comprising PTFE, the article having a continuous length of at least 80 meters, wherein the article has a % thickness variation of no greater than 10% over a continuous length of 80 meters, and wherein the article has a mean average thickness of less than 80 microns.

Item 88. The expanded article according to any one of the preceding items, wherein the expanded PTFE article has no more than 5 joints, no more than 4 joints, no more than 3 joints, no more than 2 joints, no more than 1 joint, or is even essentially joint free.

Item 89. The expanded article according to any one of the preceding items, wherein the PTFE article has a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters.

Item 90. The expanded article according to any one of the preceding items, wherein the PTFE article has a continuous length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters; and wherein the PTFE article has no more than 5 joints, no more than 4 joints, no more than 3 joints, no more than 2 joints, no more than 1 joint, or is even essentially joint free.

Item 91. The expanded article according to any one of the preceding items, wherein the expanded article has a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns.

Item 92. The expanded article according to any one of the preceding items, wherein the expanded article has a total thickness variation of at least 0.1 microns, at least 1 micron, or even at least 2 microns.

Item 93. The expanded article according to any one of the preceding items, wherein the expanded article has a total thickness variation in a range of 0.1 microns to 20 microns, 1 micron to 16 microns, or even 2 microns to 10 microns.

Item 94. The expanded article according to any one of the preceding items, wherein the expanded article has a total thickness variation of no greater than 20 microns, no greater than 18 microns, no greater than 16 microns, no greater than 14 microns, no greater than 12 microns, no greater than 10 microns, no greater than 8 microns, no greater than 7 microns, or even no greater than 5 microns; and wherein the expanded article has the specified total thickness variation across a continuous length of 60 meters, 100 meters, 250 meters, 320 meters, 500 meters, 750 meters, 1,000 meters, 1,250 meters, 1,500 meters, 1,750 meters, or even 2,000 meters Item 95. The expanded article of any one of the preceding items, wherein the expanded PTFE article, has an average thickness of no greater than 1000 microns, no greater than 500 microns, no greater than 250 microns, no greater than 200 microns, no greater than 150 microns, no greater than 125 microns, no greater than 100 microns, no greater than 75 microns, or even no greater than 60 microns; and/or an average thickness of at least 0.1 microns, at least 1 micron, at least 5 microns, at least 10 microns, at least 20 microns, at least 30 microns, or even at least 40 microns.

Item 96. The expanded PTFE article of any one of the preceding items, wherein the expanded PTFE article has a specific gravity of at least 0.1, at least 0.3, or even at least 0.5.

Item 97. The expanded article of any one of the preceding items, wherein the expanded article has a specific gravity of no greater than 1.5, no greater than 1.3, no greater than 1.2, or even no greater than 1.1.

Item 98. The expanded article of any one of the preceding items, wherein the expanded article has a specific gravity in a range of 0.1 to 1.5, 0.3 to 1.3, or even 0.5 to 1.2.

Item 99. The expanded article of any one of the preceding items, wherein the expanded article has a machine direction tensile strength of at least 3,000 psi, at least 3,500 psi, at least 4,000 psi, at least 4,200 psi, or even at least 4,400 psi.

Item 100. The expanded article of any one of the preceding items, wherein the expanded article has a machine direction tensile strength of no greater than 10,000 psi, no greater than 9,000 psi, or even no greater than 7,000 psi.

Item 101. The expanded article of any one of the preceding items, wherein the expanded article has a machine direction tensile strength in a range of 3,000 psi to 10,000 psi, 3,500 psi to 9,000 psi, or even 4,000 psi to 8000 psi.

Item 102. The expanded article according to any one of the preceding items, wherein the PTFE comprises a PTFE homopolymer, a PTFE copolymer, or combinations thereof.

Item 103. The expanded article according to any one of the preceding items, wherein the article comprises a photosensitive material.

Item 104. The expanded article according to any one of the preceding items, wherein the article comprises a photosensitive material, and wherein the photosensitive material comprises a metal oxide.

Item 105. The expanded article according to any one of the preceding items, wherein the article comprises a metal oxide, and wherein the metal oxide comprises $SnO_2$, $ZnO$, AZO, $TiO_2$, $CeO_2$, $Nb_2O_5$, $MoO_3$, $WO_3$, $V_2O_5$, $Cr_2O_3$, $Fe_2O_3$, $NiO$, $CuO$, $CdO$, $Tl_2O_3$, or combinations thereof.

Item 106. The expanded article according to any one of the preceding items, wherein the article comprises a photosensitive material in an amount of at least about 0.1%, at least about 0.5%, or even at least about 1% by weight, based on the weight of the PTFE.

Item 107. The expanded article according to any one of the preceding items, wherein the article comprises a photosensitive material in an amount of no greater than 20%, no greater than 10%, or even no greater than about 5% by weight, based on the weight of the PTFE.

Item 108. The expanded article of any one of the preceding items, wherein the expanded article has a standard deviation of average thickness of no more than 2.3 microns, no more than 2.2 microns, no more than 2.1 microns, no more than 2.0 microns, no more than 1.9 microns, no more than 1.8 microns, no more than 1.7 microns, no more than 1.6 microns, no more than 1.5 microns, no more than 1.4 microns, no more than 1.3 microns, no more than 1.2 microns, no more than 1.1 microns, no more than 1 micron, or even no more than 0.9 microns over a continuous length of 60 meters, 100 meters, 250 meters, 320 meters, 500 meters, 750 meters, 1,000 meters, 1,250 meters, 1,500 meters, 1,750 meters, or even 2,000 meters.

Item 109. The expanded article of any one of the preceding items, wherein the expanded article has a standard deviation of average thickness of less than 2.3 microns over a continuous length of 80 meters.

Item 110. The expanded article of any one of the preceding items, wherein the expanded article has a standard deviation of average thickness of less than 1.5 microns over a continuous length of 320 meters.

Item 111. A method for producing an article comprising PTFE, the method comprising: mixing materials comprising PTFE and a lubricant to form a mixture; providing a preform tube; loading the preform tube with the mixture; compacting the mixture within the preform tube; positioning the preform tube into communication with a die; and extruding the mixture from the preform tube through the die; wherein the mixture comprises at least 4 lbs of the PTFE.

Item 112. A method for producing an article comprising PTFE, the method comprising: mixing materials comprising PTFE and a lubricant to form a mixture; providing a preform tube; loading the preform tube with the mixture; compacting the mixture within the preform tube; positioning the preform tube into communication with a die; and extruding the mixture from the preform tube through the die; wherein the article extruded from a single preform tube has a length of at least 80 meters.

Item 113. A method for producing an article comprising PTFE, the method comprising: mixing materials comprising PTFE and a lubricant to form a mixture; providing a preform tube; loading the preform tube with the mixture; compacting the mixture within the preform tube; positioning the preform tube into communication with a die; and extruding the mixture from the preform tube through the die; wherein the article has a length of at least 80 meters, and wherein the article is essentially joint free over a continuous length of 80 meters.

Item 114. A method for producing an article comprising PTFE, the method comprising: mixing materials comprising PTFE and a lubricant to form a mixture; providing a preform tube; loading the preform tube with the mixture; compacting the mixture within the preform tube; positioning the preform tube into communication with a die; and extruding the mixture from the preform tube through the die; wherein essentially all of the mixture that is loaded into a single preform tube is mixed together in a single batch, and wherein the single batch comprises at least 25 lbs of PTFE.

Item 115. A method for producing an article comprising PTFE, the method comprising: providing a preform tube, wherein the preform tube has an internal cross-sectional area; loading the preform tube with a mixture comprising PTFE and a lubricant; compacting the mixture within the preform tube; extruding the mixture from the preform tube, wherein the article has a cross-sectional area immediately after extrusion; and wherein a reduction ratio of a cross-sectional area of the preform tube to the narrowest cross-sectional area of the die is at least 50.

Item 116. A method for producing an article comprising PTFE, the method comprising: providing a preform tube having a first end having a first opening and a second end having a second opening; loading a mixture comprising PTFE and lubricant into the preform tube, wherein, during loading, the first opening of the preform tube is disposed at a lower elevation than the second opening of the preform tube, and wherein, during loading, the first opening is covered; actively compacting the mixture from the first end; and actively compacting the mixture from the second end.

Item 117. A method for producing an article comprising PTFE, the method comprising: providing a preform tube; loading the preform tube with a mixture comprising PTFE and a lubricant; compacting the mixture within the preform tube; extruding the mixture from the preform tube to form an article, winding the article to form a roll, and cutting one or both width ends of the roll so that the wound roll has an average width variation of less than about 1%, and wherein the roll has a widthwise yield loss of less than about 20 percent.

Item 118. The method of any one of the preceding items, wherein the mixture comprises at least 5, at least 7, at least 10, at least 12, at least 15, at least 17, at least 20, at least 25, at least 30, at least 35, at least 40, at least 45, at least 50, at least 55, at least 60, at least 65, at least 70, at least 75, at least 80, at least 85, at least 90, at least 95, or even at least 100 lbs of the PTFE; wherein the mixture comprises no greater than 500, no greater than 300, no greater than 200, or even no greater than 150 lbs of PTFE; and/or wherein the mixture comprises a range of at least 5 to no greater than 300 lbs of PTFE, at least 40 to no greater than 200 lbs of PTFE, or even at least 60 to no greater than 150 lbs of PTFE.

Item 119. The method of any one of the preceding items, wherein the article extruded from a single preform tube has a length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters.

Item 120. The method of any one of the preceding items, wherein the article has a length of at least 60 meters, at least 100 meters, at least 250 meters, at least 320 meters, at least 500 meters, at least 750 meters, at least 1,000 meters, at least 1,250 meters, at least 1,500 meters, at least 1,750 meters, or even at least 2,000 meters, and wherein the article is essentially joint free over a continuous length of 60 meters, 100 meters, 250 meters, 320 meters, 500 meters, 750 meters, 1,000 meters, 1,250 meters, 1,500 meters, 1,750 meters, or even 2,000 meters.

Item 121. The method of any one of the preceding items, wherein essentially all of the mixture that is loaded into the preform tube is mixed together in a single batch, and wherein the single batch comprises at least 5, at least 7, at least 10, at least 12, at least 15, at least 17, at least 20, at least 25, at least 30, at least 35, at least 40, at least 45, at least 50, at least 55, at least 60, at least 65, at least 70, at least 75, at least 80, at least 85, at least 90, at least 95, or even at least 100 lbs of the PTFE; and/or wherein the single batch comprises no greater than 500, no greater than 300, no greater than 200, or even no greater than 150 lbs of PTFE; and/or wherein the single batch comprises a range of at least 5 to no greater than 300 lbs of PTFE, at least 40 to no greater than 200 lbs of PTFE, or even at least 60 to no greater than 150 lbs of PTFE.

Item 122. The method of any one of the preceding items, wherein the preform tube has a length and a width, and wherein the length is greater than the width.

Item 123. The method of any one of the preceding items, wherein the preform tube has a ratio of the length to the width of at least 3, at least 5, at least 7, at least 10, or even at least 15.

Item 124. The method of any one of the preceding items, wherein the preform tube has a generally cylindrical shape.

Item 125. The method of any one of the preceding items, wherein the preform tube has a cross-sectional area of at least 10 in$^2$, at least 15 in$^2$, at least 20 in$^2$, at least 25 in$^2$, or even at least 28 in$^2$; wherein the preform tube has a cross-sectional area of no greater than 100 in$^2$, no greater than 50 in$^2$, or even no greater than 40 in$^2$; and/or wherein the preform tube has a cross-sectional area in a range of 10 in$^2$ to 50 in$^2$, or even in a range of 20 in$^2$ to 40 in$^2$.

Item 126. The method of any one of the preceding items, wherein the article, has an average thickness of no greater than 1000 microns, no greater than 500 microns, no greater than 250 microns, no greater than 200 microns, no greater than 150 microns, no greater than 125 microns, no greater than 100 microns, no greater than 75 microns, or even no greater than 60 microns; and/or an average thickness of at least 0.1 microns, at least 1 micron, at least 5 microns, at least 10 microns, at least 20 microns, at least 30 microns, or even at least 40 microns.

Item 127. The method of any one of the preceding items, wherein a ratio of the cross-sectional area of the preform tube to the narrowest cross-sectional area of the die (reduction ratio) is at least 50, at least 60, at least 70, at least 80, at least 85, or even at least 90.

Item 128. The method of any one of the preceding items, wherein a ratio of the cross-sectional area of the preform tube to the narrowest cross-sectional area of the die (reduction ratio) is no greater than 200, no greater than 160, no greater than 120, or even no greater than 105.

Item 129. The method of any one of the preceding items, wherein actively compacting the mixture from the first end begins before actively compacting the mixture from the second end.

Item 130. The method of any one of the preceding items, wherein actively compacting the mixture from the first end begins before actively compacting the mixture from the second end, and wherein actively compacting the mixture from the first end and actively compacting the mixture from the second end occur, at least partly, concurrently.

Item 131. The method of any one of the preceding items, wherein a compaction force from the first and/or second end is no greater than 500 psi, no greater than 400 psi, no greater than 350 psi, no greater than 300 psi, no greater than 280 psi, no greater than 270 psi, no greater than 250 psi, no greater than 240 psi, no greater than 230 psi, no greater than 220 psi, no greater than 210 psi, no greater than 200 psi, no greater than 190 psi, or even no greater than 180 psi.

Item 132. The method of any one of the preceding items, wherein a compaction force from the first and/or second end is no greater than about 280 psi, or even no greater than about 220 psi.

Item 133. The method of any one of the preceding items, wherein during loading, compaction, translation, and/or extrusion, the first opening is disposed at a higher elevation than the second opening.

Item 134. The method of any one of the preceding items, wherein during loading, compaction, translation, and/or extrusion, the preform tube is in a generally vertical orientation.

Item 135. The method of any one of the preceding items, wherein active compaction of the PTFE and lubricant from the first end begins before active compaction of the PTFE and lubricant from the second end; or alternatively, wherein active compaction of the PTFE and lubricant from the second end begins before active compaction of the PTFE and lubricant from the first end.

Item 136. The method of any one of the preceding items, further comprising: calendering the article after extrusion, wherein the article has a first thickness after extrusion, the article has a second thickness after calendering, and wherein the second thickness is less than the first thickness.

Item 137. The method of any one of the preceding items, further comprising: drying the article to drive off the lubricant.

Item 138. The method of any one of the preceding items, further comprising: winding the article to form a roll.

Item 139. The method of any one of the preceding items, further comprising: winding the article to form a roll; and cutting the ends of the roll.

Item 140. The method according to any one of the preceding items, wherein the PTFE comprises a PTFE homopolymer, a PTFE copolymer, or combinations thereof.

Item 141. The method according to any one of the preceding items, wherein the article comprises a photosensitive material.

Item 142. The method according to any one of the preceding items, wherein the article comprises a photosensitive material, and wherein the photosensitive material comprises a metal oxide.

Item 143. The method according to any one of the preceding items, wherein the article comprises a metal oxide, and wherein the metal oxide comprises $SnO_2$, ZnO, AZO, $TiO_2$, $CeO_2$, $Nb_2O_5$, $MoO_3$, $WO_3$, $V_2O_5$, $Cr_2O_3$, $Fe_2O_3$, NiO, CuO, CdO, $Tl_2O_3$, or combinations thereof.

Item 144. The method according to any one of the preceding items, wherein the article comprises a photosensitive material in an amount of at least about 0.1%, at least about 0.5%, or even at least about 1% by weight, based on the weight of the PTFE.

Item 145. The method according to any one of the preceding items, wherein the article comprises a photosensitive material in an amount of no greater than 20%, no greater than 10%, or even no greater than about 5% by weight, based on the weight of the PTFE.

Item 146. The method of any one of the preceding items, wherein the roll has a cross-direction yield loss of no greater than 20%, no greater than 18%, no greater than 16%, no greater than 14%, no greater than 12%, no greater than 10%, no greater than 8%, or even no greater than 7%.

Item 147. The method of any one of the preceding items, wherein before cutting, the roll has a Total Width Variation (TWV) of no greater than 3 inches, no greater than 2 inches, no greater than 1.5 inch, or even no greater than 1 inch.

Item 148. The method of any one of the preceding items, wherein before cutting, the roll has a Total Width Variation (TWV) of at least 0.01 inches, at least 0.1 inches, or even at least 0.5 inches.

Item 149. The method of any one of the preceding items, wherein before cutting, the roll has a Total Width Variation (TWV) in a range of 0.01 inches to 3 inches, 0.1 inches to 2 inches, or even 0.5 inches to 1.5 inches.

Item 150. The method of any one of the preceding items, wherein the article is in the form of an article.

Item 151. The method of any one of the preceding items, wherein the article has a standard deviation of average thickness of no more than 2.3 microns, no more than 2.2 microns, no more than 2.1 microns, no more than 2.0 microns, no more than 1.9 microns, no more than 1.8 microns, no more than 1.7 microns, no more than 1.6 microns, no more than 1.5 microns, no more than 1.4 microns, no more than 1.3 microns, no more than 1.2 microns, no more than 1.1 microns, no more than 1 micron, or even no more than 0.9 microns over a continuous length of 60 meters, 100 meters, 250 meters, 320 meters, 500 meters, 750 meters, 1,000 meters, 1,250 meters, 1,500 meters, 1,750 meters, or even 2,000 meters.

Item 152. The method of any one of the preceding items, wherein the article has a standard deviation of average thickness of less than 2.3 microns over a continuous length of 80 meters.

Item 153. The method of any one of the preceding items, wherein the article has a standard deviation of average thickness of less than 1.5 microns over a continuous length of 320 meters.

Item 154. An article produced by the method of any one of the preceding items.

Item 155. A PTFE tape produced by the method of any one of the preceding items.

Item 156. A method for producing an article comprising PTFE, the method comprising: providing a preform tube having a first end and a second end; loading a mixture comprising PTFE and lubricant into the preform tube; compacting the mixture within the preform tube; translating the preform tube over a die, wherein the first end of the preform tube is nearer the die than the second end, wherein, during translation, the first end of the preform tube is open, and wherein substantially all of the compacted mixture is retained within the preform tube during translation; and extruding the PTFE from the preform tube.

Item 157. A method for producing an article comprising PTFE, the method comprising: providing a first preform tube; loading a mixture comprising PTFE into the first preform tube; translating the first preform tube into communication with a die and simultaneously, translating a second preform tube comprising PTFE out of communication with the die; extruding the mixture in the first preform tube.

Item 158. A method for producing an article comprising PTFE, the method comprising: providing a first preform tube; loading a mixture comprising PTFE and lubricant into the first preform tube; translating the first preform tube into communication with a die; at least partly concurrently extruding the mixture in the first preform tube, and filling a second preform tube with a mixture comprising PTFE; at least partly concurrently translating the second preform tube into communication with a die and translating the first preform tube out of communication with the die.

Item 159. The method of any one of the preceding items, further comprising applying a vacuum pressure to the second end of the preform tube during translation.

Item 160. The method of any one of the preceding items, further comprising applying a vacuum pressure to the second end of the preform tube during translation and releasing the vacuum pressure when the preform tube is positioned over the die.

Item 161. The method of any one of the preceding items, further comprising applying a vacuum pressure to the second end of the preform tube during translation; abutting the first end of the preform tube into communication with the die, releasing the vacuum pressure when the preform tube is positioned over the die while concurrently maintaining a pressure release to allow the mixture to slide through the preform tube.

Item 162. The method of any one of the preceding items, further comprising compacting the mixture in the preform tube.

Item 163. The method of any one of the preceding items, further comprising compacting the mixture in the preform tube, and wherein compacting comprises actively compacting the mixture from a first end before actively compacting the mixture from the second end.

Item 164. The method of any one of the preceding items, further comprising compacting the mixture in the preform tube, and wherein compacting comprises actively compacting the mixture from the first opening before actively compacting the mixture from the second end, and wherein actively compacting the mixture from the first end and actively compacting the mixture from the second end occur, at least partly, concurrently.

Item 165. The method of any one of the preceding items, further comprising compacting the mixture in the preform tube, and wherein a compaction force from the first and/or second end is no greater than about 500 psi, no greater than about 400 psi, no greater than about 350 psi, no greater than about 300 psi, no greater than about 280 psi, no greater than about 270 psi, no greater than about 250 psi, no greater than about 240 psi, no greater than about 230 psi, no greater than about 220 psi, no greater than about 210 psi, or even no greater than about 200 psi.

Item 166. The method of any one of the preceding items, wherein a compaction force from the first and/or second end is no greater than about 280 psi, or even no greater than about 220 psi.

Item 167. The method of any one of the preceding items, wherein during loading, compaction, translation, and/or extrusion, the first opening is disposed at a higher elevation than the second opening.

Item 168. The method of any one of the preceding items, wherein during loading, compaction, translation, and/or extrusion, the preform tube is in a generally vertical orientation.

Item 169. The method of any one of the preceding items, further comprising compacting the mixture in the preform tube, and wherein compacting comprises active compaction of the PTFE and lubricant from the first end beginning before active compaction of the PTFE and lubricant from the second end; or alternatively, wherein active compaction of the PTFE and lubricant from the second end begins before active compaction of the PTFE and lubricant from the first end.

Item 170. The method of any one of the preceding items, wherein translation includes rotating a first preform tube and a second preform tube about a central axis, and wherein the first end of the first and second preform tubes remains at a lower elevation than the second end of the first and second preform tubes respectively throughout rotation.

Item 171. The method of any one of the preceding items, further comprising: calendering the article after extrusion, wherein the article has a first thickness after extrusion, the article has a second thickness after calendering, and wherein the second thickness is less than the first thickness.

Item 172. The method of any one of the preceding items, further comprising: drying the article to drive off the lubricant.

Item 173. The method of any one of the preceding items, further comprising: winding the article to form a roll.

Item 174. The method of any one of the preceding items, further comprising: winding the article to form a roll; and cutting the ends of the roll.

Item 175. The method according to any one of the preceding items, wherein the PTFE comprises a PTFE homopolymer, a PTFE copolymer, or combinations thereof.

Item 176. The method according to any one of the preceding items, wherein the article comprises a photosensitive material.

Item 177. The method according to any one of the preceding items, wherein the article comprises a photosensitive material, and wherein the photosensitive material comprises a metal oxide.

Item 178. The method according to any one of the preceding items, wherein the article comprises a metal oxide, and wherein the metal oxide comprises $SnO_2$, $ZnO$, $AZO$, $TiO_2$, $CeO_2$, $Nb_2O_5$, $MoO_3$, $WO_3$, $V_2O_5$, $Cr_2O_3$, $Fe_2O_3$, $NiO$, $CuO$, $CdO$, $Tl_2O_3$, or combinations thereof.

Item 179. The method according to any one of the preceding items, wherein the article comprises a photosensitive material in an amount of at least about 0.1%, at least about 0.5%, or even at least about 1% by weight, based on the weight of the PTFE.

Item 180. The method according to any one of the preceding items, wherein the article comprises a photosensitive material in an amount of no greater than 20%, no greater than 10%, or even no greater than about 5% by weight, based on the weight of the PTFE.

Item 181. The method of any one of the preceding items, wherein the article has a standard deviation of average thickness of no more than 2.3 microns, no more than 2.2 microns, no more than 2.1 microns, no more than 2.0 microns, no more than 1.9 microns, no more than 1.8 microns, no more than 1.7 microns, no more than 1.6 microns, no more than 1.5 microns, no more than 1.4 microns, no more than 1.3 microns, no more than 1.2 microns, no more than 1.1 microns, no more than 1 micron, or even no more than 0.9 microns over a continuous length of 60 meters, 100 meters, 250 meters, 320 meters, 500 meters, 750 meters, 1,000 meters, 1,250 meters, 1,500 meters, 1,750 meters, or even 2,000 meters.

Item 182. The method of any one of the preceding items, wherein the article has a standard deviation of average thickness of less than 2.3 microns over a continuous length of 80 meters.

Item 183. The method of any one of the preceding items, wherein the article has a standard deviation of average thickness of less than 1.5 microns over a continuous length of 320 meters.

Item 184. An article produced by the method of any one of the preceding items.

Item 185. A PTFE tape produced by the method of any one of the preceding items.

Item 186. The article according to any one of the preceding items, wherein the PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5%.

Item 187. The article according to any one of the preceding items, wherein the PTFE article has a maximum low spot thickness of less than 20%, no greater than 10%, or even no greater than 5%.

Item 188. The article according to any one of the preceding items, wherein the PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5% over a continuous length of 60 meters, 100 meters, 250 meters, 320 meters, 500 meters, 750 meters, 1,000 meters, 1,250 meters, 1,500 meters, 1,750 meters, or even 2,000 meters.

Item 189. The article according to any one of the preceding items, wherein the PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5% over a continuous length of 100 meters, and a mean average thickness of less than 250 microns, less than 80 microns, or even less than 50 microns.

Item 190. The expanded article of any one of the preceding items, wherein the expanded PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5%.

Item 191. The expanded article of any one of the preceding items, wherein the expanded PTFE article has a maximum low spot thickness of less than 20%, no greater than 10%, or even no greater than 5%.

Item 192. The expanded article of any one of the preceding items, wherein the expanded PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5% over a continuous length of 60 meters, 100 meters, 250 meters, 320 meters, 500 meters, 750 meters, 1,000 meters, 1,250 meters, 1,500 meters, 1,750 meters, or even 2,000 meters.

Item 193. The expanded article of any one of the preceding items, wherein the expanded PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5% over a continuous length of 100 meters, and a mean average thickness of less than 250 microns, less than 80 microns, or even less than 50 microns.

Item 194. The method of any one of the preceding items, wherein the PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5%.

Item 195. The method of any one of the preceding items, wherein the PTFE article has a maximum low spot thickness of less than 20%, no greater than 10%, or even no greater than 5%.

Item 196. The method of any one of the preceding items, wherein the PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5% over a continuous length of 60 meters, 100 meters, 250 meters, 320 meters, 500 meters, 750 meters, 1,000 meters, 1,250 meters, 1,500 meters, 1,750 meters, or even 2,000 meters.

Item 197. The method of any one of the preceding items, wherein the PTFE article has a maximum low spot thickness of less than 30%, less than 25%, less than 20%, no greater than 18%, no greater than 16%, no greater than 14%, no greater than 12%, no greater than 10%, no greater than 8%, no greater than 6%, or even no greater than 5% over a continuous length of 100 meters, and a mean average thickness of less than 250 microns, less than 80 microns, or even less than 50 microns.

Item 198. An article, an expanded article, a cable or wire assembly, or a method of any one of the preceding items, wherein instead of PTFE, the article, expanded article, a cable or wire assembly contains a non-meltprocessable polymer.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An article comprising a non-meltprocessable polymer, the article having a continuous length of at least 80 meters, wherein the article has a mean average thickness of no greater than 1000 microns over a continuous length of 80 meters, wherein the article is essentially free of artifacts of paste extrusion over a continuous length of 80 meters, and wherein the article has a standard deviation of mean average thickness of no more than 1.6 microns.

2. The article according to claim 1, wherein the article has a total thickness variation of no greater than 20 microns.

3. The article according to claim 1, wherein the article has a total thickness variation in a range of 1 micron to 16 microns.

4. The article according to claim 1, wherein the article has a machine direction tensile stress at a max load of greater than 1,900 psi as measured according to ASTM-D882.

5. The article according to claim 1, wherein the article has a cross direction elongation to break of at least 600% as measured according to ASTM-D882.

6. The article according to claim 1, wherein the article has a cross direction tensile stress that varies by no more than 20% between the center and edges.

7. The article according to claim 1, wherein the article has an average Gurley Permeability of at least 50 seconds.

8. The article according to claim 1, wherein the article is laser markable.

9. The article according to claim 1, wherein the article is in the form of a roll.

10. The article according to claim 1, wherein the article comprises a photosensitive material.

11. The article according to claim 10, wherein the photosensitive material comprises a metal oxide.

12. The article according to claim 1, wherein the article comprises an oxide, and wherein the oxide comprises $SnO_2$, $ZnO$, $AZO$, $TiO_2$, $CeO_2$, $Nb_2O_5$, $MoO_3$, $WO_3$, $V_2O_5$, $Cr_2O_3$, $Fe_2O_3$, $NiO$, $CuO$, $CdO$, $Tl_2O_3$ or combinations thereof.

13. The article according to claim 1, wherein the article has an average loss tangent (dissipation factor (tan δ)) of no greater than 0.0003.

14. The article according to claim 1, wherein the article has a loss tangent variation of no greater than 20%.

15. The article according to claim 1, wherein the article is in the form of a film.

16. The article according to claim 1, wherein the article is in the form of a tape.

* * * * *